United States Patent
Hosoi

(10) Patent No.: US 9,316,822 B2
(45) Date of Patent: Apr. 19, 2016

(54) ZOOM LENS AND IMAGING APPARATUS

(71) Applicant: Sony Corporation, Tokyo (JP)

(72) Inventor: Masaharu Hosoi, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 13/862,667

(22) Filed: Apr. 15, 2013

(65) Prior Publication Data

US 2013/0335616 A1 Dec. 19, 2013
US 2015/0316753 A9 Nov. 5, 2015

Related U.S. Application Data

(63) Continuation-in-part of application No. 13/777,350, filed on Feb. 26, 2013, now Pat. No. 8,836,846.

(30) Foreign Application Priority Data

Mar. 9, 2012 (JP) ................. 2012-052721
Jun. 14, 2012 (JP) ................. 2012-134773

(51) Int. Cl.
| | |
|---|---|
| G02B 15/14 | (2006.01) |
| G02B 9/34 | (2006.01) |
| G02B 27/64 | (2006.01) |
| G02B 15/177 | (2006.01) |
| G02B 13/00 | (2006.01) |
| G02B 15/20 | (2006.01) |
| G02B 13/04 | (2006.01) |
| G02B 13/18 | (2006.01) |

(52) U.S. Cl.
CPC .............. *G02B 15/14* (2013.01); *G02B 15/177* (2013.01); *G02B 27/646* (2013.01); *G02B 9/34* (2013.01); *G02B 13/002* (2013.01); *G02B 13/004* (2013.01); *G02B 13/009* (2013.01); *G02B 13/04* (2013.01); *G02B 13/18* (2013.01); *G02B 15/20* (2013.01)

(58) Field of Classification Search
CPC .... G02B 27/646; G02B 15/14; G02B 13/004; G02B 13/18; G02B 13/04; G02B 9/34; G02B 15/20; G02B 13/009; G02B 15/177; G02B 13/002
USPC .......... 359/682–687, 557, 715, 740, 770, 781
See application file for complete search history.

(56) References Cited

U.S. PATENT DOCUMENTS

| | | | | |
|---|---|---|---|---|
| 4,687,302 | A * | 8/1987 | Ikemori | G02B 15/177 359/686 |
| 5,530,593 | A * | 6/1996 | Shibayama | G02B 27/646 359/554 |
| 5,731,897 | A * | 3/1998 | Suzuki | G02B 27/646 359/554 |
| 8,836,846 | B2 * | 9/2014 | Kanai et al. | 359/686 |

FOREIGN PATENT DOCUMENTS

| | | |
|---|---|---|
| JP | 2001-343584 A | 12/2001 |
| JP | 2006-208889 A | 8/2006 |
| JP | 2012-027262 A | 2/2012 |

* cited by examiner

*Primary Examiner* — Evelyn A Lester
(74) *Attorney, Agent, or Firm* — Sony Corporation

(57) ABSTRACT

There is provided a zoom lens including a first lens group having negative refractive power, a second lens group having positive refractive power, a third lens group having negative refractive power, and a fourth lens group having positive refractive power, the lens groups being arranged in order from an object side to an image side. The second lens group includes a front group having positive refractive power, and a rear group having positive refractive power, the front and rear groups being arranged in order from the object side to the image side. The front group includes a positive lens, a positive lens, a negative lens, and a positive lens, the lenses being arranged in order from the object side to the image side. The rear group includes at least one positive lens.

10 Claims, 51 Drawing Sheets dec=0.162

FIG. 12 dec=0.231

— d
---- c
-·-· g y=12

0.05

-0.05 y=0

0.05

-0.05 y=-12

0.05

-0.05 dec=0.234 dec=-0.234

FIG. 25 dec=0.328

——— d
------- c
—·—· g y=12

0.05

-0.05 y=0

0.05

-0.05 y=-12

0.05

-0.05 dec=-0.328

ZOOM LENS AND IMAGING APPARATUS

CROSS REFERENCE TO RELATED APPLICATIONS

The present application is a continuation-in-part of U.S. patent application Ser. No. 13/777,350 filed on Feb. 26, 2013, now U.S. Pat. No. 8,836,846, which makes reference to, claims priority to and claims benefit from Japanese Priority Patent Application JP 2012-052721 filed in the Japan Patent Office on Mar. 09, 2012. The present disclosure contains subject matter related to that disclosed in Japanese Priority Patent Application JP 2012-134773 filed in the Japan Patent Office on Jun. 14, 2012, the entire content of which is hereby incorporated by reference.

BACKGROUND

The present technology relates to the technical field of a zoom lens and an imaging apparatus. More specifically, the present technology relates to the technical field of a zoom lens that is suitable as an imaging lens system for a digital camera system with interchangeable lenses and an imaging apparatus using the same in particular.

In recent years, there are, for example, digital camera systems with interchangeable lenses that spread at a rapid rate as an imaging apparatus. Of these digital camera systems with interchangeable lenses, a so-called non reflex camera that does not have a quick return mirror inside a camera body is particularly gaining ground.

The interchangeable lenses for the non reflex camera are expected to be downsized as well as to have good image formation performance, shake correction mechanism, and focusing mechanism that are provided in the interchangeable lenses in the past.

Examples of such zoom lenses suitable for downsizing so as to be provided in the imaging apparatus include zoom lenses of a type in which a first lens group having negative refractive power, a second lens group having positive refractive power, a third lens group having negative refractive power, and a fourth lens group having positive refractive power are arranged in order from an object side to an image side (see, for example, Japanese Patent Laid-Open No. 2006-208889, Japanese Patent Laid-Open No. 2001-343584, and Japanese Patent Laid-Open No. 2012-27262).

In the zoom lens disclosed in Japanese Patent Laid-Open No. 2006-208889, the second lens group includes a positive lens, a negative lens, a negative lens, and a positive lens arranged in order from the object side to the image side.

In the zoom lens disclosed in Japanese Patent Laid-Open No. 2001-343584, the second lens group includes a positive lens, a positive lens, a negative lens, a positive lens and a positive lens arranged in order from the object side to the image side, or includes a positive lens, a positive lens, a negative lens, and a positive lens arranged in order from the object side to the image side.

In the zoom lens disclosed in Japanese Patent Laid-Open No. 2012-27262, the second lens group includes a positive lens, a negative lens, and a positive lens arranged in order from the object side to the image side, or includes a positive lens, a positive lens, a negative lens, a negative lens and a positive lens arranged in order from the object side to the image side.

SUMMARY

In recent years, downsizing of a lens tube is highly expected. In order to achieve downsizing of the lens tube, it is desirable to decrease a movement amount of the second lens group at the time of zooming of the zoom lens, and it is desirable to increase in refractive power of the second lens group.

However, in the zoom lenses disclosed in Japanese Patent Laid-Open No. 2006-208889, Japanese Patent Laid-Open No. 2001-343584, and Japanese Patent Laid-Open No. 2012-27262, the number of positive lenses in the second lens group is small, and therefore if the refractive power of the second lens group is increased for downsizing, the refractive power of respective lenses is thereby increased, which may makes it difficult to successfully correct spherical aberration and coma aberration. As a result, it may be difficult to secure good optical performance including image formation performance.

Accordingly, in view of the above-stated circumstances, it is desirable to achieve downsizing and to secure good optical performance including image formation performance in a zoom lens and an imaging apparatus according to the embodiment of the present technology.

There is preferably provided a zoom lens including a first lens group having negative refractive power, a second lens group having positive refractive power, a third lens group having negative refractive power, and a fourth lens group having positive refractive power, the lens groups being arranged in order from an object side to an image side. The second lens group includes a front group having positive refractive power, and a rear group having positive refractive power, the front and rear groups being arranged in order from the object side to the image side. The front group includes a positive lens, a positive lens, a negative lens, and a positive lens, the lenses being arranged in order from the object side to the image side. The rear group includes at least one positive lens.

Therefore, in the zoom lens, the second lens group has four positive lenses. Accordingly, even when the movement amount of the second lens group at the time of zooming is made smaller for downsizing, it may be possible to save the trouble of increasing the refractive power of each lens in the second lens group.

It is preferable that the rear group is moved in a direction perpendicular to an optical axis in a manner that shake correction is performed.

Since the rear group is moved in the direction perpendicular to the optical axis for shake correction, the rear group may have a smaller lens diameter and a lighter weight. As a result, an actuator provided for shake correction can be made small.

It is preferable that a following conditional expression (1) is satisfied: $(1) 1.2 < f2r/fw < 13.0$, where $f2r$ represents a focal distance of the rear group, and $fw$ represents a focal distance of a whole lens system at a time of infinity focus in a wide angle end state.

If the conditional expression (1) is satisfied, the refractive power of the rear group in the second lens group is optimized.

It is preferable that the rear group includes one positive lens or a cemented lens made up of a positive lens and a negative lens.

If the rear group includes one positive lens or a cemented lens made up of a positive lens and a negative lens, the weight of the rear group is decreased, so that a smaller actuator can be used to achieve shake correction.

It is preferable that a following conditional expression (2) is satisfied: $(2) -10.0 < (R2f + R2r)/(R2f - R2r) < -0.1$, where $R2f$ represents a curvature radius of a most object-side surface in the rear group, and $R2r$ represents a curvature radius of a most image-side surface in the rear group.

If the conditional expression (2) is satisfied, spherical aberration is successfully corrected.

It is preferable that a following conditional expression (3) is satisfied: (3)$0.7<f21/f2f<1.4$, where f21 represents a focal distance of a most object-side positive lens in the second lens group, and f2f represents a focal distance of the front group.

If the conditional expression (3) is satisfied, the refractive power of the most object-side in the second lens group is optimized.

It is preferable that the third lens group is moved in an optical axis direction in a manner that focusing is performed.

If the third lens group is moved in the optical axis direction so that focusing is performed, a focus stroke is shortened.

It is preferable that the third lens group is moved in an optical axis direction in a manner that focusing is performed, and a following conditional expression (4) is satisfied: (4)$-2.0<f3/fw<-1.0$, where f3 represents a focal distance of the third lens group, and fw represents a focal distance of a whole lens system at a time of infinity focus in a wide angle end state.

If the third lens group is moved in the optical axis direction so that focusing is performed, and the following conditional expression (4) is satisfied, the refractive power of the third lens group is optimized, so that enhanced performance at the time of focusing and a shortened focus stroke are achieved.

It is preferable that the first lens group includes a negative lens and a positive lens, the negative lens and the positive lens being arranged in order from the object side to the image side.

If the first lens group includes a negative lens and a positive lens arranged in order from the object side to the image side, reduction in thickness of the first lens group in the optical axis direction is secured and various aberrations are successfully corrected.

It is preferable that when magnification is changed between a wide angle end state and a telephoto end state, the first lens group, the second lens group, and the third lens group are moved in an optical axis direction, while the fourth lens group is moved or fixed in the optical axis direction.

If the first lens group, the second lens group, and the third lens group are moved in the optical axis direction, while the fourth lens group is moved or fixed in the optical axis direction when magnification is changed between the wide angle end state and the telephoto end state, the movement amount of each group at the time of zooming is reduced.

According to an embodiment of the present disclosure, there is provided an imaging apparatus including a zoom lens, and an image sensor configured to convert an optical image formed by the zoom lens into an electrical signal. The zoom lens include a first lens group having negative refractive power, a second lens group having positive refractive power, a third lens group having negative refractive power, and a fourth lens group having positive refractive power, the lens groups being arranged in order from an object side to an image side. The second lens group include a front group having positive refractive power, and a rear group having positive refractive power, the front and rear groups being arranged in order from the object side to the image side. The front group includes a positive lens, a positive lens, a negative lens, and a positive lens, the lenses being arranged in order from the object side to the image side. The rear group includes at least one positive lens.

Therefore, in the imaging apparatus, the second lens group in the zoom lens has four positive lenses. Accordingly, even when the movement amount of the second lens group at the time of zooming is made smaller for downsizing, it may be possible to save the trouble of increasing the refractive power of each lens in the second lens group.

According to a first embodiment of the present disclosure, there is provided a zoom lens including a first lens group having negative refractive power, a second lens group having positive refractive power, a third lens group having negative refractive power, and a fourth lens group having positive refractive power, the lens groups being arranged in order from an object side to an image side. The second lens group includes a front group having positive refractive power, and a rear group having positive refractive power, the front and rear groups being arranged in order from the object side to the image side. The front group includes a positive lens, a positive lens, a negative lens, and a positive lens, the lenses being arranged in order from the object side to the image side. The rear group includes at least one positive lens.

Therefore, since the second lens group has four positive lenses, it may be possible to save the trouble of increasing the refractive power of each lens in the second lens group even when the movement amount of the second lens group at the time of zooming is made smaller for downsizing. As a result, it becomes possible to achieve downsizing and to secure good optical performance including image formation performance.

According to a second embodiment of the present disclosure, the rear group may be moved in a direction perpendicular to an optical axis in a manner that shake correction is performed.

Therefore, since the rear group in the second lens group may have a smaller lens diameter and a lighter weight, an actuator provided for shake correction may be made small, which makes it possible to avoid upsizing of the lens and to thereby achieve downsizing.

According to a third embodiment of the present disclosure, a following conditional expression (1) may be satisfied: (1)$1.2<f2r/fw<13.0$, where f2r represents a focal distance of the rear group, and fw represents a focal distance of a whole lens system at a time of infinity focus in a wide angle end state.

Therefore, the refractive power of the rear group in the second lens group is optimized, so that enhanced optical performance and downsizing can be achieved.

According to a fourth embodiment of the present disclosure, the rear group may include one positive lens or a cemented lens made up of a positive lens and a negative lens.

Therefore, the weight of the rear group is reduced, and a smaller actuator can be used for shake correction, so that more downsizing of the tube can be achieved.

According to a fifth embodiment of the present disclosure, a following conditional expression (2) may be satisfied: (2)$-10.0<(R2f+R2r)/(R2f-R2r)<-0.1$, where R2f represents a curvature radius of a most object-side surface in the rear group, and R2r represents a curvature radius of a most image-side surface in the rear group.

Therefore, spherical aberration is successfully corrected and enhanced optical performance can be achieved.

According to a sixth embodiment of the present disclosure, a following conditional expression (3) may be satisfied: (3)$0.7<f21/f2f<1.4$, where f21 represents a focal distance of a most object-side positive lens in the second lens group, and f2f represents a focal distance of the front group.

Therefore, the refractive power of the most object-side positive lens in the second lens group is optimized, a good balance in aberration correction effect in the second lens group is secured, and enhanced optical performance can be achieved.

According to a seventh embodiment of the present disclosure, the third lens group may be moved in an optical axis direction in a manner that focusing is performed.

Therefore, since the third lens group having negative refractive power has high focus sensitivity, the focus stroke is shortened and thereby a smaller tube size can be achieved.

According to an eighth embodiment of the present disclosure, that the third lens group may be moved in an optical axis direction in a manner that focusing is performed. A following conditional expression (4) may be satisfied: (4)−2.0<f3/fw<−1.0, where f3 represents a focal distance of the third lens group, and fw represents a focal distance of a whole lens system at a time of infinity focus in a wide angle end state.

Therefore, the refractive power of the third lens group is optimized, and enhanced performance at the time of focusing and a reduced focus stroke are achieved, so that enhanced optical performance and downsizing can be achieved.

According to a ninth embodiment of the present disclosure, the first lens group may include a negative lens and a positive lens, the negative lens and the positive lens being arranged in order from the object side to the image side.

Therefore, reduction in thickness of the first lens group in the optical axis direction can be secured, and in addition, various aberrations including a distortion aberration, a coma aberration, a chromatic aberration of magnification, and an axial chromatic aberration in particular can successfully be corrected, so that enhanced optical performance can be achieved.

According to an embodiment of the present disclosure, when magnification is changed between a wide angle end state and a telephoto end state, the first lens group, the second lens group, and the third lens group may be moved in an optical axis direction, while the fourth lens group is moved or fixed in the optical axis direction.

Therefore, the movement amount of each group at the time of zooming becomes smaller, so that the tube size can be reduced.

According to a tenth embodiment of the present disclosure, there is provided an imaging apparatus including a zoom lens, and an image sensor configured to convert an optical image formed by the zoom lens into an electrical signal. The zoom lens include a first lens group having negative refractive power, a second lens group having positive refractive power, a third lens group having negative refractive power, and a fourth lens group having positive refractive power, the lens groups being arranged in order from an object side to an image side. The second lens group include a front group having positive refractive power, and a rear group having positive refractive power, the front and rear groups being arranged in order from the object side to the image side. The front group includes a positive lens, a positive lens, a negative lens, and a positive lens, the lenses being arranged in order from the object side to the image side. The rear group includes at least one positive lens.

Therefore, in the zoom lens, the second lens group has four positive lenses. Accordingly, even when the movement amount of the second lens group at the time of zooming is made smaller for downsizing, it may be possible to save the trouble of increasing the refractive power of each lens in the second lens group. As a result, it becomes possible to achieve downsizing and to secure good optical performance including image formation performance.

BRIEF DESCRIPTION OF THE DRAWINGS

FIG. 12 is a view illustrating lateral aberration when shake correction is performed in one direction in the telephoto end state;

FIG. 25 is a view illustrating lateral aberration when shake correction is performed in one direction in the telephoto end state;

DETAILED DESCRIPTION OF THE EMBODIMENT(S)

Figure 1:
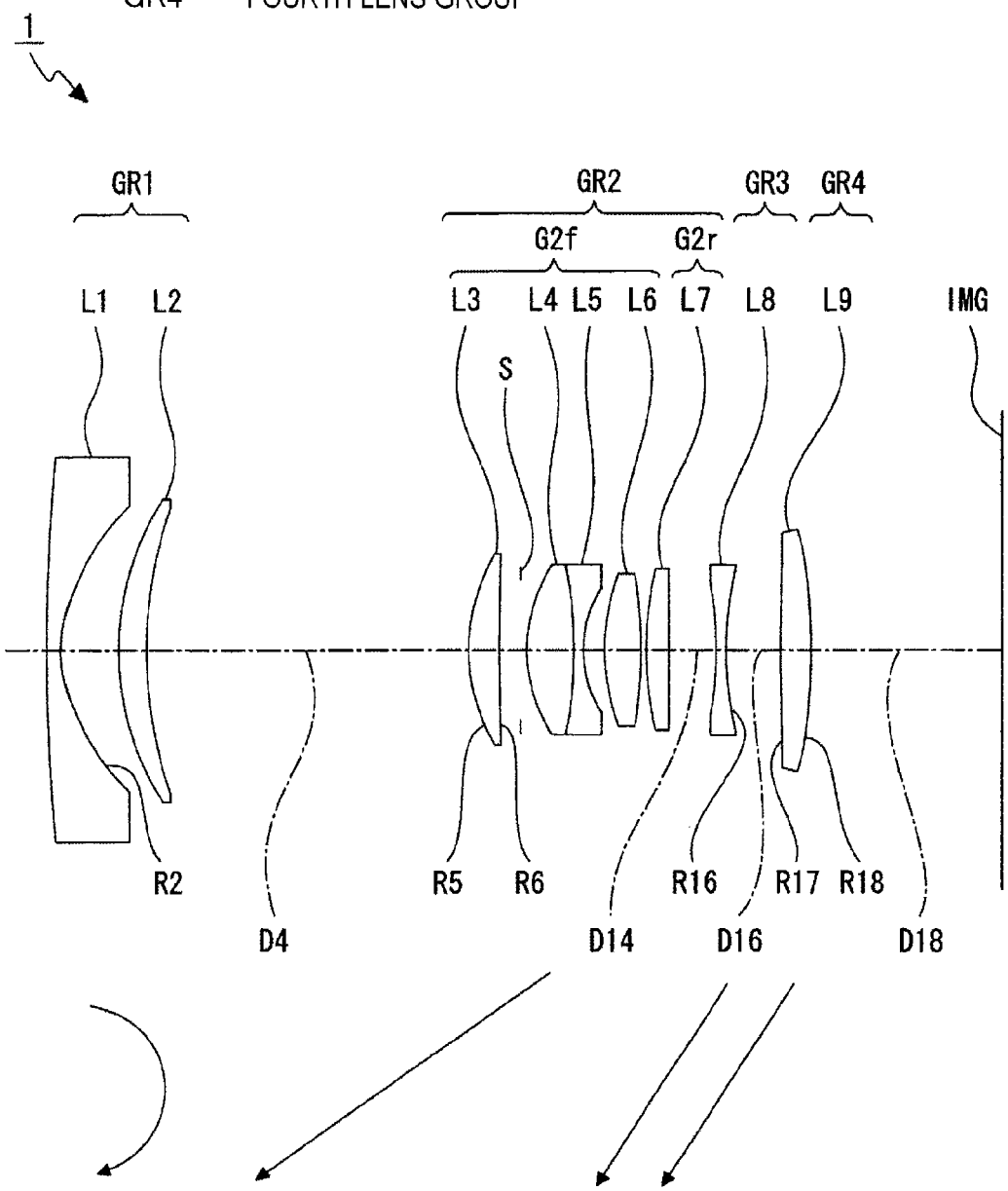
FIG. 1, as with FIGS. 2 to 51, is a view illustrating a zoom lens and an imaging apparatus according an embodiment of the present technology, and more particularly illustrating the lens configuration of a zoom lens in a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of a zoom lens and an imaging apparatus in the present technology will be described.

[Configuration of Zoom Lens]

The zoom lens according to the embodiment of the present technology includes a first lens group having negative refractive power, a second lens group having positive refractive power, a third lens group having negative refractive power, and a fourth lens group having positive refractive power arranged in order from the object side to the image side.

In the zoom lens according to the embodiment of the present technology, the second lens group include a front group having positive refractive power, and a rear group having positive refractive power, the front and rear groups being arranged in order from the object side to the image side. The front group includes a positive lens, a positive lens, a negative lens, and a positive lens arranged in order from the object side to the image side, and the rear group has at least one positive lens.

In the zoom lens according to the embodiment of the present technology as described in the forgoing, the second lens group has four positive lenses, and therefore it may be possible to save the trouble of increasing the refractive power of each lens in the second lens group even when the movement amount of the second lens group at the time of zooming is made smaller for downsizing. As a result, spherical aberration and coma aberration can successfully be corrected.

More specifically, spherical aberration or coma aberration generated in two positive lenses placed on the object side of a negative lens in the second lens group can be corrected on the image-side surface of the negative lens. Furthermore, luminous flux diverging from the negative lens in the second lens group can be focused on two positive lenses placed on the image side of the negative lens, while coma aberration can successfully be corrected.

Therefore, in the zoom lens according to the embodiment of the present technology, downsizing can be achieved and good optical performance including image formation performance can be secured.

In the zoom lens according to one embodiment of the present technology, the rear group in the second lens group is preferably moved in the direction perpendicular to the optical axis so that shake correction is performed.

Since the rear group in the second lens group may have a smaller lens diameter and a lighter weight, an actuator provided for shake correction can be made small, which makes it possible to avoid upsizing of the lens and to thereby achieve downsizing.

In the zoom lens according to one embodiment of the present technology, it is preferable to satisfy the following conditional expression (1).

$$1.2 < f2r/fw < 13.0 \tag{1}$$

where f2r represents a focal distance of the rear group, and fw represents a focal distance of the whole lens system at the time of infinity focus in the wide angle end state.

The conditional expression (1) is an expression which defines a ratio of the focal distance of the rear group in the second lens group to the focal distance of the whole lens system at the time of infinity focus in the wide angle end state.

If the ratio is less than the lower limit in the conditional expression (1), the refractive power of the rear group (shake correction lens group) become too high, so that optical performance is more deteriorated at the time of shake correction.

On the contrary, if the ratio is more than the upper limit in the conditional expression (1), the refractive power of the rear group become too low, so that a movement width of the rear group moved in the direction perpendicular to the optical axis for shake correction is lengthened, which results in upsizing of the tube in a radial direction.

Therefore, if the zoom lens satisfies the conditional expression (1), the refractive power of the rear group in the second lens group is optimized, so that enhanced optical performance and downsizing can be achieved.

Note that it is more preferable for the zoom lens to satisfy the following conditional expression (1)':

$$1.5 < f2r/fw < 9.0 \tag{1}'$$

If the zoom lens satisfies the conditional expression (1)', the refractive power of the rear group in the second lens group is further optimized, so that more enhanced optical performance and more downsizing can be achieved.

In the zoom lens according to one embodiment of the present technology, it is desirable that the rear group preferably includes one positive lens or a cemented lens made up of a positive lens and a negative lens.

With the rear group in the second lens group having such configuration, the weight of the rear group (shake correction lens group) can be lightened, and a smaller actuator can be used for shake correction, so that more downsizing of the tube can be achieved.

In the zoom lens according to one embodiment of the present technology, it is preferable to satisfy the following conditional expression (2).

$$-10.0 < (R2f+R2r)/(R2f-R2r) < -0.1 \tag{2}$$

where R2f represents a curvature radius of a most object-side surface in the rear group, and R2r represents a curvature radius of a most image-side surface in the rear group.

The conditional expression (2) is an expression which defines a shape factor of the rear group in the second lens group.

If the ratio is less than the lower limit in the conditional expression (2), the most image-side surface in the rear group becomes a concave surface having a large curvature and facing the image side. As a result, an incident angle of axial light flux incident into the object-side surface becomes large, which deteriorates spherical aberration.

On the contrary, if the ratio is more than the upper limit in the conditional expression (2), the most image-side surface in the rear group becomes a convex surface facing the image side. As a result, the effect of correcting the spherical aberration inside the rear group becomes small.

Therefore, when the zoom lens satisfies the conditional expression (2), the spherical aberration is successfully corrected and enhanced optical performance can be achieved.

Note that it is more preferable for the zoom lens to satisfy the following conditional expression (2)'.

$$-8.0 < (R2f+R2r)/(R2f-R2r) < -0.3 \tag{2}'$$

If the zoom lens satisfies the conditional expression (2)', the spherical aberration is more successfully corrected and more enhanced optical performance can be achieved.

In the zoom lens according to one embodiment of the present technology, it is preferable to satisfy the following conditional expression (3).

$$0.7 < f21/f2f < 1.4 \tag{3}$$

where f21 represents a focal distance of a most object-side positive lens in the second lens group, and f2f represents a focal distance of the front group.

The conditional expression (3) is an expression which defines a ratio of the focal distance of the most object-side positive lens in the second lens group to the focal distance of the front group in the second lens group.

If the ratio is less than the lower limit in the conditional expression (3), the refractive power of the most object-side positive lens becomes too high. As a result, spherical aberration or coma aberration generated in this positive lens is deteriorated.

On the contrary, if the ratio is more than the upper limit in the conditional expression (3), the refractive power of the most object-side positive lens becomes too low, so that the refractive power of the remaining two positive lenses in the front group becomes high. As a result, a balance of the aberration correction effect inside the second lens group is disrupted and aberration is thereby deteriorated.

Therefore, if the zoom lens satisfies the conditional expression (3), the refractive power of the most object-side positive lens in the second lens group is optimized, a good balance in aberration correction effect inside the second lens group is secured, and enhanced optical performance can be achieved.

Note that it is more preferable for the zoom lens to satisfy the following conditional expression (3)':

$$0.8 < f21/f2f < 1.2 \tag{3}'$$

If the zoom lens satisfies the conditional expression (3)', the refractive power of the most object-side positive lens in the second lens group is optimized more, a better balance in aberration correction effect inside the second lens group is secured, and more enhanced optical performance can be achieved.

In the zoom lens according to one embodiment of the present technology, the third lens group is preferably moved in the optical axis direction so that focusing is performed.

The third lens group having negative refractive power is high in focus sensitivity (large in variation of a focus position when the lens group is moved in the optical axis direction). Accordingly, by setting the third lens group as a focus group, the focus stroke is shortened, so that the tube size can be reduced.

Therefore, if the third lens group is configured to be moved in the optical axis direction so that focusing is performed, the focus stroke is shortened and reduction in the tube size can be achieved.

In the zoom lens according to one embodiment of the present technology, it is preferable that the third lens group is moved in the optical axis direction so that focusing is performed and that the following conditional expression (4) is satisfied.

$$-2.0 < f3/fw < -1.0 \quad (4)$$

where f3 represents a focal distance of the third lens group, and fw represents a focal distance of the whole lens system at the time of infinity focus in the wide angle end state.

The conditional expression (4) is an expression which defines a ratio of the focal distance in the third lens group to the focal distance of the whole lens system at the time of infinity focus in the wide angle end state.

If the ratio is less than the lower limit in the conditional expression (4), the refractive power of the third lens group becomes too high, and so the optical performance is further deteriorated at the time of focusing.

On the contrary, if the ratio is more than the upper limit in the conditional expression (4), the refractive power of the third lens group becomes too low. As a result, the focus sensitivity is lowered and the focus stroke is lengthened, which causes increase in the tube size.

Therefore, if the zoom lens satisfies the conditional expression (4), the refractive power of the third lens group is optimized, and enhanced performance at the time of focusing and a reduced focus stroke are achieved, so that enhanced optical performance and downsizing can be achieved.

Note that it is more preferable for the zoom lens to satisfy the following conditional expression (4)'.

$$-1.6 < f3/fw < -1.1 \quad (4)'$$

When the zoom lens satisfies the conditional expression (4)', the refractive power of the third lens group is more optimized, and more enhanced performance at the time of focusing and a more reduced focus stroke are achieved, so that more enhanced optical performance and more downsizing can be achieved.

In the zoom lens according to one embodiment of the present technology, it is preferable that the first lens group includes a negative lens and a positive lens arranged in order from the object side to the image side.

With the first lens having the above configuration, reduction in thickness of the first lens group in the optical axis direction is secured, and in addition, various aberrations, including a distortion aberration, a coma aberration, a chromatic aberration of magnification, and an axial chromatic aberration in particular can successfully be corrected, so that enhanced optical performance can be achieved.

In the zoom lens according to one embodiment of the present technology, it is preferable that the first lens group, the second lens group, and the third lens group are moved in the optical axis direction, while the fourth lens group is moved or fixed in the optical axis direction at the time of changing magnification between the wide angle end state and the telephoto end state.

When magnification is changed between the wide angle end state and the telephoto end state, the first lens group, the second lens group, and the third lens group are moved in the optical axis direction, while the fourth lens group is moved or fixed in the optical axis direction, so that the movement amount of each group at the time of zooming is reduced. This makes it possible to reduce the tube size.

[Numerical Value Embodiment of Zoom Lens]

Hereinafter, a detailed embodiment of the zoom lens according to the embodiment of the present technology and numerical value embodiments, in which detailed numerical values are applied to the embodiment, will be described with reference to the drawings and tables.

The meaning and the like of marks in the following tables or description are as follows.

A "surface number" represents a surface number of an $i^{th}$ surface counted from the object side to the image side, "R" represents a paraxial curvature radius of the $i^{th}$ surface, "D" represents an axial surface distance (the thickness of the center of a lens or air spacing) between the $i^{th}$ surface and an $(i+1)^{th}$ surface, "N" represents a refractive index in a d line ($\lambda$=587.6 nm) of a lens and the like starting from the $i^{th}$ surface, and "$\nu$" represents the Abbe number in the d line of the lens and the like starting from the $i^{th}$ surface.

In relation to the "surface number," "ASP" represents that a corresponding surface is an aspherical surface. In relation to "R," "Infinity" represents that a corresponding surface is flat. In relation to "D," "Di" represents variable distances.

"$\kappa$" represents a conic constant, and "A4," "A6," "A8," and "A10" represent fourth, sixth, eighth, and tenth order aspheric coefficients, respectively.

"Fno" represents an F number, "f" represents a focal distance, and "$\omega$" represents a half-angle of view.

In the following tables indicating aspheric coefficients, "E–n" represents an exponential expression with base 10, that is, represents "$10^{-n}$." For example, "0.12345E-05" represents "$0.12345 \times 10^{-5}$."

In the zoom lens used in each embodiment, a lens surface may be formed with an aspherical surface. An aspheric shape is defined by the following Equation 1 if "x" represents the distance (an amount of sag) in the optical axis direction from an apex of a lens surface, "y" represents the height (the image height) in the direction perpendicular to the optical axis direction, "c" represents a paraxial curvature radius (a reciprocal of a curvature radius) at the apex of the lens, "$\kappa$" represents a conic constant, and "Ai," represents the following aspheric coefficients, respectively.

$$x = \frac{y^2 \cdot c^2}{1 + \{1 - (1+\kappa) \cdot y^2 \cdot c^2\}^{1/2}} + \sum Ai \cdot yi$$

The zoom lenses 1 to 8 in the first to eighth embodiments shown below respectively include a first lens group GR1 having negative refractive power, a second lens group GR2 having positive refractive power, a third lens group GR3 having negative refractive power, and a fourth lens group GR4 having positive refractive power arranged in order from the object side to the image side.

<First Embodiment>

FIG. 1 illustrates the lens configuration of a zoom lens 1 according to the first embodiment of the present technology.

The zoom lens 1 has a magnification ratio set to 2.94 times.

When magnification is changed between the wide angle end state and the telephoto end state in the zoom lens 1, the first lens group GR1, the second lens grup GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a biconvex lens.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 1 shows lens data in the numerical value embodiment 1 in which detailed numerical values are applied to the zoom lens 1 according to the first embodiment.

TABLE 1

| Surface Number | R | D | N | ν |
|---|---|---|---|---|
| 1 | 172.566 | 1.080 | 1.88300 | 40.80 |
| 2 (ASP) | 12.058 | 4.000 | | |
| 3 | 19.766 | 2.018 | 2.00272 | 19.32 |
| 4 | 32.048 | (D4) | | |
| 5 (ASP) | 13.010 | 2.283 | 1.69350 | 53.20 |
| 6 (ASP) | 199.000 | 1.500 | | |
| 7 | Infinity | 0.500 | | |
| 8 | 11.062 | 3.353 | 1.49700 | 81.61 |
| 9 | −31.892 | 0.700 | 1.83400 | 37.34 |
| 10 | 8.850 | 1.526 | | |
| 11 | 15.567 | 2.500 | 1.48749 | 70.44 |
| 12 | −34.265 | 0.500 | | |
| 13 | 24.398 | 1.601 | 1.48749 | 70.44 |
| 14 | −351.765 | (D14) | | |
| 15 | −24.720 | 0.790 | 1.69680 | 55.46 |
| 16 (ASP) | 30.038 | (D16) | | |
| 17 (ASP) | 93.933 | 2.190 | 1.80610 | 40.73 |
| 18 (ASP) | −60.132 | (D18) | | |

In the zoom lens 1, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 1 are shown in Table 2 together with the conic constant κ.

TABLE 2

| Surface Number | κ | A4 | A6 | A8 | A10 |
|---|---|---|---|---|---|
| 2 | −0.083257779 | −1.2058E−05 | −3.9503E−07 | 3.1552E−09 | −2.6164E−11 |
| 5 | 0 | −6.3285E−06 | −5.1744E−07 | 1.0598E−08 | −2.0601E−10 |
| 6 | 0 | 2.3738E−06 | −2.1246E−07 | 6.8489E−10 | −7.7144E−11 |
| 16 | −0.8909625 | 6.1843E−05 | −2.7882E−07 | −1.0586E−09 | 1.0602E−11 |
| 17 | 0 | −8.8132E−05 | 7.6707E−07 | −8.7771E−09 | 7.0405E−11 |
| 18 | 0 | −9.0000E−05 | 6.3117E−07 | −8.4535E−09 | 6.5005E−11 |

When magnification is changed between the wide angle end state and the telephoto end state in the zoom lens 1, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 1 are shown in Table 3 together with the F number Fno, the focal distance f, and the half-angle of view ω.

TABLE 3

| | Wide Angle End | Intermediate Focal Distance | Telephoto End |
|---|---|---|---|
| Fno | 3.61 | 4.77 | 5.77 |
| f | 16.48 | 28.20 | 48.50 |
| ω | 46.00 | 27.66 | 16.19 |
| D4 | 23.043 | 10.230 | 0.800 |
| D14 | 3.325 | 4.565 | 9.669 |
| D16 | 3.775 | 5.594 | 6.410 |
| D18 | 13.817 | 20.784 | 26.837 |

Figure 2:
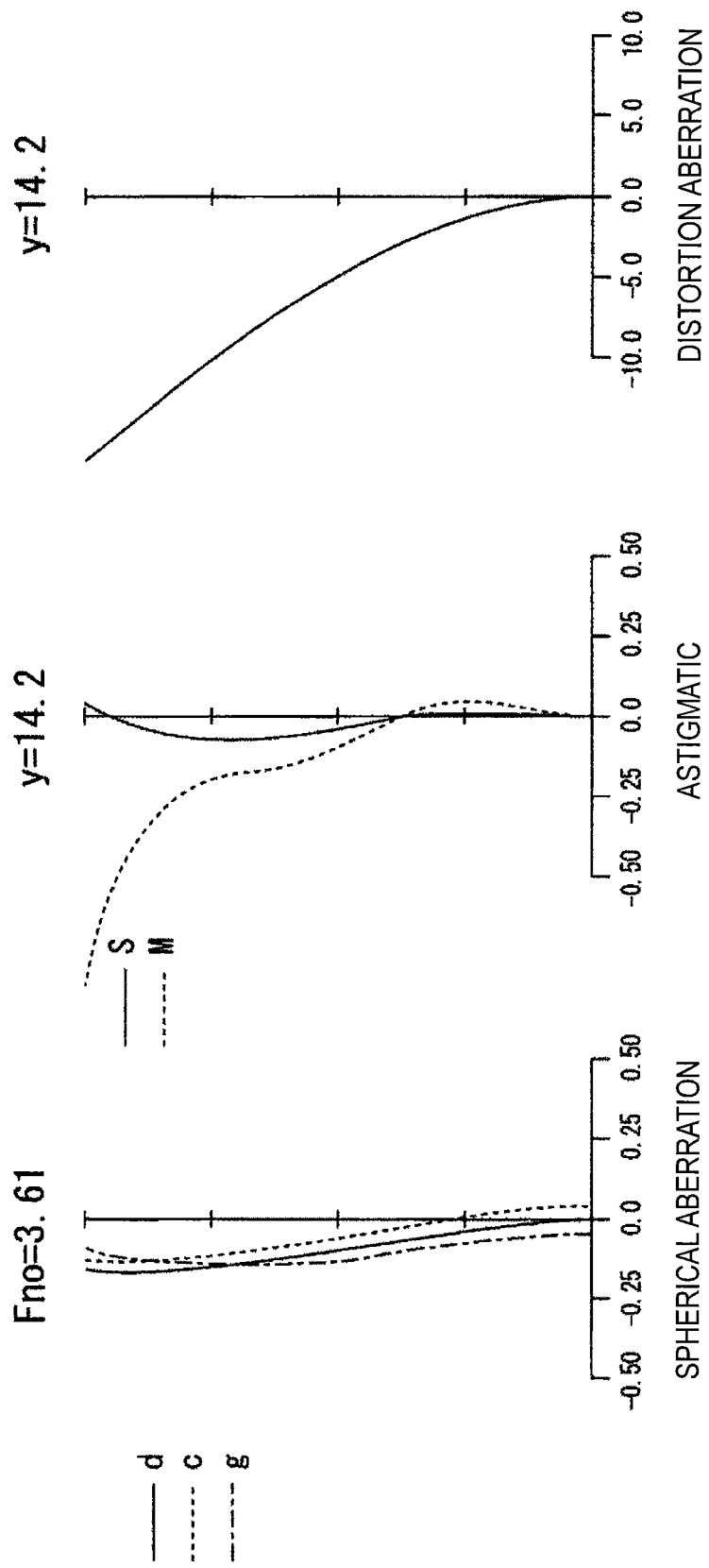
FIG. 2, as with FIGS. 3 to 13, is an aberration view illustrating a numerical value embodiment in which detailed numerical values are applied to the first embodiment, and more particularly illustrating spherical aberration, astigmatism and distortion aberration in the wide angle end state.
Figure 3:
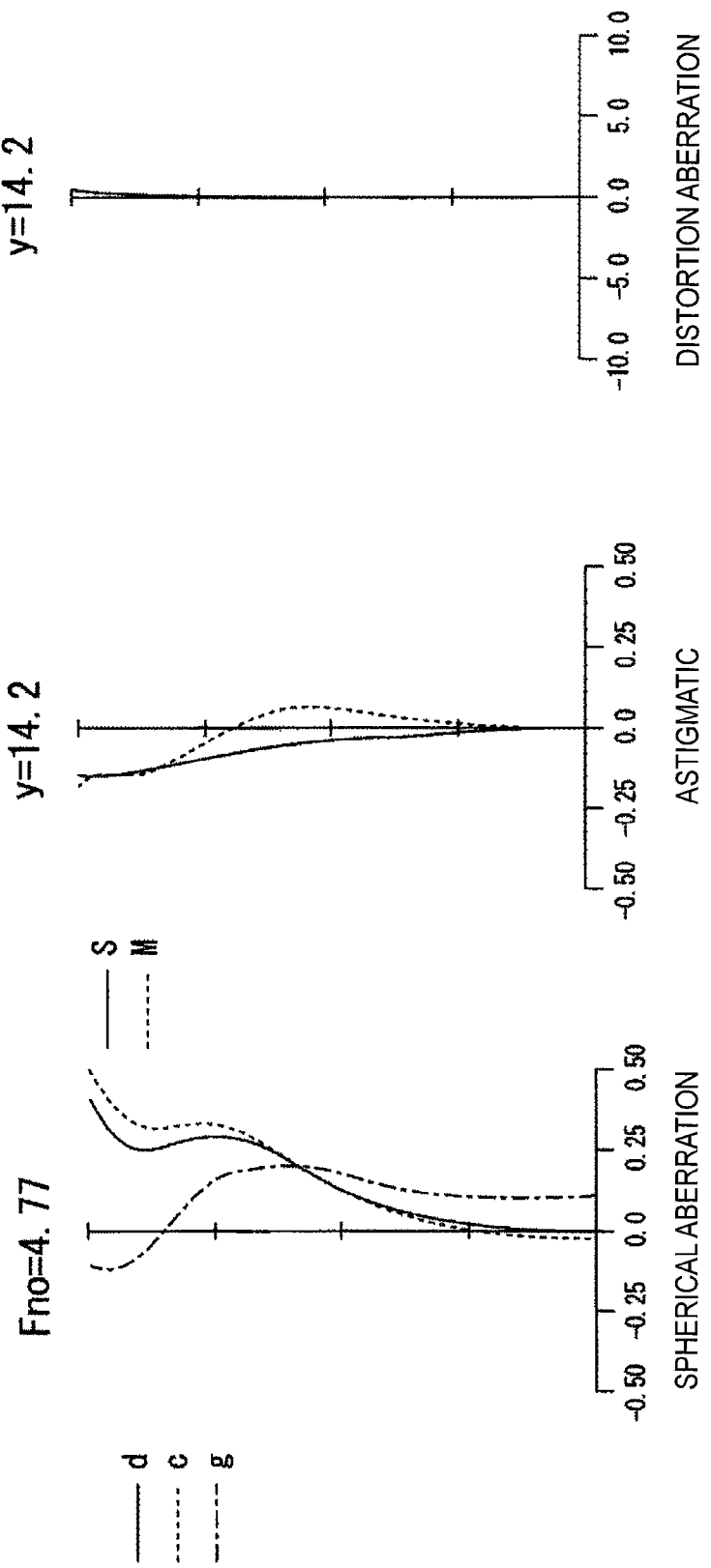
FIG. 3 is a view illustrating spherical aberration, astigmatism, and distortion aberration in the intermediate focal distance state.
Figure 4:
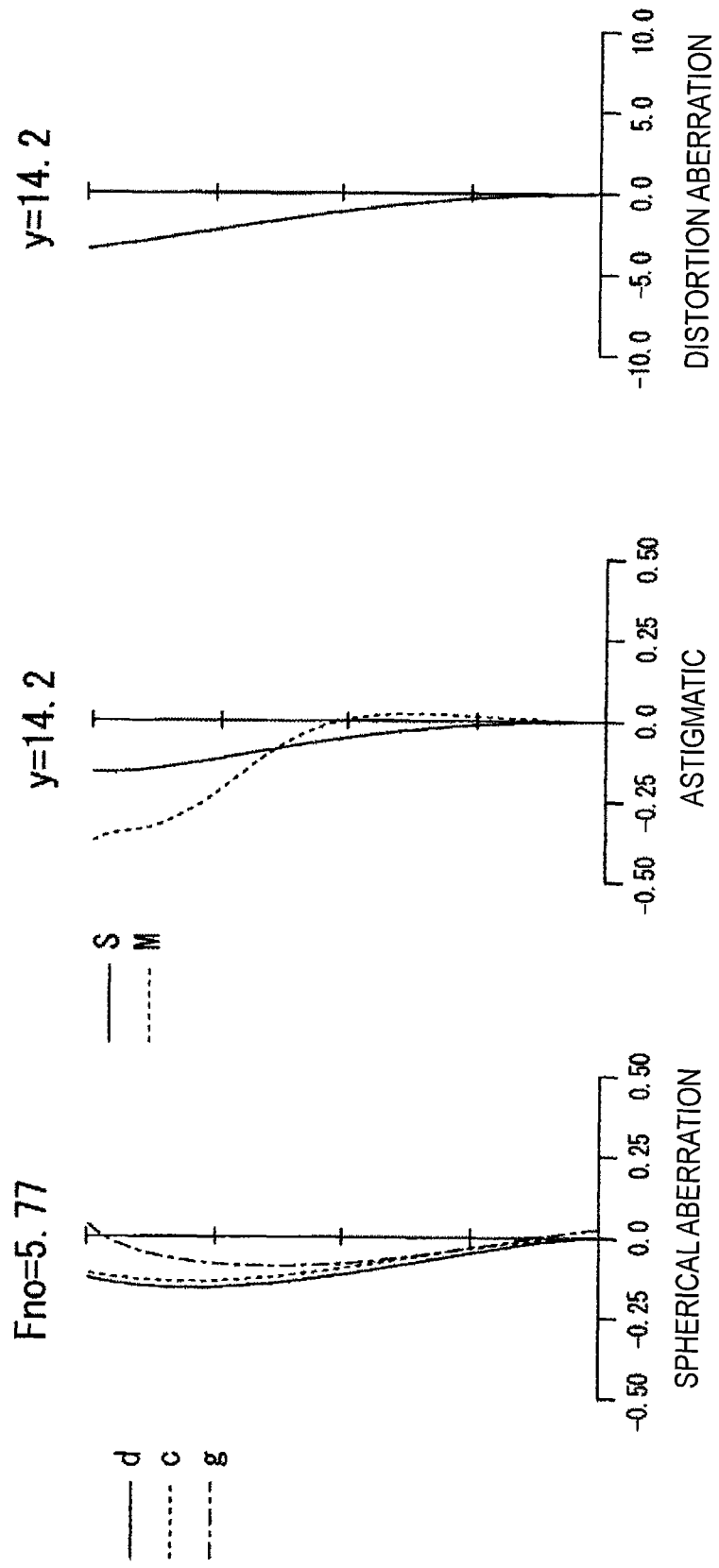
FIG. 4 is a view illustrating spherical aberration, astigmatism, and distortion aberration in the telephoto end state.

FIGS. 2 to 4 are views showing various aberrations in the infinity focus state in the numerical value embodiment 1, in which FIG. 2 illustrates various aberrations in the wide angle end state, FIG. 3 illustrates various aberrations in the intermediate focal distance state, and FIG. 4 illustrates various aberrations in the telephoto end state.

In FIGS. 2 to 4, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

FIGS. 5 to 13 are various aberrations views in the infinity focus state in the numerical value embodiment 1. In FIGS. 5 to 13, dec represents an eccentricity correction amount. In FIGS. 5 to FIG. 13, a solid line, a dotted line and an alternate long and short dash line represent a value in the d line (587.56 nm), a value in the C line (wavelength of 656.3 nm), and a value in the g line (wavelength of 435.8 nm), respectively.

Figure 5:
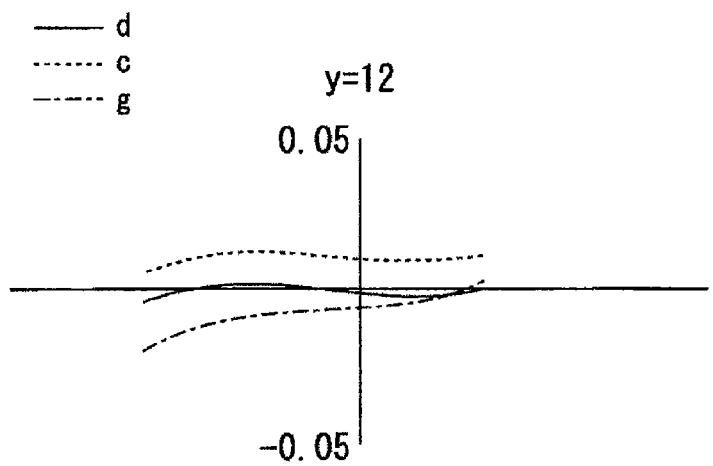
FIG. 5 is a view illustrating lateral aberration when shake correction is not performed in the wide angle end state.
Figure 5:
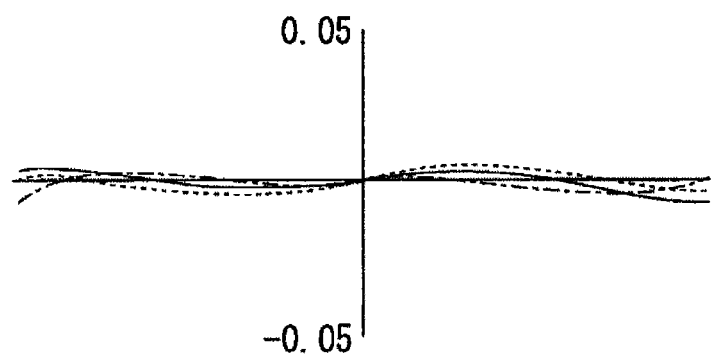
Figure 5:
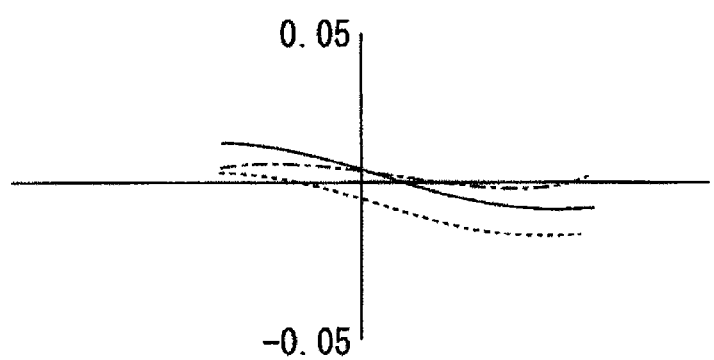
Figure 6:
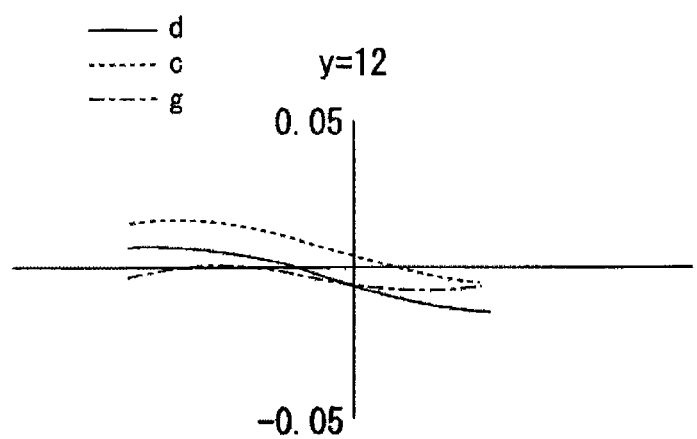
FIG. 6 is a view illustrating lateral aberration when shake correction is performed in one direction in the wide angle end state.
Figure 6:
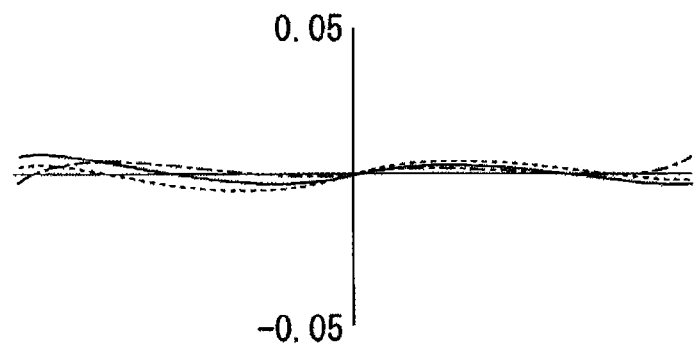
Figure 6:
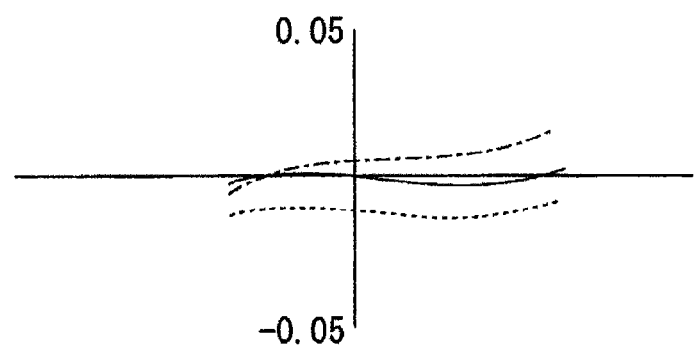
Figure 7:
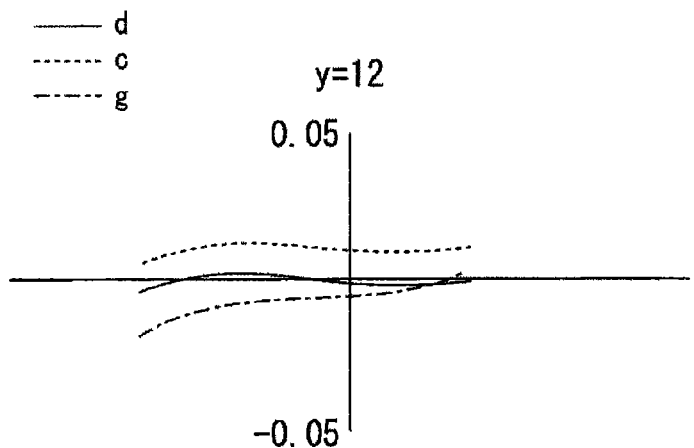
FIG. 7 is a view illustrating lateral aberration when shake correction is performed in the other direction in the wide angle end state.
Figure 7:
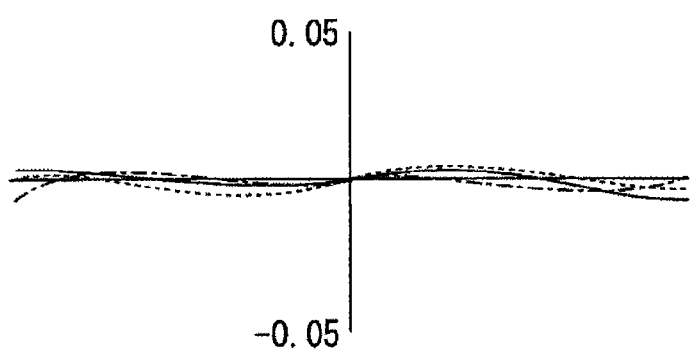
Figure 7:
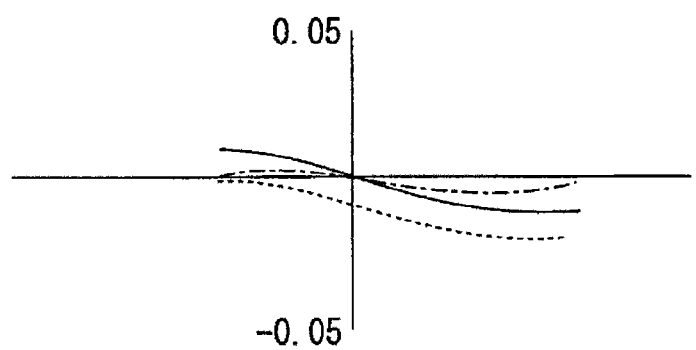

FIG. 5 is a lateral aberration view when shake correction is not performed in the wide angle end state, FIG. 6 is a lateral aberration view when shake correction is performed in one direction in the wide angle end state, and FIG. 7 is a lateral aberration view when shake correction is performed in the other direction in the wide angle end state.

Figure 8:
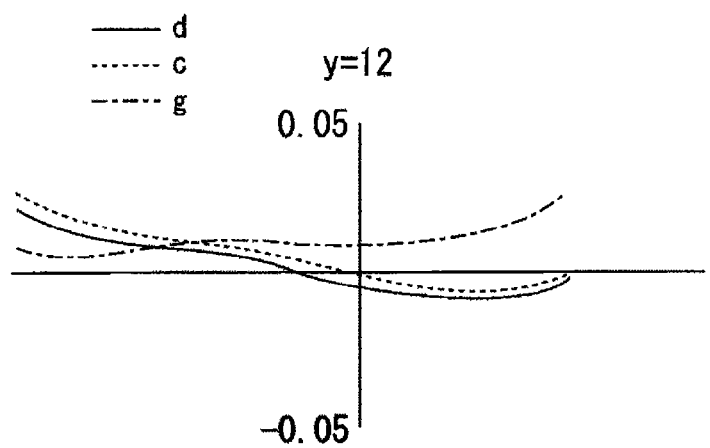
FIG. 8 is a view illustrating lateral aberration when shake correction is not performed in the intermediate focal distance state.
Figure 8:
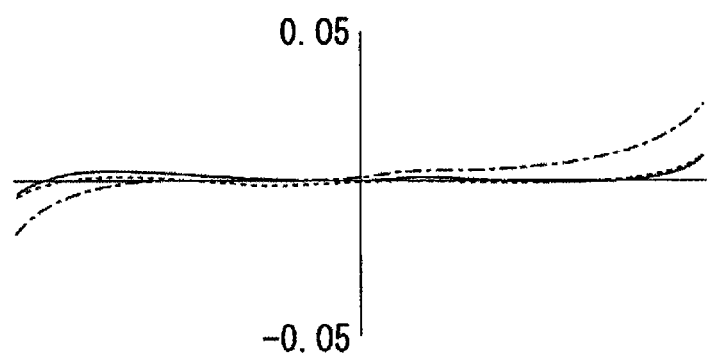
Figure 8:
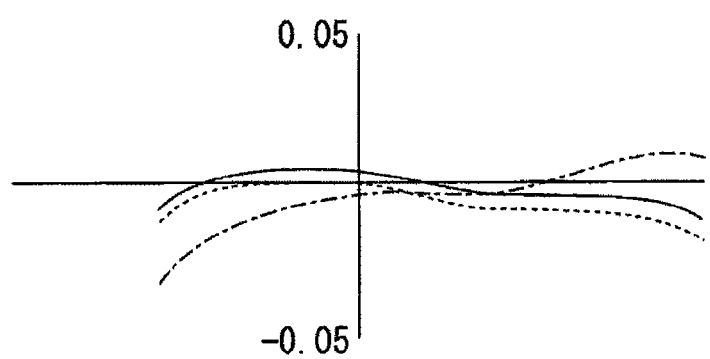
Figure 9:
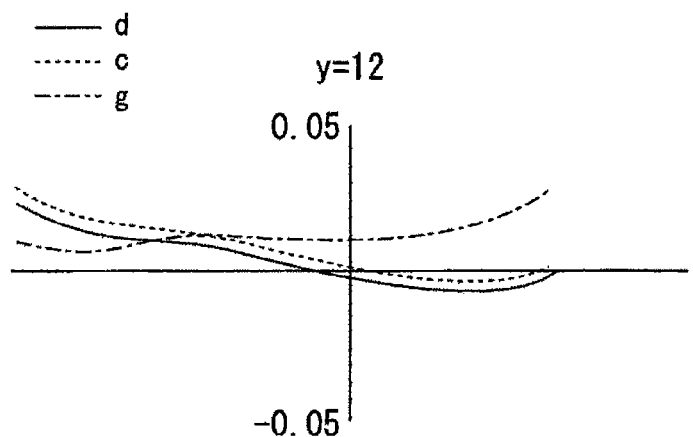
FIG. 9 is a view illustrating lateral aberration when shake correction is performed in one direction in the intermediate focal distance state.
Figure 9:
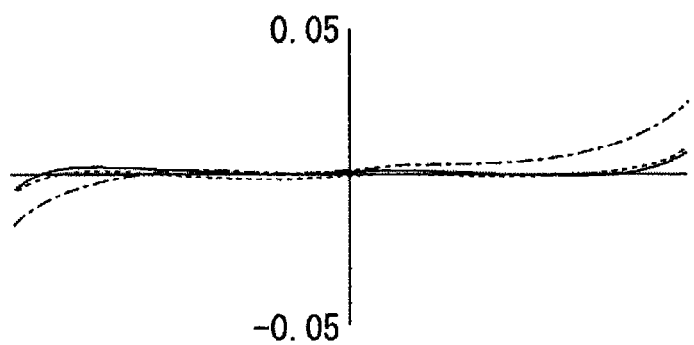
Figure 9:
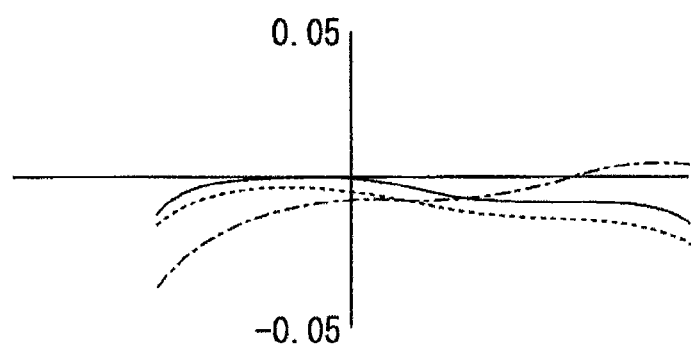
Figure 10:
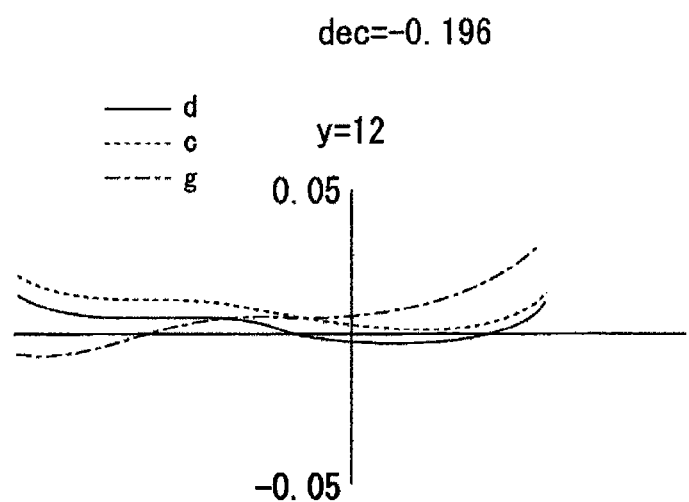
FIG. 10 is a view illustrating lateral aberration when shake correction is performed in the other direction in the intermediate focal distance state.
Figure 10:
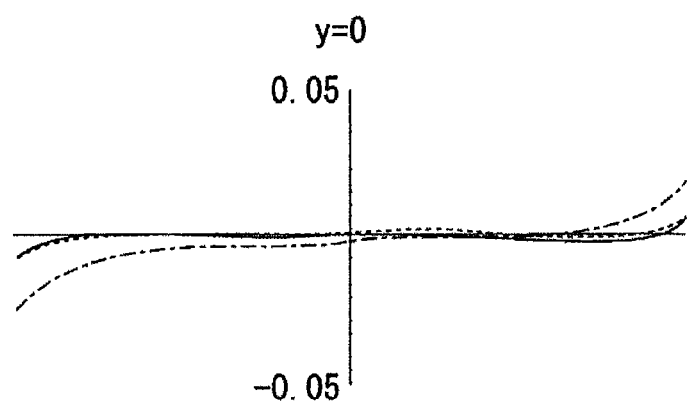
Figure 10:
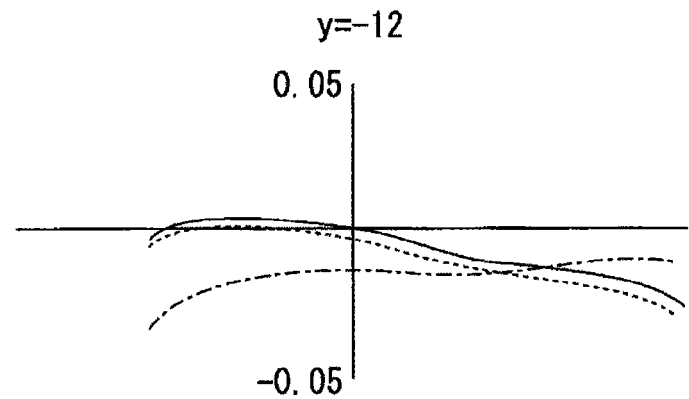

FIG. 8 is a lateral aberration view when shake correction is not performed in the intermediate focal distance state, FIG. 9 is a lateral aberration view when shake correction is performed in one direction in the intermediate focal distance state, and FIG. 10 is a lateral aberration view when shake correction is performed in the other direction in the intermediate focal distance state.

Figure 11:
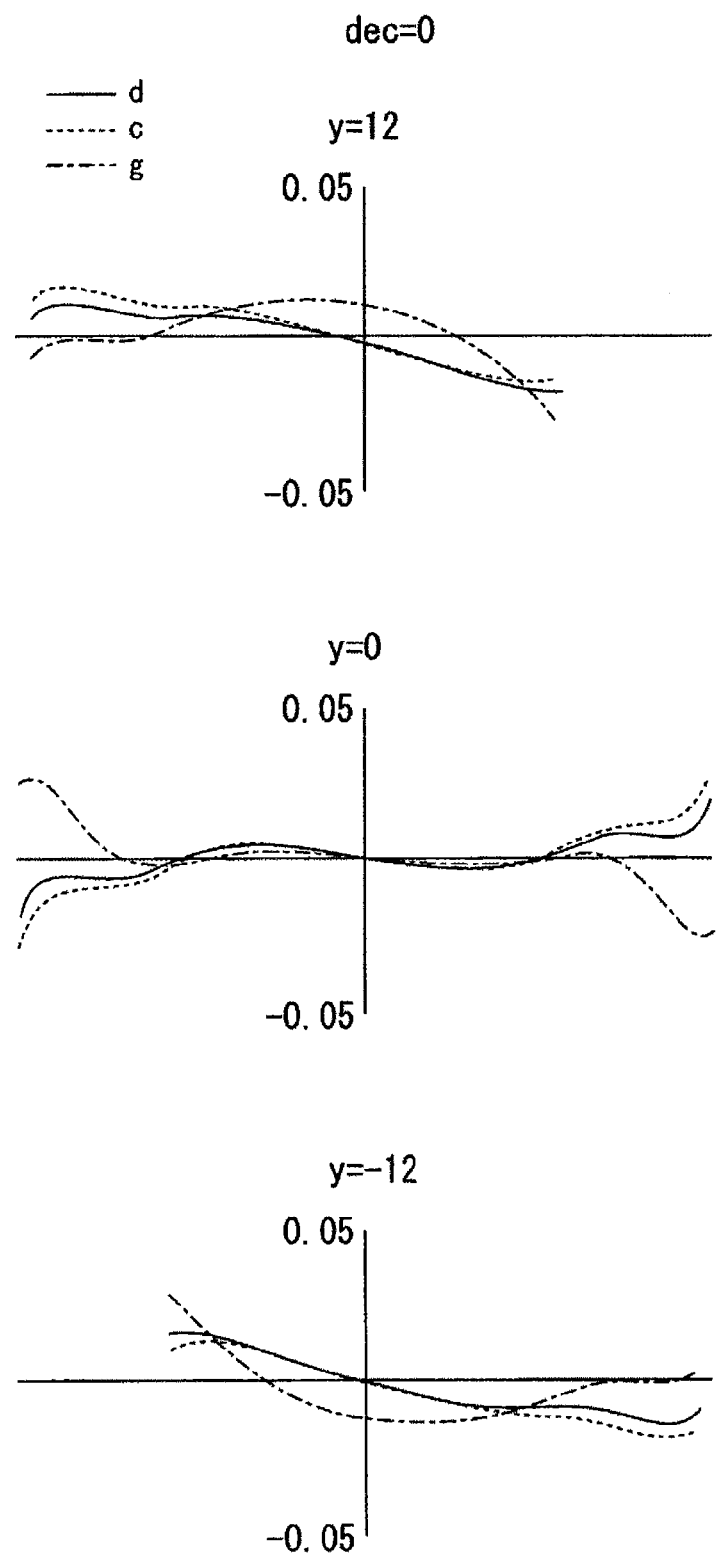
FIG. 11 is a view illustrating lateral aberration when shake correction is not performed in the telephoto end state.
Figure 13:
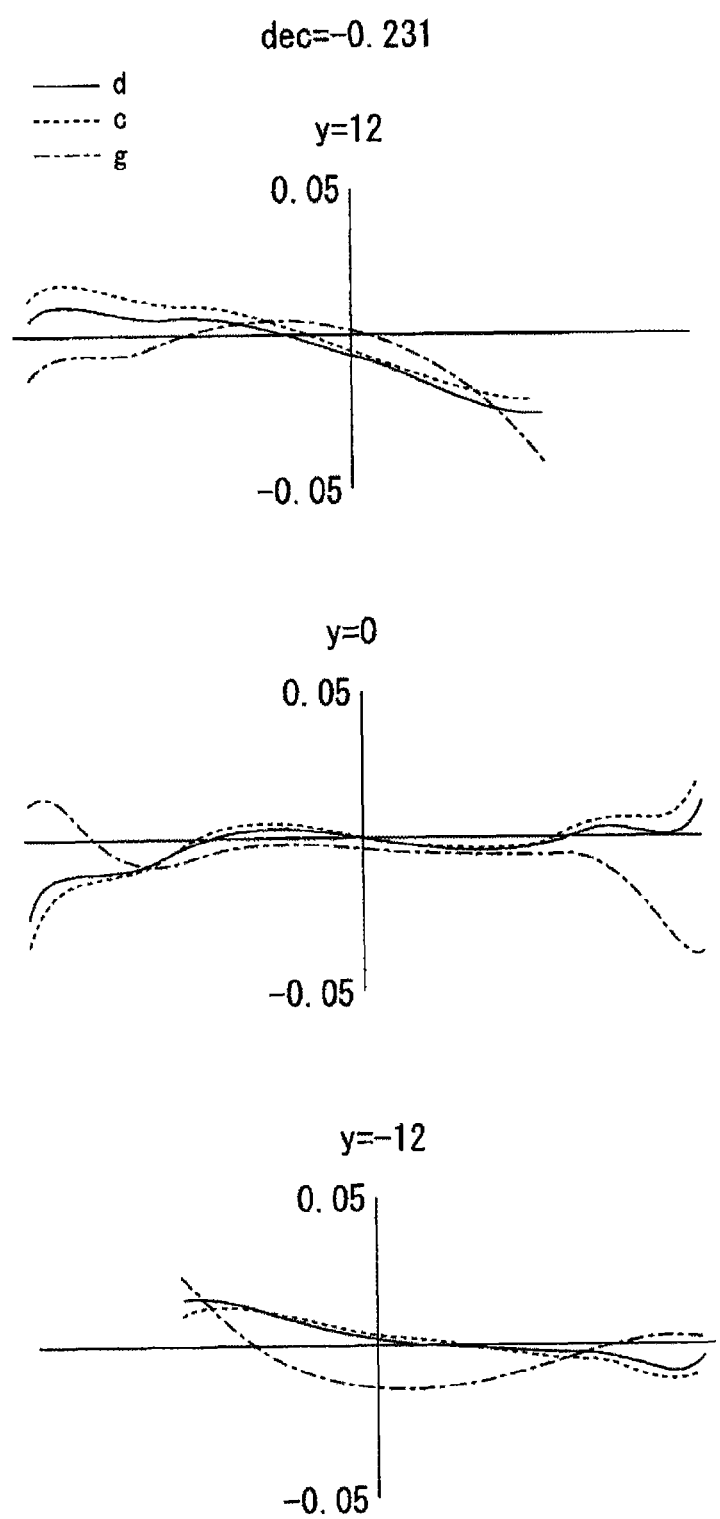
FIG. 13 is a view illustrating lateral aberration when shake correction is performed in the other direction in the telephoto end state.

FIG. 11 is a lateral aberration view when shake correction is not performed in the telephoto end state, FIG. 12 is a lateral aberration view when shake correction is performed in one direction in the telephoto end state, and FIG. 13 is a lateral aberration view when shake correction is performed in the other direction in the telephoto end state.

As apparent from each aberration diagram, all aberrations are successfully corrected and superior image forming performance is achieved in numerical value embodiment 1.

<Second Embodiment>

Figure 14:
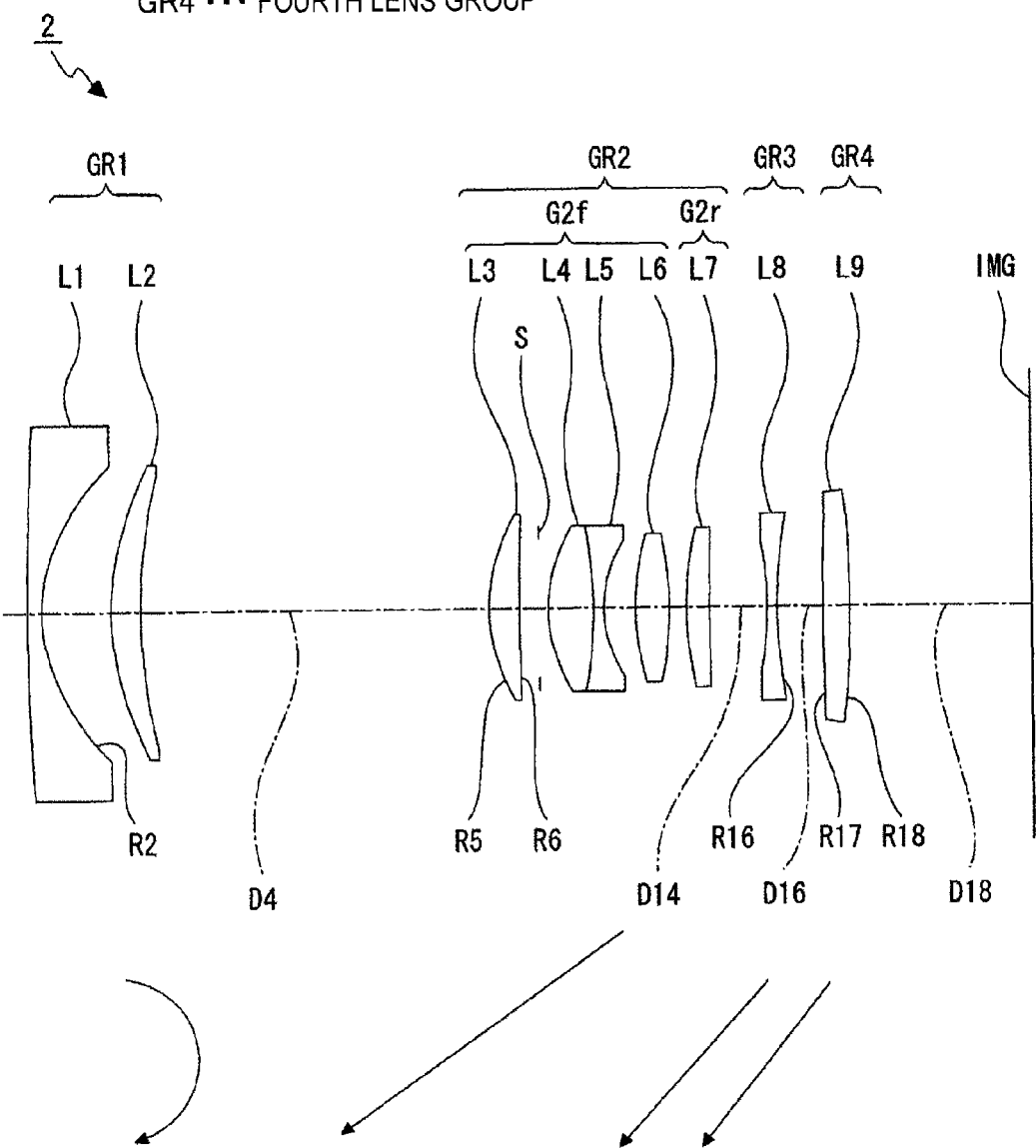
FIG. 14 is a view illustrating the lens configuration of a zoom lens in a second embodiment.

FIG. 14 illustrates the lens configuration of the zoom lens 2 according to the second embodiment of the present technology.

The zoom lens 2 has a magnification ratio set to 2.94 times.

When magnification is changed between the wide angle end state and the telephoto end state in the zoom lens 2, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a positive meniscus lens whose convex surface faces the object side.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 4 shows lens data in the numerical value embodiment 2 in which detailed numerical values are applied to the zoom lens 2 according to the second embodiment.

TABLE 4

| Surface Number | R | D | N | ν |
|---|---|---|---|---|
| 1 | 222.856 | 1.080 | 1.88300 | 40.80 |
| 2 (ASP) | 13.144 | 5.129 | | |
| 3 | 23.358 | 2.066 | 2.00272 | 19.32 |
| 4 | 40.451 | (D4) | | |
| 5 (ASP) | 13.236 | 2.254 | 1.69350 | 53.20 |
| 6 (ASP) | 199.000 | 1.500 | | |
| 7 | Infinity | 0.603 | | |
| 8 | 11.768 | 3.346 | 1.49700 | 81.61 |
| 9 | −26.834 | 0.700 | 1.83400 | 37.34 |
| 10 | 9.476 | 2.302 | | |
| 11 | 20.302 | 2.500 | 1.48749 | 70.44 |
| 12 | −26.661 | 1.350 | | |
| 13 | 28.027 | 1.550 | 1.48749 | 70.44 |
| 14 | 177.704 | (D14) | | |
| 15 | −29.838 | 0.790 | 1.69680 | 55.46 |
| 16 (ASP) | 41.776 | (D16) | | |
| 17 (ASP) | 106.007 | 2.103 | 1.80610 | 40.73 |
| 18 (ASP) | −77.857 | (D18) | | |

In the zoom lens 2, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 2 are shown in Table 5 together with the conic constant κ.

TABLE 5

| Surface Number | κ | A4 | A6 | A8 | A10 |
|---|---|---|---|---|---|
| 2 | −0.028720073 | −1.9428E−05 | −2.3338E−07 | 1.2218E−09 | −1.2032E−11 |
| 5 | 0 | −5.2082E−06 | −3.9851E−07 | 1.1483E−08 | −1.8808E−10 |
| 6 | 0 | 6.9720E−06 | −2.6694E−07 | 6.7233E−09 | −1.3501E−10 |
| 16 | 0.143949144 | 2.1880E−05 | 7.9266E−07 | −2.6969E−08 | 3.0251E−10 |
| 17 | 0 | −9.0000E−05 | 1.3085E−06 | −9.2491E−09 | 5.4608E−11 |
| 18 | 0 | −8.0748E−05 | 8.5592E−07 | −4.3070E−09 | 3.1387E−11 |

When magnification is changed between the wide angle end state and the telephoto end state in the zoom lens 2, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 2 are shown in Table 6 together with the F number Fno, the focal distance f, and the half-angle of view ω.

TABLE 6

|     | Wide Angle End | Intermediate Focal Distance | Telephoto End |
|-----|---------------|----------------------------|---------------|
| Fno | 3.61 | 4.76 | 5.77 |
| f   | 16.48 | 28.20 | 48.50 |
| ω   | 39.65 | 23.62 | 13.86 |
| D4  | 25.530 | 11.003 | 0.800 |
| D14 | 4.151 | 4.959 | 9.242 |
| D16 | 3.277 | 5.199 | 6.410 |
| D18 | 13.271 | 20.955 | 29.662 |

Figure 15:
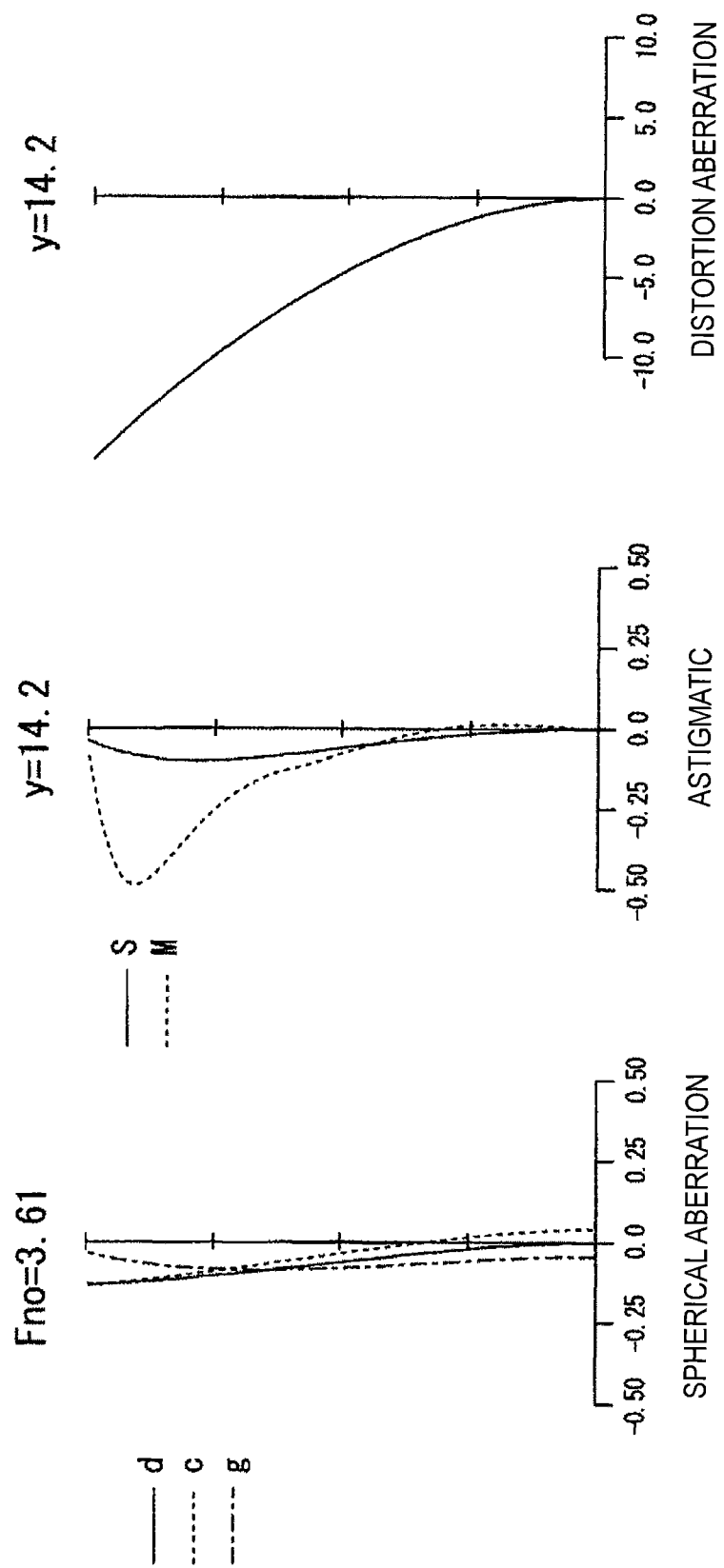
FIG. 15, as with FIGS. 16 and 26, is an aberration view illustrating a numerical value embodiment in which detailed numerical values are applied to the second embodiment, and more particularly illustrating spherical aberration, astigmatism and distortion aberration in the wide angle end state.
Figure 16:
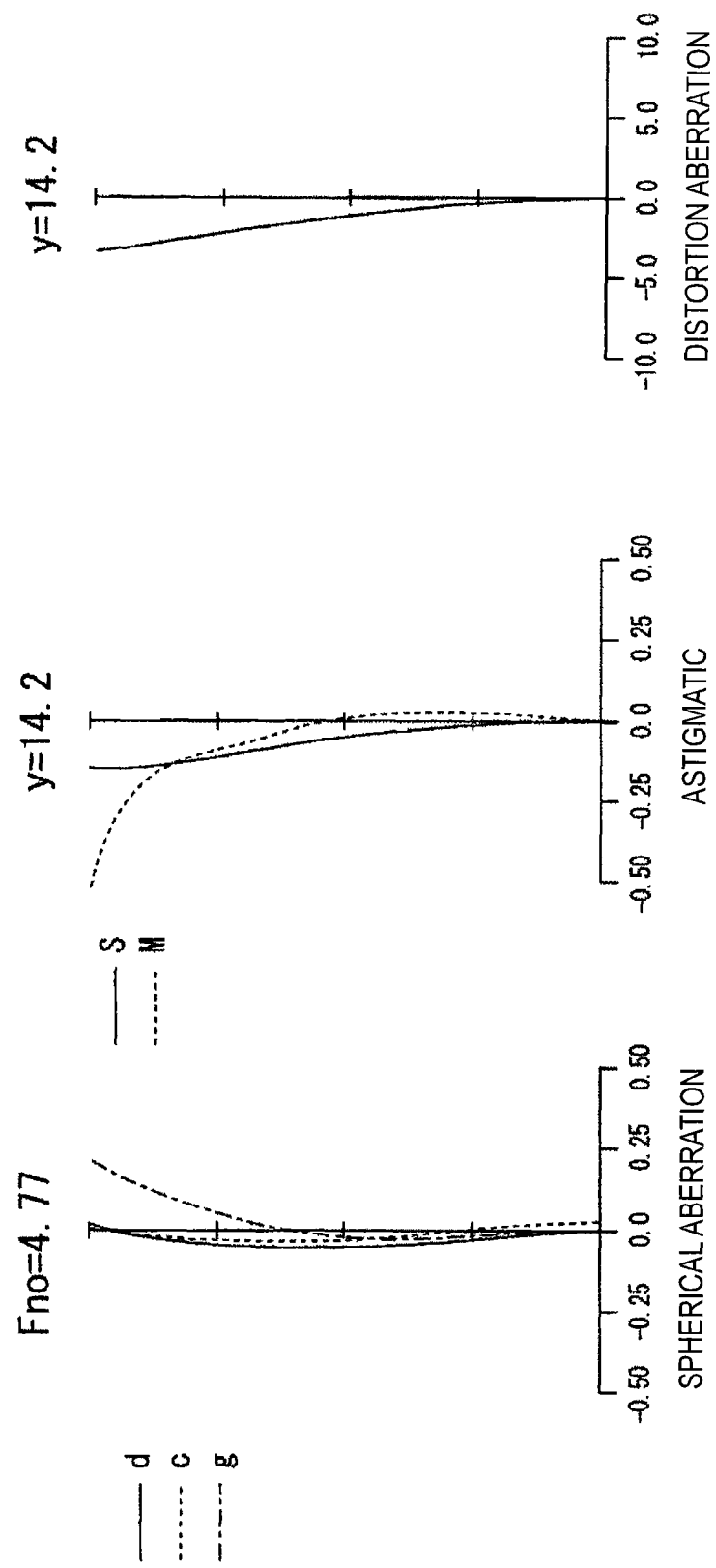
FIG. 16 is a view illustrating spherical aberration, astigmatism, and distortion aberration in the intermediate focal distance state.
Figure 17:
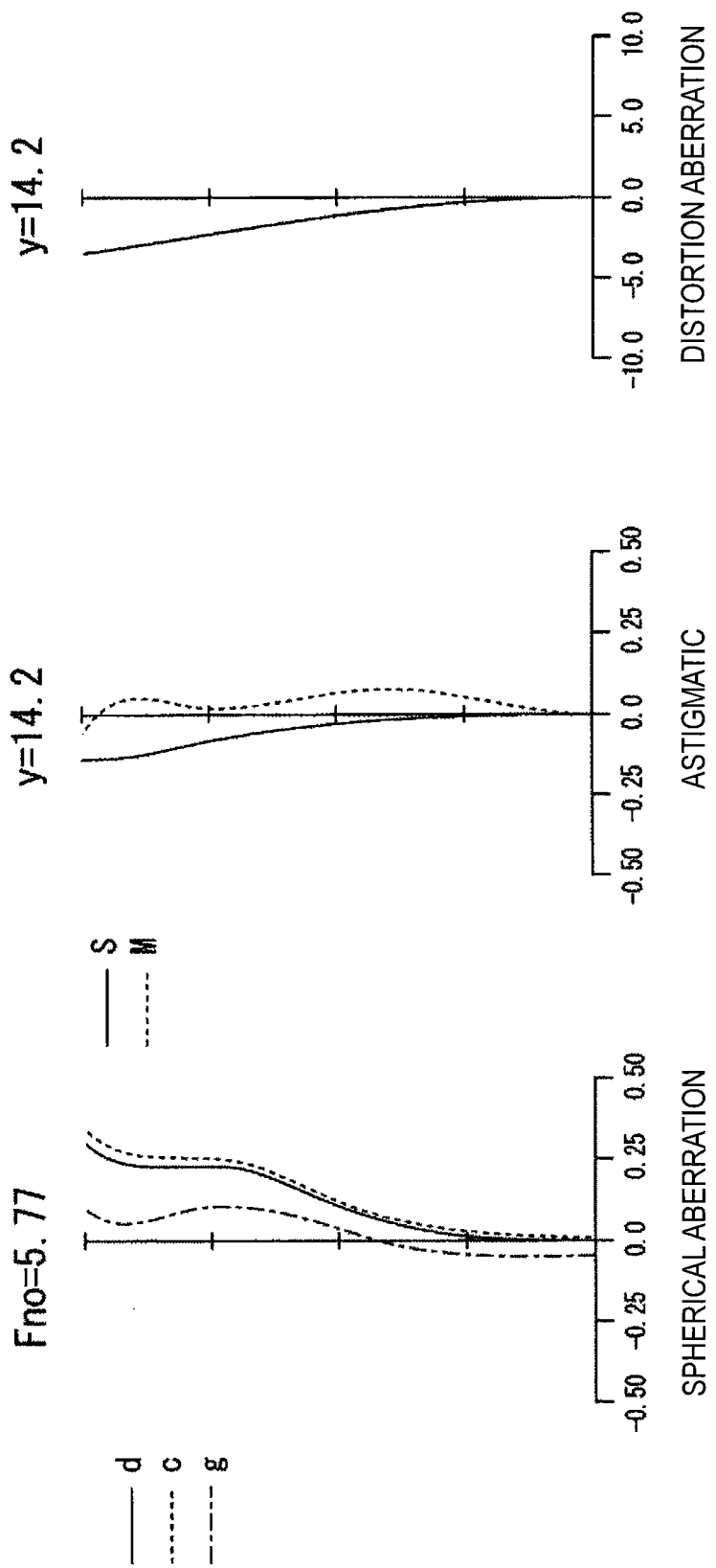
FIG. 17 is a view illustrating spherical aberration, astigmatism, and distortion aberration in the telephoto end state.

FIGS. 15 to 17 are views showing various aberrations in the infinity focus state in the numerical value embodiment 2, in which FIG. 15 illustrates various aberrations in the wide angle end state, FIG. 16 illustrates various aberrations in the intermediate focal distance state, and FIG. 17 illustrates various aberrations in the telephoto end state.

In FIGS. 15 to 17, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

FIGS. 18 to 26 are various aberrations views in the infinity focus state in the numerical value embodiment 2. In FIGS. 18 to 26, dec represents an eccentricity correction amount. In FIGS. 18 to FIG. 26, a solid line, a dotted line and an alternate long and short dash line represent a value in the d line (587.56 nm), a value in the C line (wavelength of 656.3 nm), and a value in the g line (wavelength of 435.8 nm), respectively.

Figure 18:
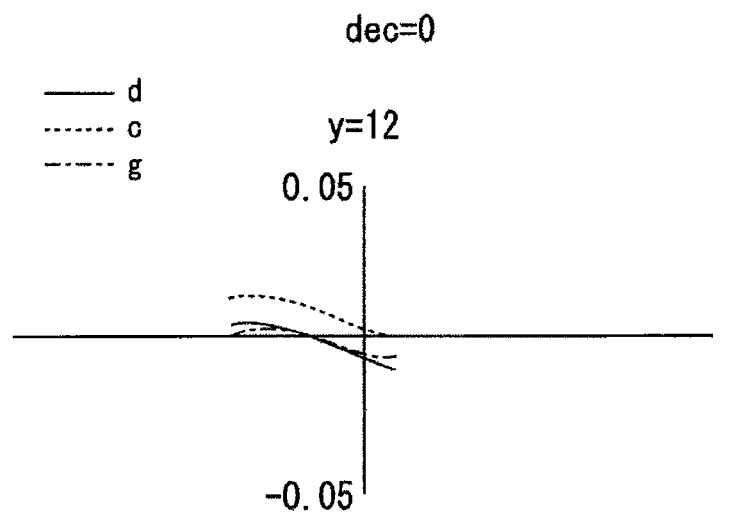
FIG. 18 is a view illustrating lateral aberration when shake correction is not performed in the wide angle end state.
Figure 18:
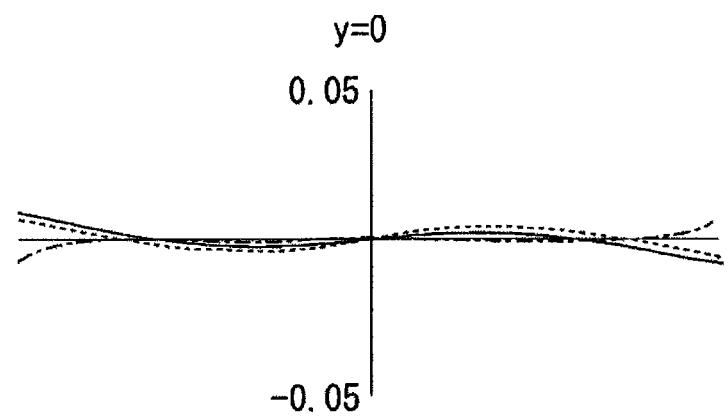
Figure 18:
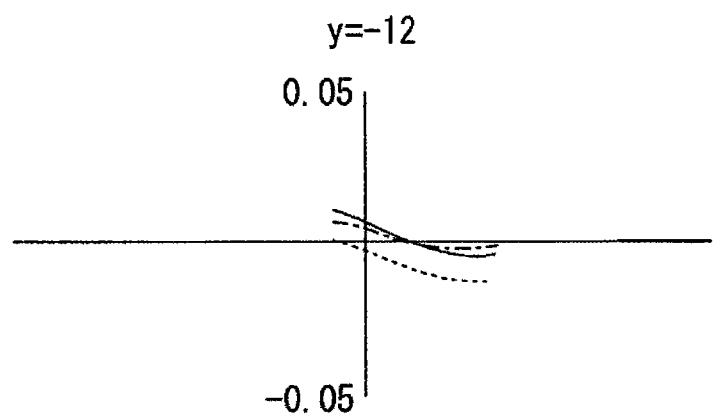
Figure 19:
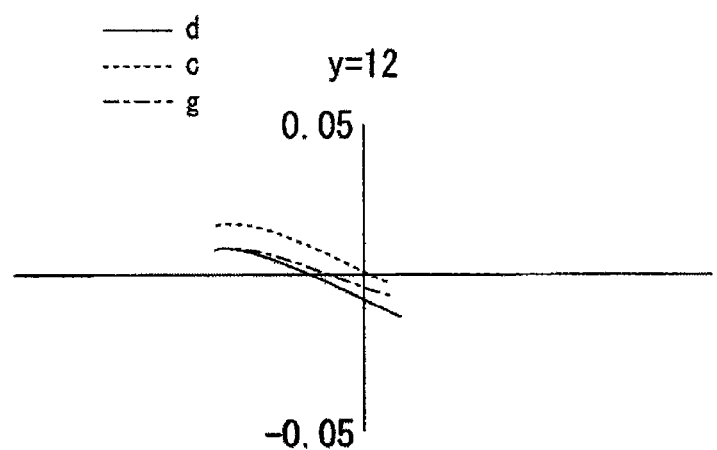
FIG. 19 is a view illustrating lateral aberration when shake correction is performed in one direction in the wide angle end state.
Figure 19:
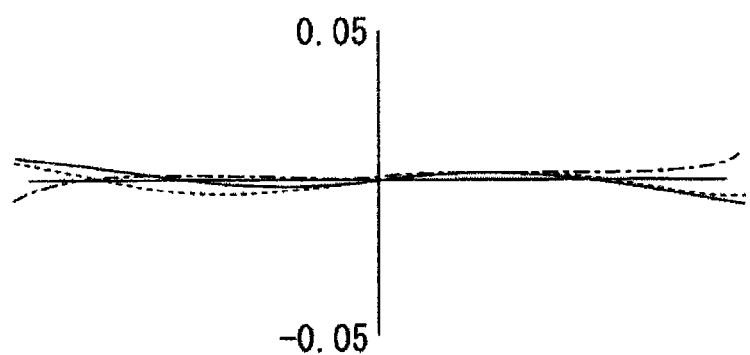
Figure 19:
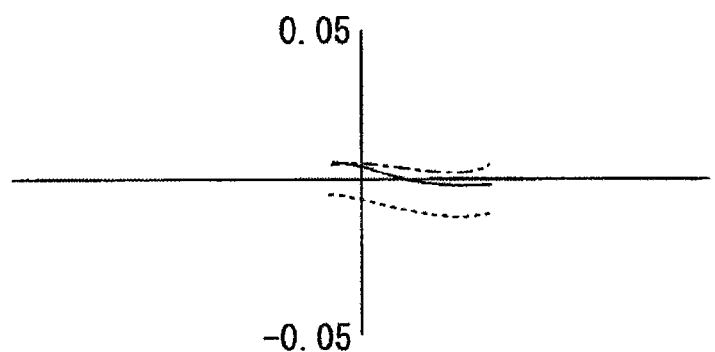
Figure 20:
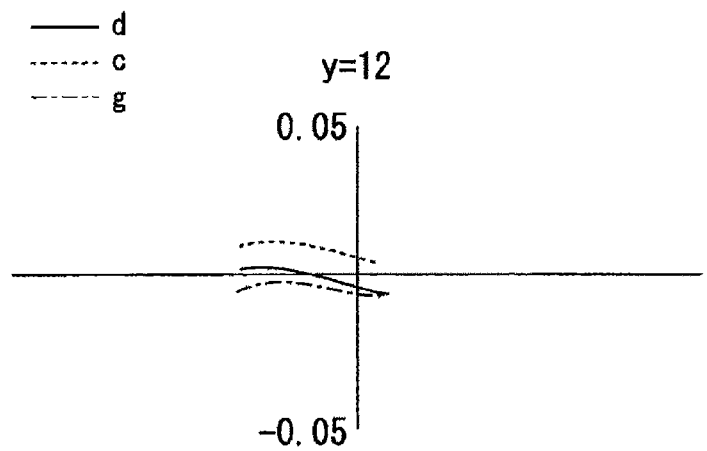
FIG. 20 is a view illustrating lateral aberration when shake correction is performed in the other direction in the wide angle end state.
Figure 20:
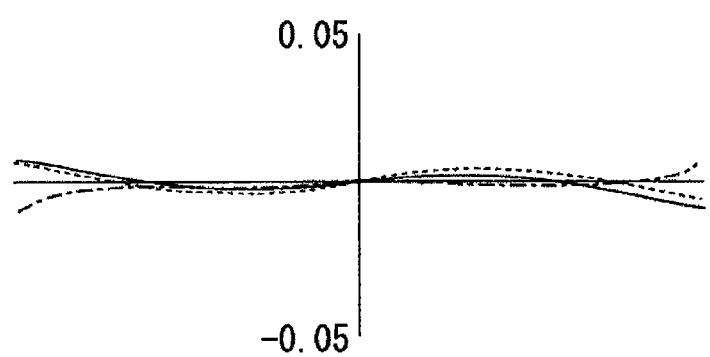
Figure 20:
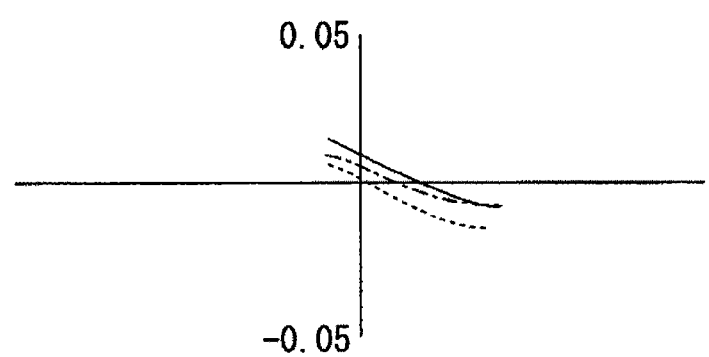

FIG. 18 is a lateral aberration view when shake correction is not performed in the wide angle end state, FIG. 19 is a lateral aberration view when shake correction is performed in one direction in the wide angle end state, and FIG. 20 is a lateral aberration view when shake correction is performed in the other direction in the wide angle end state.

Figure 21:
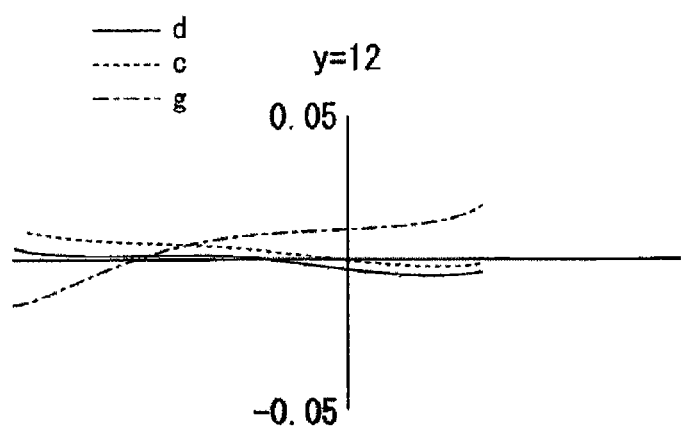
FIG. 21 is a view illustrating lateral aberration when shake correction is not performed in the intermediate focal distance state.
Figure 21:
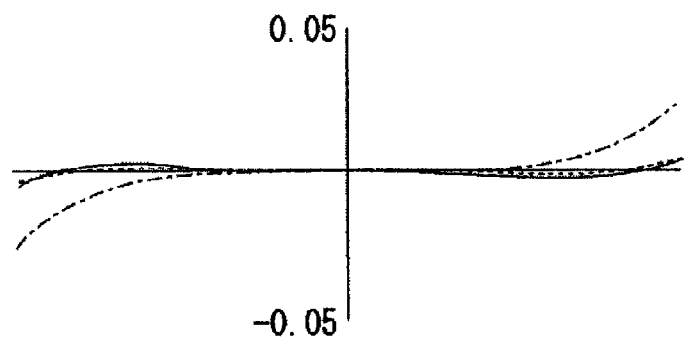
Figure 21:
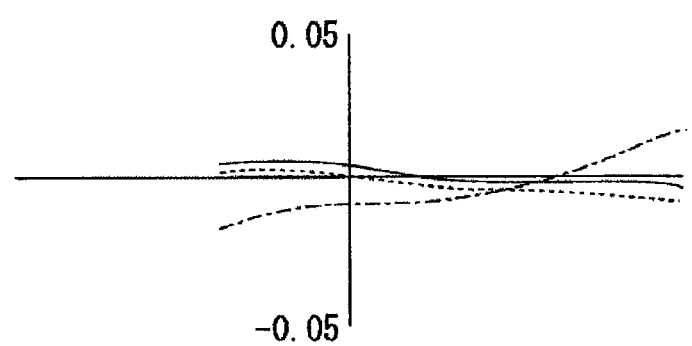
Figure 22:
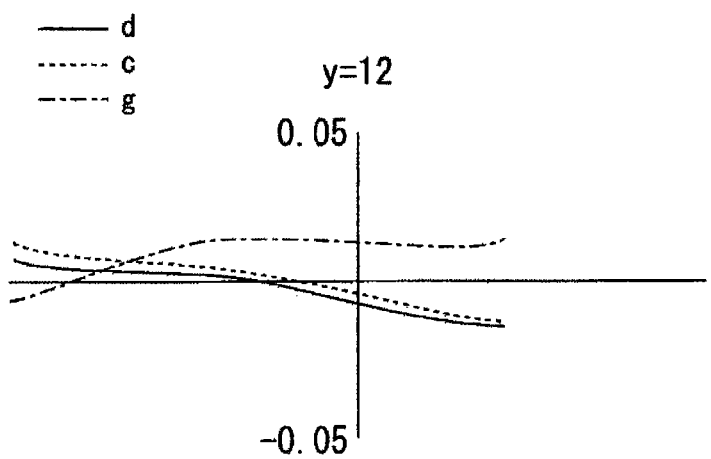
FIG. 22 is a view illustrating lateral aberration when shake correction is performed in one direction in the intermediate focal distance state.
Figure 22:
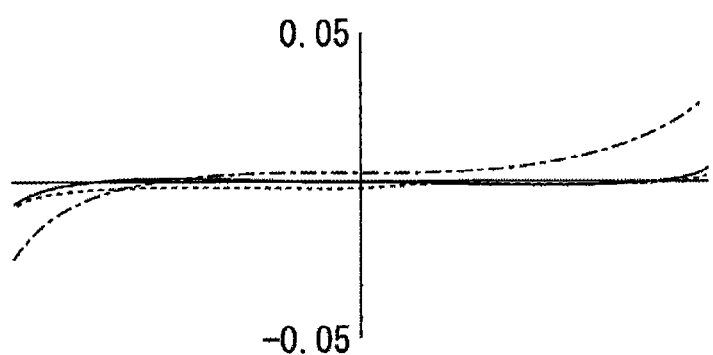
Figure 22:
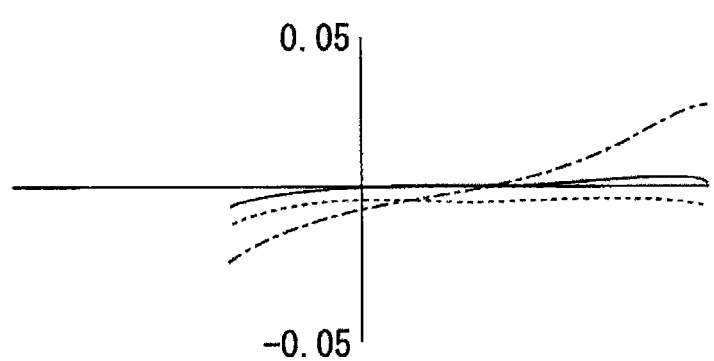
Figure 23:
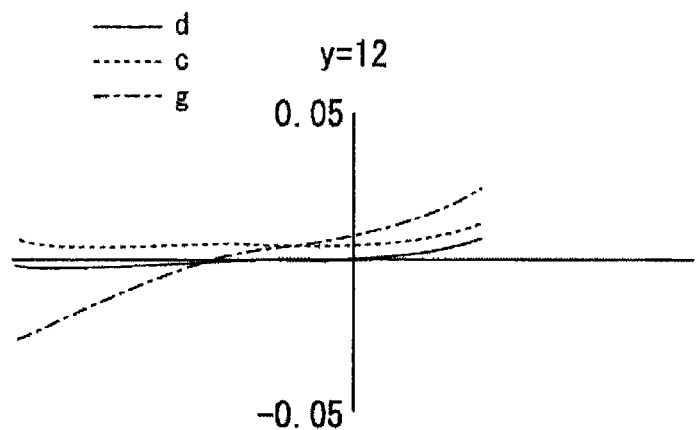
FIG. 23 is a view illustrating lateral aberration when shake correction is performed in the other direction in the intermediate focal distance state.
Figure 23:
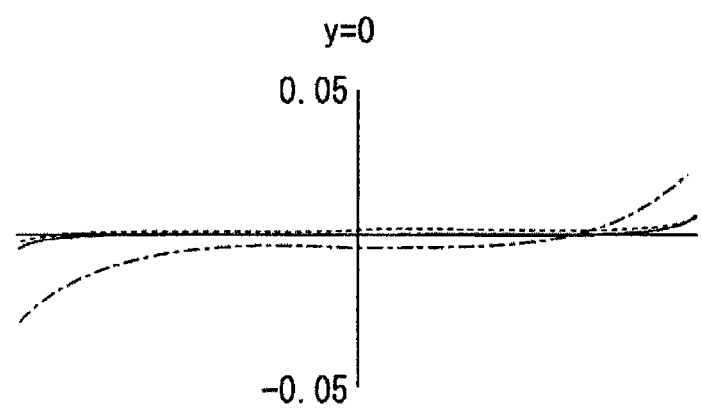
Figure 23:
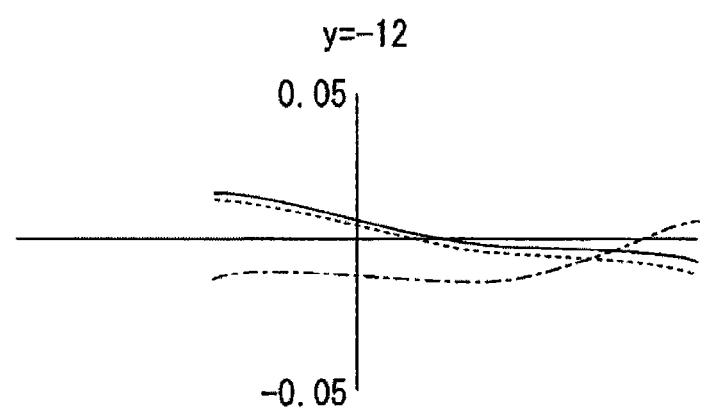

FIG. 21 is a lateral aberration view when shake correction is not performed in the intermediate focal distance state, FIG. 22 is a lateral aberration view when shake correction is performed in one direction in the intermediate focal distance state, and FIG. 23 is a lateral aberration view when shake correction is performed in the other direction in the intermediate focal distance state.

Figure 24:
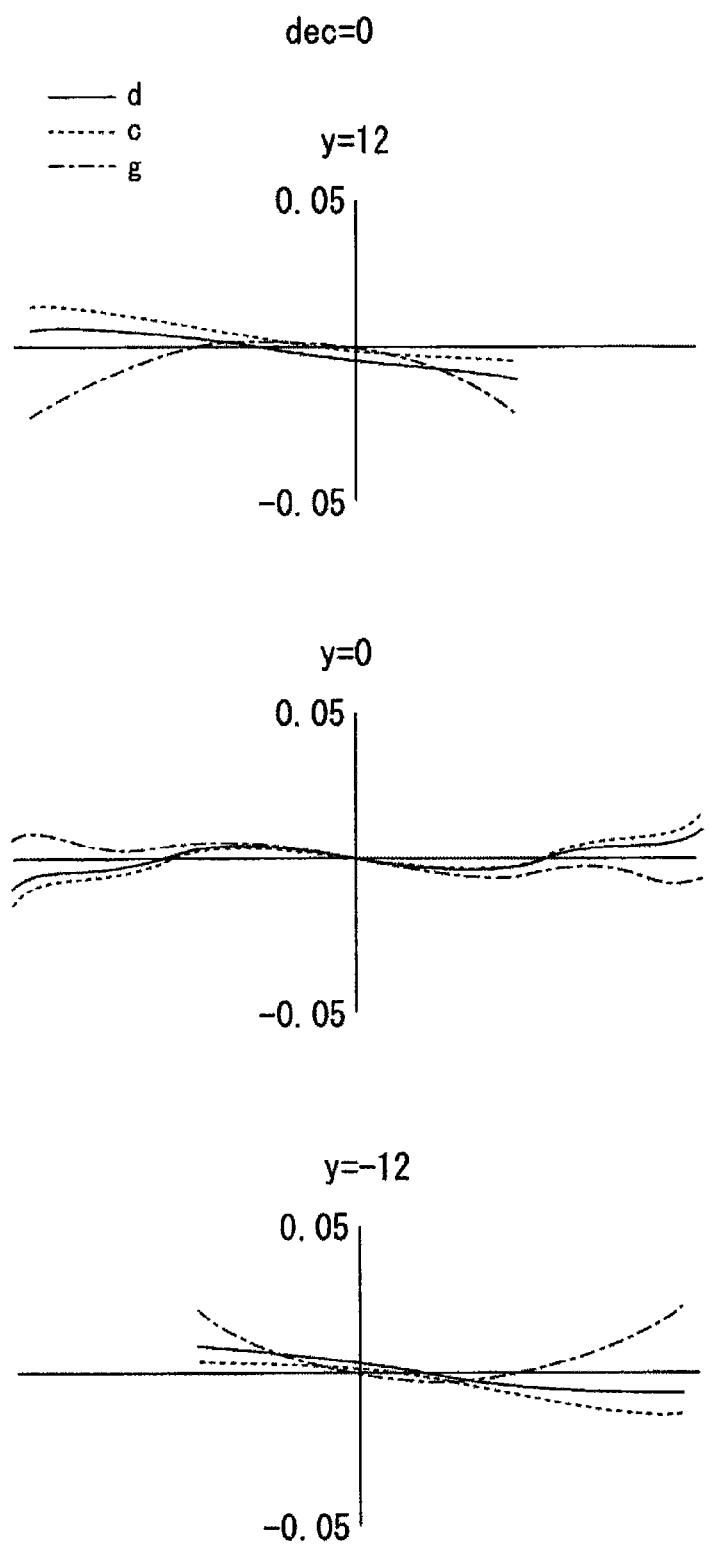
FIG. 24 is a view illustrating lateral aberration when shake correction is not performed in the telephoto end state.
Figure 26:
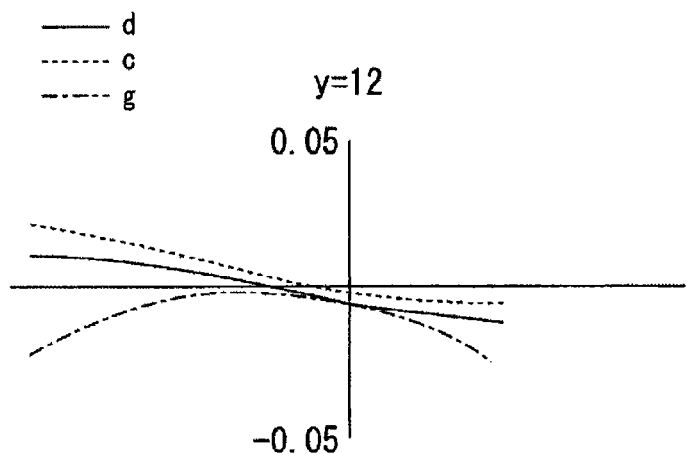
FIG. 26 is a view illustrating lateral aberration when shake correction is performed in the other direction in the telephoto end state.
Figure 26:
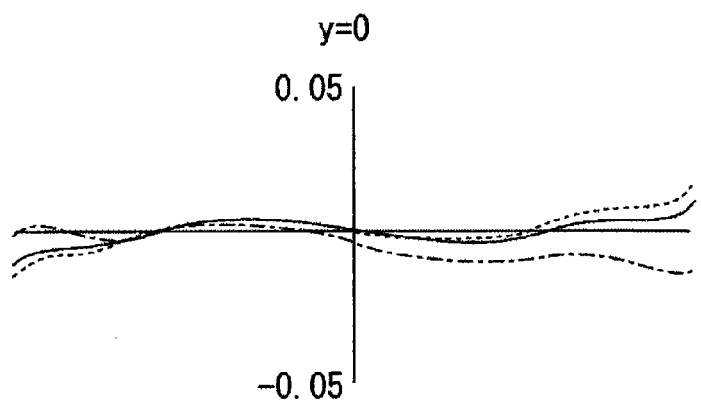
Figure 26:
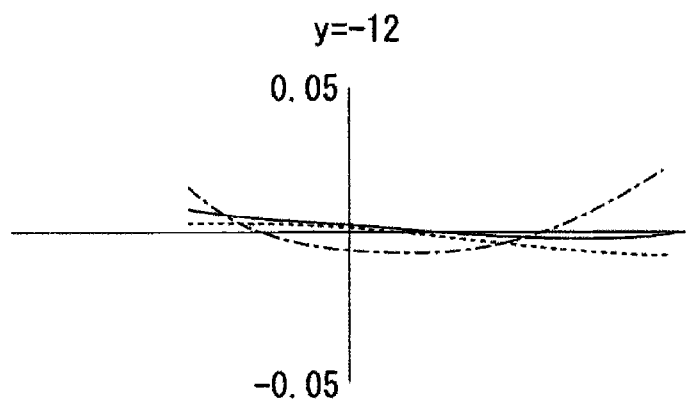

FIG. 24 is a lateral aberration view when shake correction is not performed in the telephoto end state, FIG. 25 is a lateral aberration view when shake correction is performed in one direction in the telephoto end state, and FIG. 26 is a lateral aberration view when shake correction is performed in the other direction in the telephoto end state.

As apparent from each aberration diagram, all aberrations are successfully corrected and superior image forming performance is achieved in numerical value embodiment 2.

<Third Embodiment>

Figure 27:
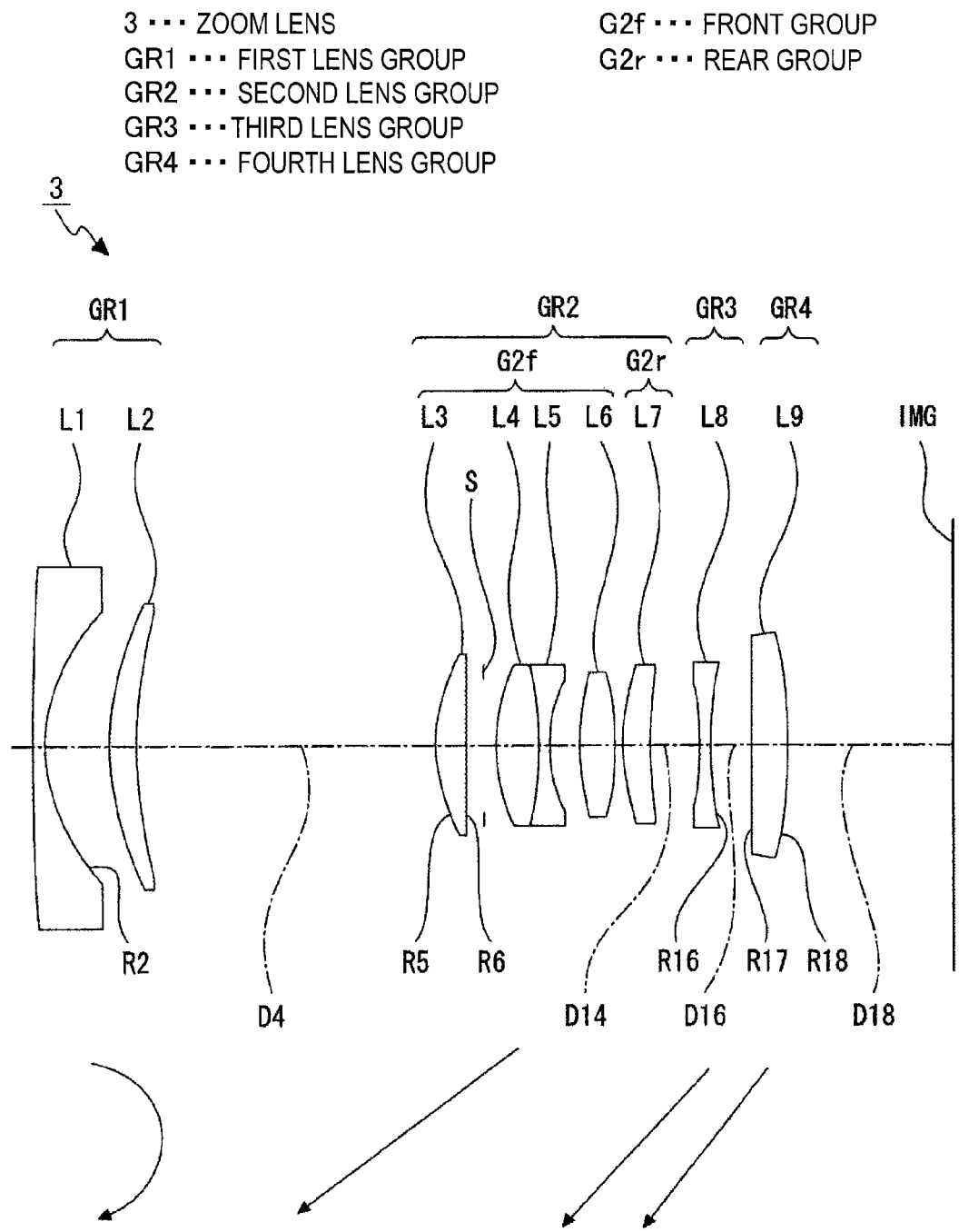
FIG. 27 is a view illustrating the lens configuration of a zoom lens in a third embodiment.

FIG. 27 illustrates the lens configuration of a zoom lens 3 according to the third embodiment of the present technology.

The zoom lens 3 has a magnification ratio set to 2.95 times.

When magnification is changed between the wide angle end state and the telephoto end state in the zoom lens 3, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a positive meniscus lens whose convex surface faces the object side.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 7 shows lens data in the numerical value embodiment 3 in which detailed numerical values are applied to the zoom lens 3 according to the third embodiment.

TABLE 7

| Surface Number | R | D | N | ν |
|---------------|---|---|---|---|
| 1 | 252.042 | 0.900 | 1.88300 | 40.80 |
| 2 (ASP) | 13.051 | 4.982 | | |
| 3 | 23.082 | 2.030 | 2.00272 | 19.32 |
| 4 | 39.631 | (D4) | | |
| 5 (ASP) | 13.322 | 2.289 | 1.69350 | 53.20 |
| 6 (ASP) | 500.000 | 1.500 | | |
| 7 | Infinity | 0.807 | | |
| 8 | 13.379 | 3.311 | 1.49700 | 81.61 |
| 9 | −22.314 | 0.700 | 1.83400 | 37.34 |
| 10 | 10.047 | 2.304 | | |
| 11 | 19.300 | 2.834 | 1.48749 | 70.44 |
| 12 | −17.847 | 0.500 | | |
| 13 | 20.527 | 2.000 | 1.48749 | 70.44 |
| 14 | 37.448 | (D14) | | |
| 15 | −23.792 | 0.790 | 1.69680 | 55.46 |
| 16 (ASP) | 33.341 | (D16) | | |
| 17 (ASP) | 460.205 | 2.800 | 1.80610 | 40.73 |
| 18 (ASP) | −44.425 | (D18) | | |

In the zoom lens 3, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 3 are shown in Table 8 together with the conic constant κ.

TABLE 8

| SurfaceNumber | κ | A4 | A6 | A8 | A10 |
|---|---|---|---|---|---|
| 2 | −0.068595226 | −1.6373E−05 | −2.2102E−07 | 1.1605E−09 | −1.0927E−11 |
| 5 | 0 | −4.2029E−06 | −4.7644E−07 | 1.4891E−08 | −1.8091E−10 |
| 6 | 0 | 1.4546E−05 | −3.1972E−07 | 1.0536E−08 | −1.4041E−10 |
| 16 | 0.722868887 | 2.4690E−05 | 5.4539E−07 | −2.0353E−08 | 2.6505E−10 |
| 17 | 0 | −8.7087E−05 | 1.5948E−06 | −1.8007E−08 | 1.2184E−10 |
| 18 | 0 | −7.5992E−05 | 1.0346E−06 | −1.0379E−08 | 6.8995E−11 |

When magnification is changed between the wide angle end state and the telephoto end state in the zoom lens 3, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 3 are shown in Table 9 together with the F number Fno, the focal distance f, and the half-angle of view ω.

TABLE 9

|  | Wide Angle End | Intermediate Focal Distance | Telephoto End |
|---|---|---|---|
| Fno | 3.62 | 4.75 | 5.94 |
| f | 16.48 | 28.20 | 48.55 |
| ω | 45.79 | 27.34 | 16.17 |
| D4 | 25.328 | 10.764 | 0.800 |
| D14 | 3.756 | 4.942 | 8.200 |
| D16 | 3.168 | 5.089 | 6.410 |
| D18 | 13.399 | 20.121 | 29.819 |

Figure 28:
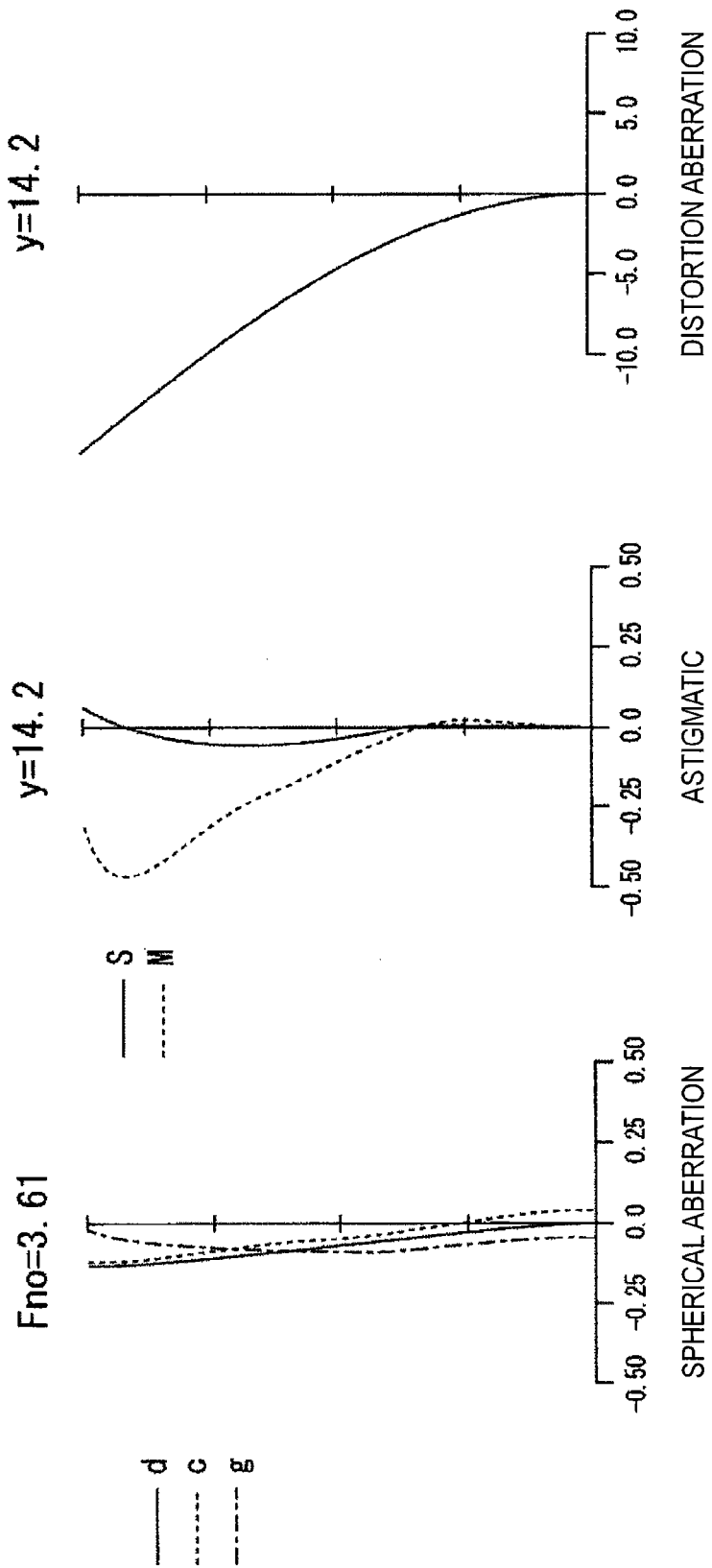
FIG. 28, as with FIGS. 29 and 30, is an aberration view illustrating a numerical value embodiment in which detailed numerical values are applied to the third embodiment, and more particularly illustrating spherical aberration, astigmatism and distortion aberration in the wide angle end state.
Figure 29:
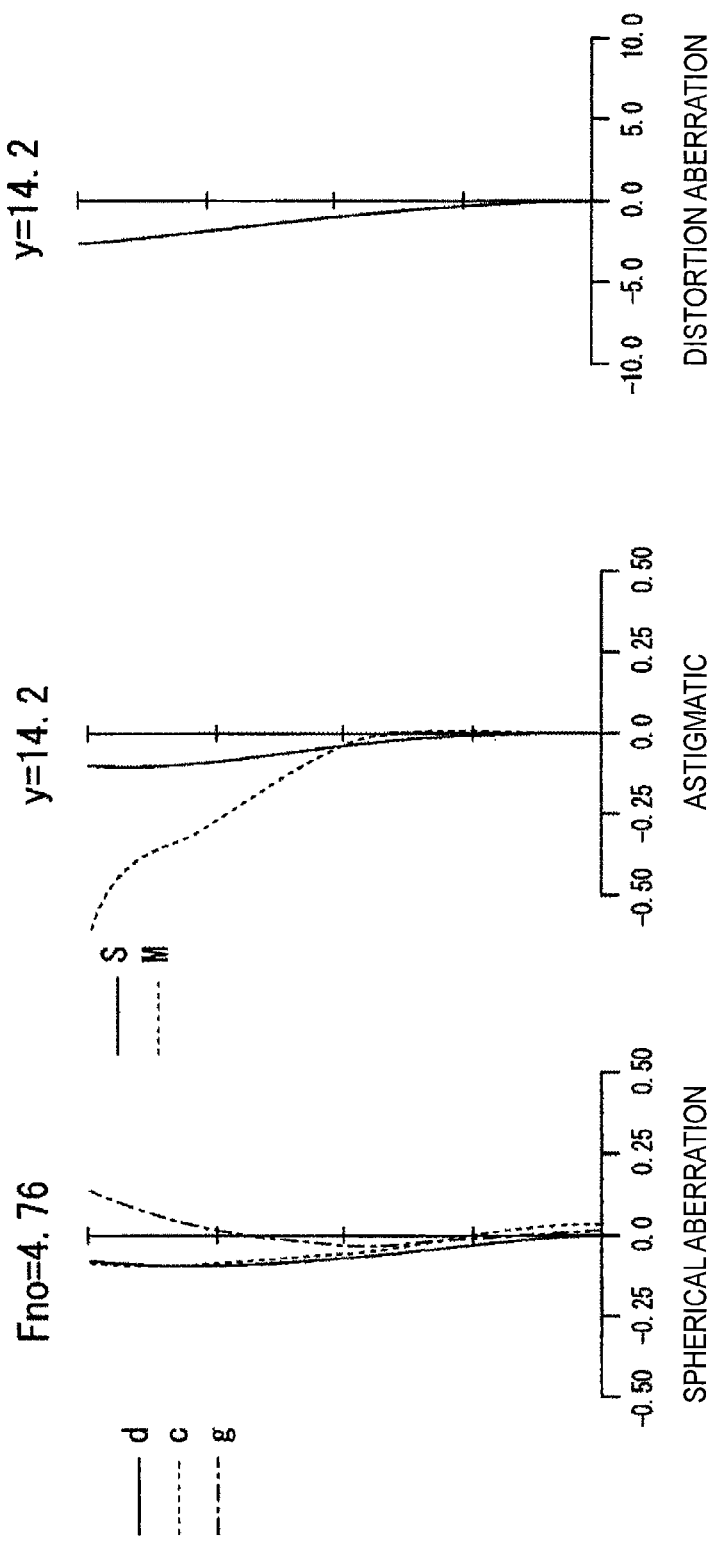
FIG. 29 is a view illustrating spherical aberration, astigmatism, and distortion aberration in the intermediate focal distance state.
Figure 30:
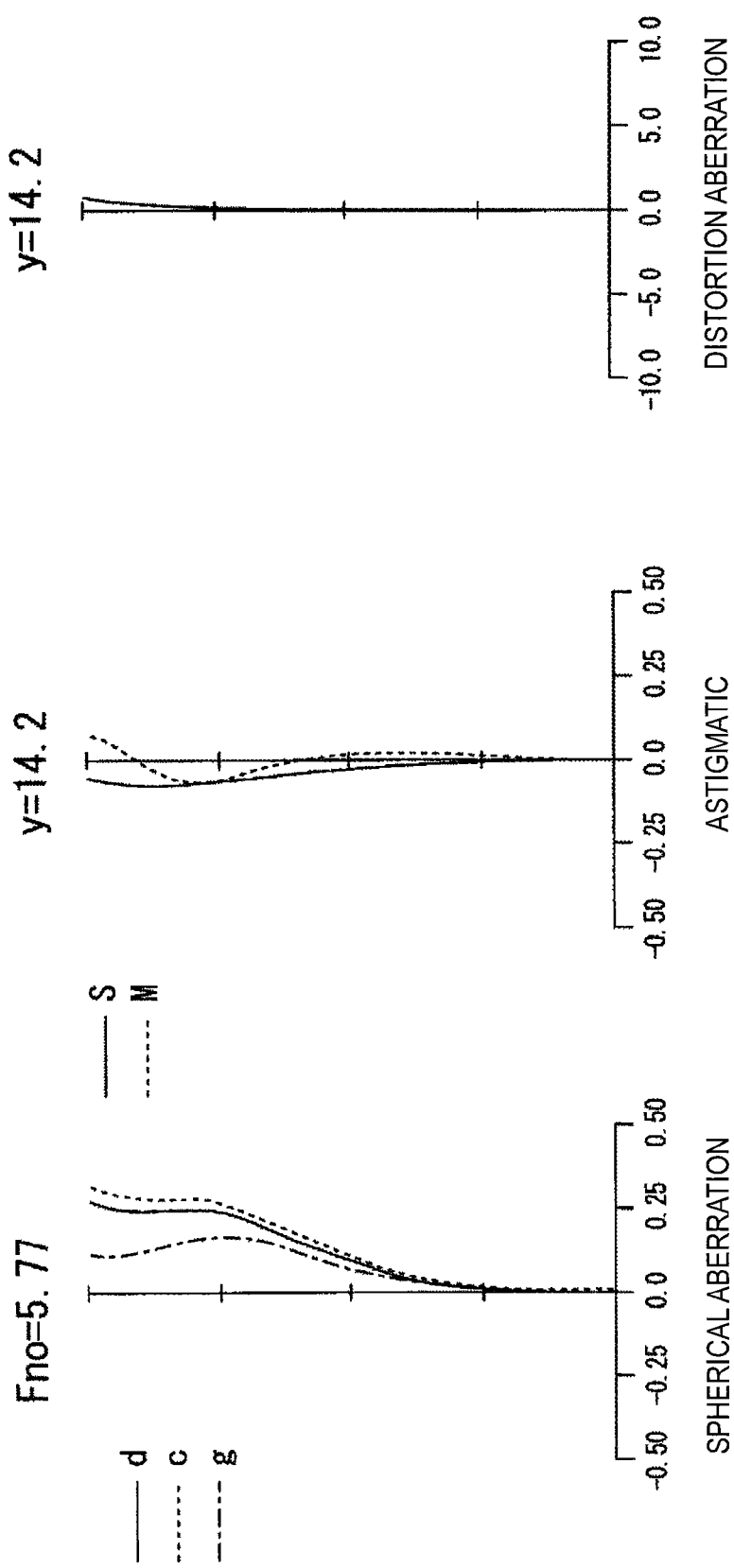
FIG. 30 is a view illustrating spherical aberration, astigmatism, and distortion aberration in the telephoto end state.

FIGS. 28 to 30 are views showing various aberrations in the infinity focus state in the numerical value embodiment 3, in which FIG. 28 illustrates various aberrations in the wide angle end state, FIG. 29 illustrates various aberrations in the intermediate focal distance state, and FIG. 30 illustrates various aberrations in the telephoto end state.

In FIGS. 28 to 30, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 3.

<Fourth Embodiment>

Figure 31:
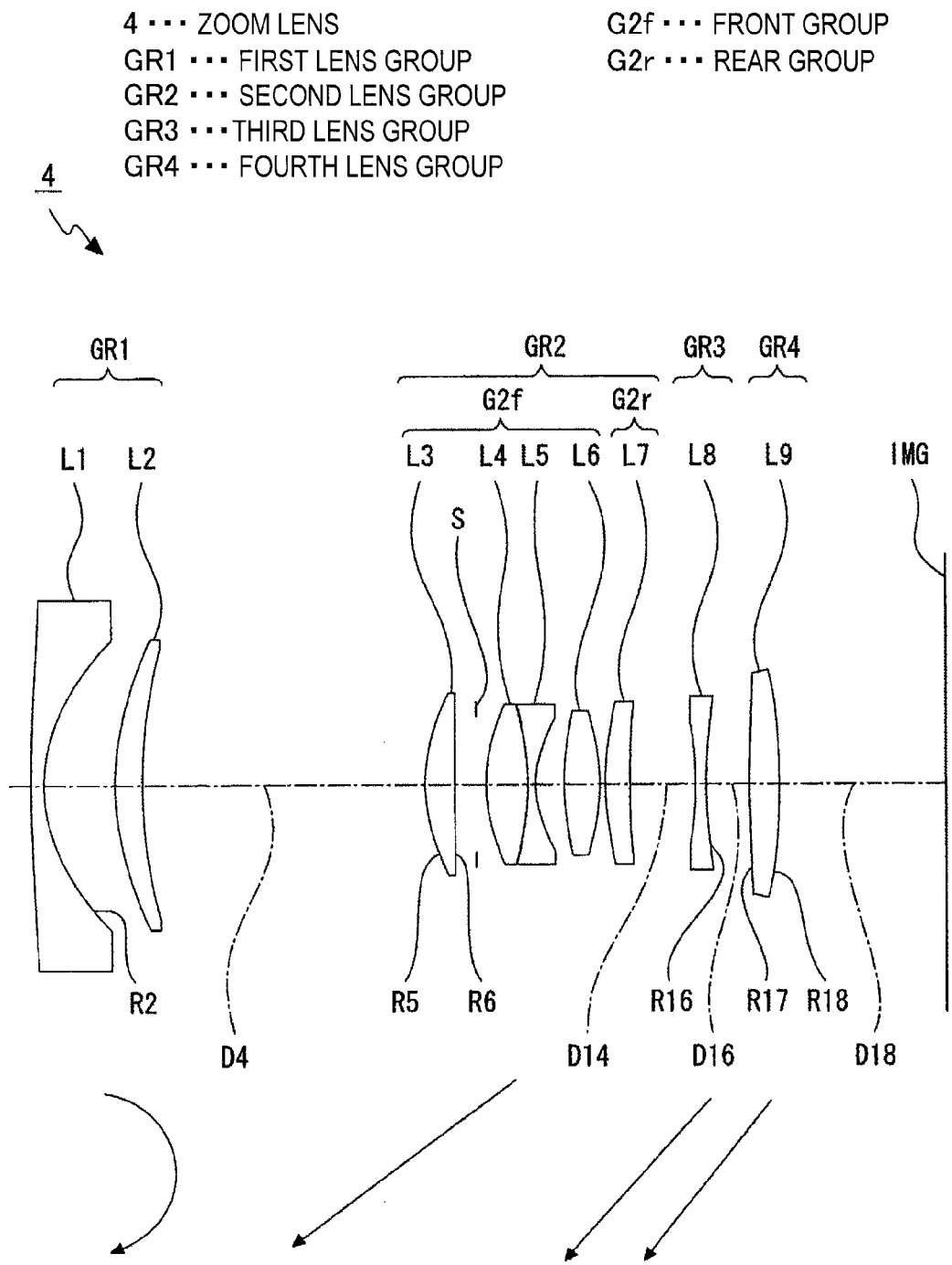
FIG. 31 is a view illustrating the lens configuration of a zoom lens in a fourth embodiment.

FIG. 31 illustrates the lens configuration of a zoom lens 4 according to the fourth embodiment of the present technology.

The zoom lens 4 has a magnification ratio set to 2.94 times.

When magnification is changed between the wide angle end state and the telephoto end state in the zoom lens 4, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a positive meniscus lens whose convex surface faces the object side.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 10 shows lens data in the numerical value embodiment 4 in which detailed numerical values are applied to the zoom lens 4 according to the first embodiment.

TABLE 10

| Surface Number | R | D | N | ν |
|---|---|---|---|---|
| 1 | 207.145 | 0.900 | 1.88300 | 40.80 |
| 2 (ASP) | 12.897 | 5.460 |  |  |
| 3 | 23.870 | 2.008 | 2.00272 | 19.32 |
| 4 | 41.783 | (D4) |  |  |
| 5 (ASP) | 13.282 | 2.292 | 1.69350 | 53.20 |
| 6 (ASP) | 500.000 | 1.500 |  |  |
| 7 | Infinity | 0.735 |  |  |
| 8 | 13.765 | 3.176 | 1.49700 | 81.61 |
| 9 | −22.381 | 0.700 | 1.83400 | 37.34 |
| 10 | 10.276 | 2.042 |  |  |
| 11 | 21.088 | 2.628 | 1.48749 | 70.44 |
| 12 | −17.983 | 0.500 |  |  |
| 13 | 27.193 | 1.756 | 1.48749 | 70.44 |
| 14 | 43.331 | (D14) |  |  |
| 15 | −25.957 | 0.790 | 1.69680 | 55.46 |
| 16 (ASP) | 49.562 | (D16) |  |  |
| 17 (ASP) | 105.052 | 2.192 | 1.80610 | 40.73 |
| 18 (ASP) | −76.458 | (D18) |  |  |

In the zoom lens 4, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 4 are shown in Table 11 together with the conic constant κ.

TABLE 11

| Surface Number | κ | A4 | A6 | A8 | A10 |
|---|---|---|---|---|---|
| 2 | −0.044265615 | −2.0512E−05 | −2.2485E−07 | 1.0226E−09 | −1.2101E−11 |
| 5 | 0 | −5.0324E−06 | −4.5168E−07 | 1.4687E−08 | −1.9964E−10 |
| 6 | 0 | 1.6363E−05 | −3.5851E−07 | 1.1849E−08 | −1.7724E−10 |
| 16 | −1 | 2.7873E−05 | 2.9409E−07 | −9.5449E−09 | 8.2000E−11 |
| 17 | 0 | −8.9886E−05 | 1.3122E−06 | −1.5327E−08 | 7.9689E−11 |
| 18 | 0 | −8.4462E−05 | 9.9251E−07 | −1.0816E−08 | 5.2171E−11 |

When magnification is changed between the wide angle end state and the telephoto end state in the zoom lens 4, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 4 are shown in Table 12 together with the F number Fno, the focal distance f, and the half-angle of view ω.

TABLE 12

|  | Wide Angle End | Intermediate Focal Distance | Telephoto End |
|---|---|---|---|
| Fno | 3.61 | 4.75 | 5.77 |
| f | 16.48 | 28.20 | 48.50 |
| ω | 45.88 | 27.54 | 16.29 |
| D4 | 25.220 | 10.814 | 0.800 |
| D14 | 4.998 | 6.068 | 10.564 |
| D16 | 3.277 | 5.072 | 6.410 |
| D18 | 13.326 | 20.698 | 28.946 |

Figure 32:
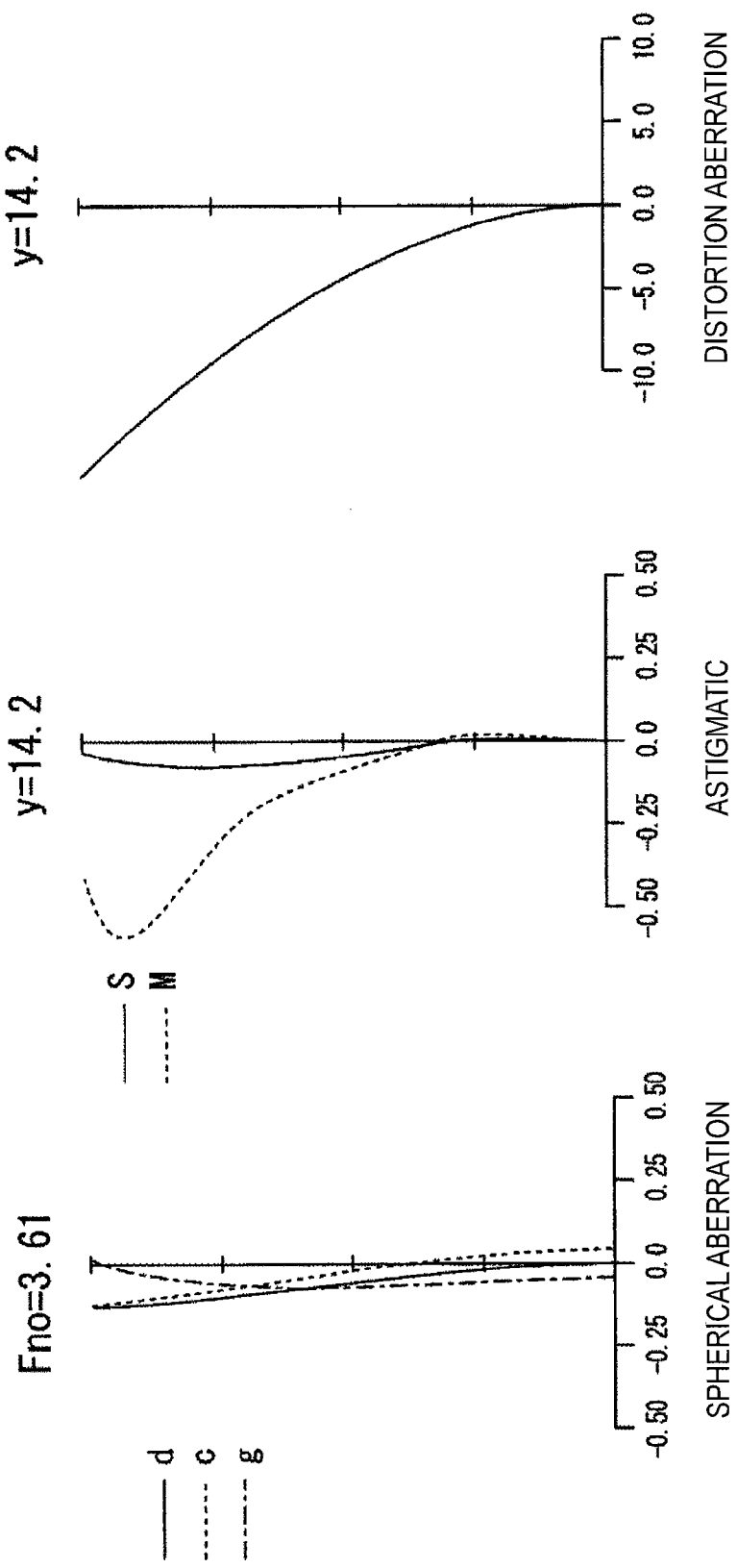
FIG. 32, as with FIGS. 33 and 34, is an aberration view illustrating a numerical value embodiment in which detailed numerical values are applied to the fourth embodiment, and more particularly illustrating spherical aberration, astigmatism and distortion aberration in the wide angle end state.
Figure 33:
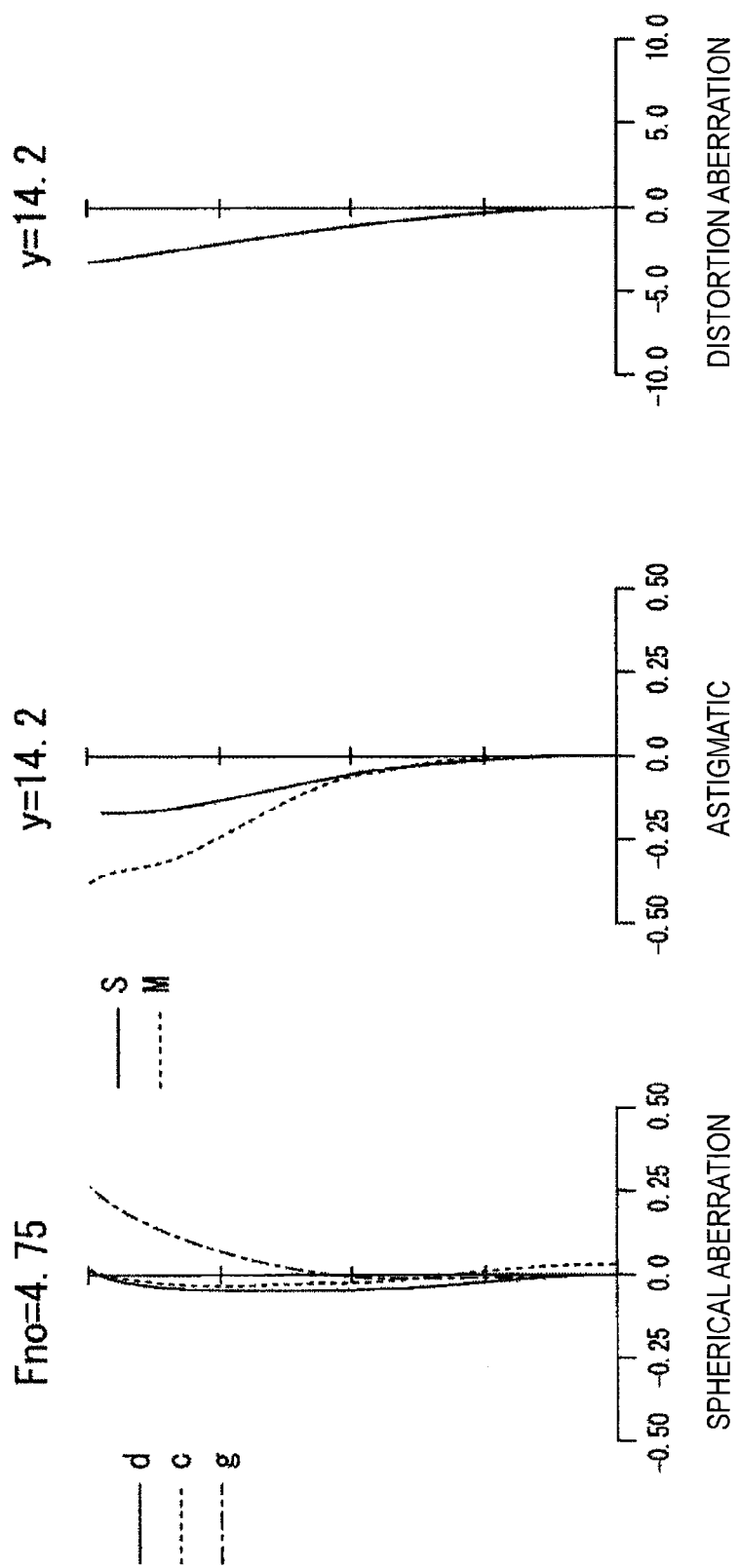
FIG. 33 is a view illustrating spherical aberration, astigmatism, and distortion aberration in the intermediate focal distance state.
Figure 34:
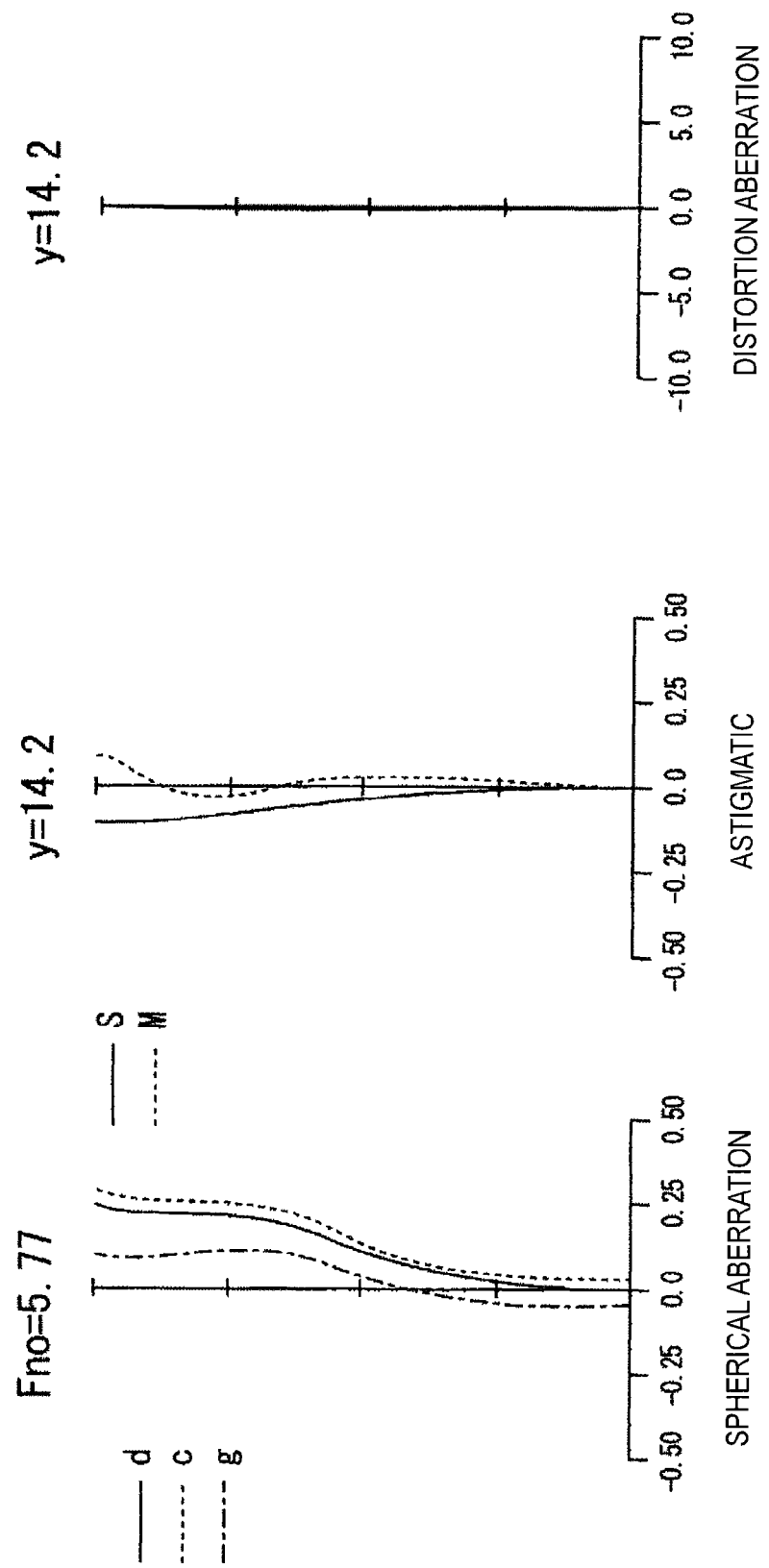
FIG. 34 is a view illustrating spherical aberration, astigmatism, and distortion aberration in the telephoto end state.

FIGS. 32 to 34 are views showing various aberrations in the infinity focus state in the numerical value embodiment 4, in which FIG. 32 illustrates various aberrations in the wide angle end state, FIG. 33 illustrates various aberrations in the intermediate focal distance state, and FIG. 34 illustrates various aberrations in the telephoto end state.

In FIGS. 32 to 34, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 4.

<Fifth Embodiment>

Figure 35:
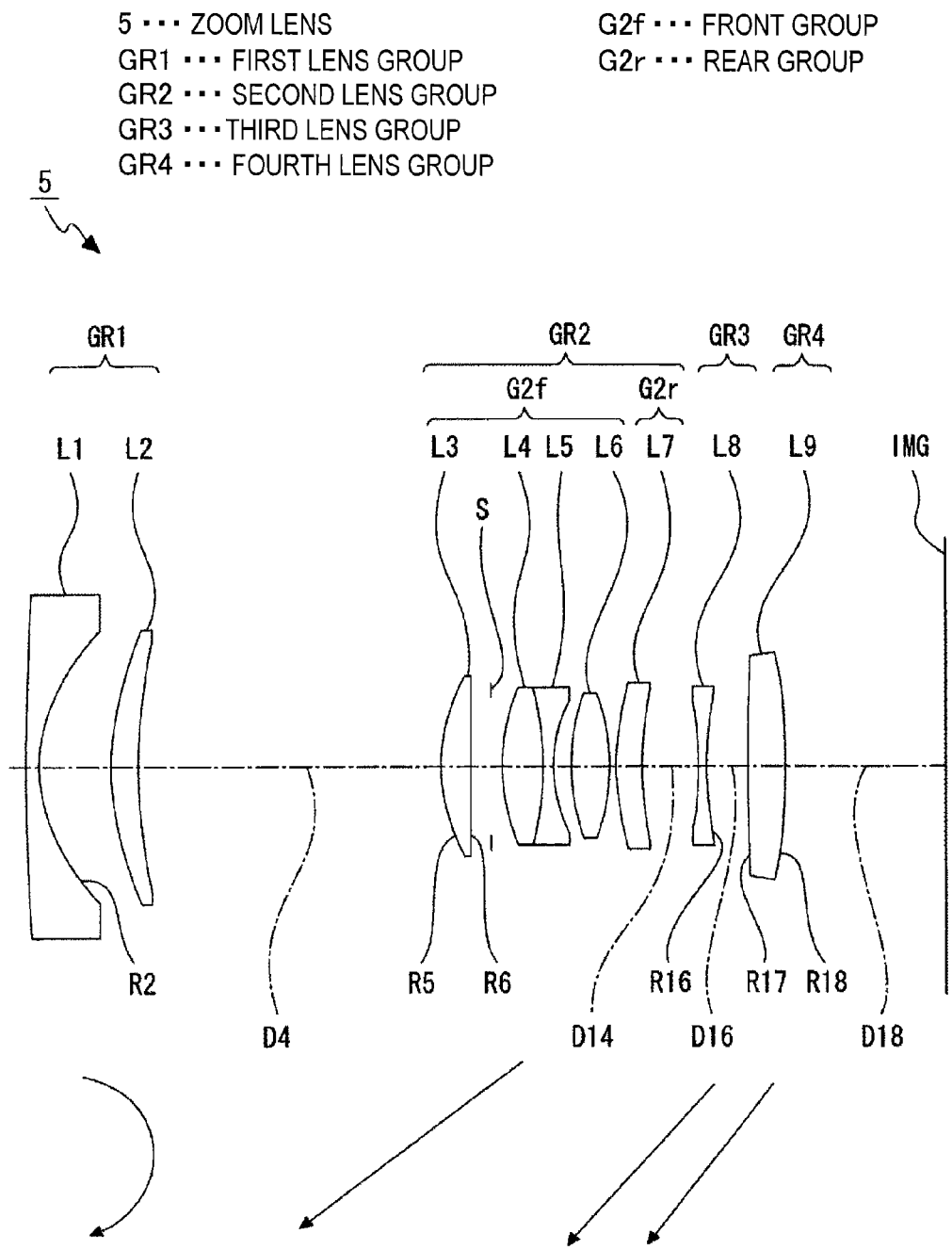
FIG. 35 is a view illustrating the lens configuration of a zoom lens in a fifth embodiment.

FIG. 35 illustrates the lens configuration of a zoom lens 5 according to the fifth embodiment of the present technology. The zoom lens 5 has a magnification ratio set to 2.94 times.

When magnification is changed between the wide angle end state and the telephoto end state in the zoom lens 5, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a positive meniscus lens whose convex surface faces the object side.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 13 shows lens data in the numerical value embodiment 5 in which detailed numerical values are applied to the zoom lens 5 according to the first embodiment.

TABLE 13

| Surface Number | R | D | N | ν |
|---|---|---|---|---|
| 1 | 246.600 | 0.900 | 1.88300 | 40.80 |
| 2 (ASP) | 12.556 | 5.428 |  |  |
| 3 | 24.320 | 1.979 | 2.00272 | 19.32 |
| 4 | 44.567 | (D4) |  |  |
| 5 (ASP) | 13.479 | 2.259 | 1.69350 | 53.20 |
| 6 (ASP) | 500.000 | 1.500 |  |  |
| 7 | Infinity | 0.850 |  |  |
| 8 | 15.459 | 3.125 | 1.49700 | 81.61 |
| 9 | −22.753 | 0.700 | 1.83400 | 37.34 |
| 10 | 10.656 | 1.423 |  |  |
| 11 | 18.318 | 2.801 | 1.48749 | 70.44 |
| 12 | −15.980 | 0.500 |  |  |
| 13 | 22.520 | 2.000 | 1.48749 | 70.44 |
| 14 | 29.430 | (D14) |  |  |
| 15 | −26.924 | 0.700 | 1.69680 | 55.46 |

TABLE 13-continued

| Surface Number | R | D | N | ν |
|---|---|---|---|---|
| 16 (ASP) | 37.572 | (D16) | | |
| 17 (ASP) | 101.677 | 2.800 | 1.80610 | 40.73 |
| 18 (ASP) | −75.914 | (D18) | | |

In the zoom lens 5, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 5 are shown in Table 14 together with the conic constant κ.

TABLE 14

| Surface Number | κ | A4 | A6 | A8 | A10 |
|---|---|---|---|---|---|
| 2 | −0.079655155 | −2.1973E−05 | −2.2610E−07 | 8.1072E−10 | −1.1921E−11 |
| 5 | 0 | −1.6763E−06 | −4.0557E−07 | 1.4582E−08 | −1.5234E−10 |
| 6 | 0 | 2.6285E−05 | −3.2059E−07 | 1.2905E−08 | −1.5121E−10 |
| 16 | −0.398112386 | 5.1095E−05 | −9.5426E−07 | 3.3746E−08 | −5.0130E−10 |
| 17 | 0 | −6.5273E−05 | 1.0194E−06 | −1.4505E−08 | 7.4877E−11 |
| 18 | 0 | −6.5560E−05 | 8.0577E−07 | −1.0268E−08 | 4.5059E−11 |

When magnification is changed between the wide angle end state and the telephoto end state in the zoom lens 5, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 5 are shown in Table 15 together with the F number Fno, the focal distance f, and the half-angle of view ω.

TABLE 15

| | Wide Angle End | Intermediate Focal Distance | Telephoto End |
|---|---|---|---|
| Fno | 3.61 | 4.75 | 5.77 |
| f | 16.48 | 28.20 | 48.50 |
| ω | 45.88 | 27.48 | 16.28 |
| D4 | 24.679 | 10.365 | 0.800 |
| D14 | 4.132 | 5.852 | 9.839 |
| D16 | 3.083 | 5.201 | 6.500 |
| D18 | 14.630 | 20.508 | 29.397 |

Figure 36:
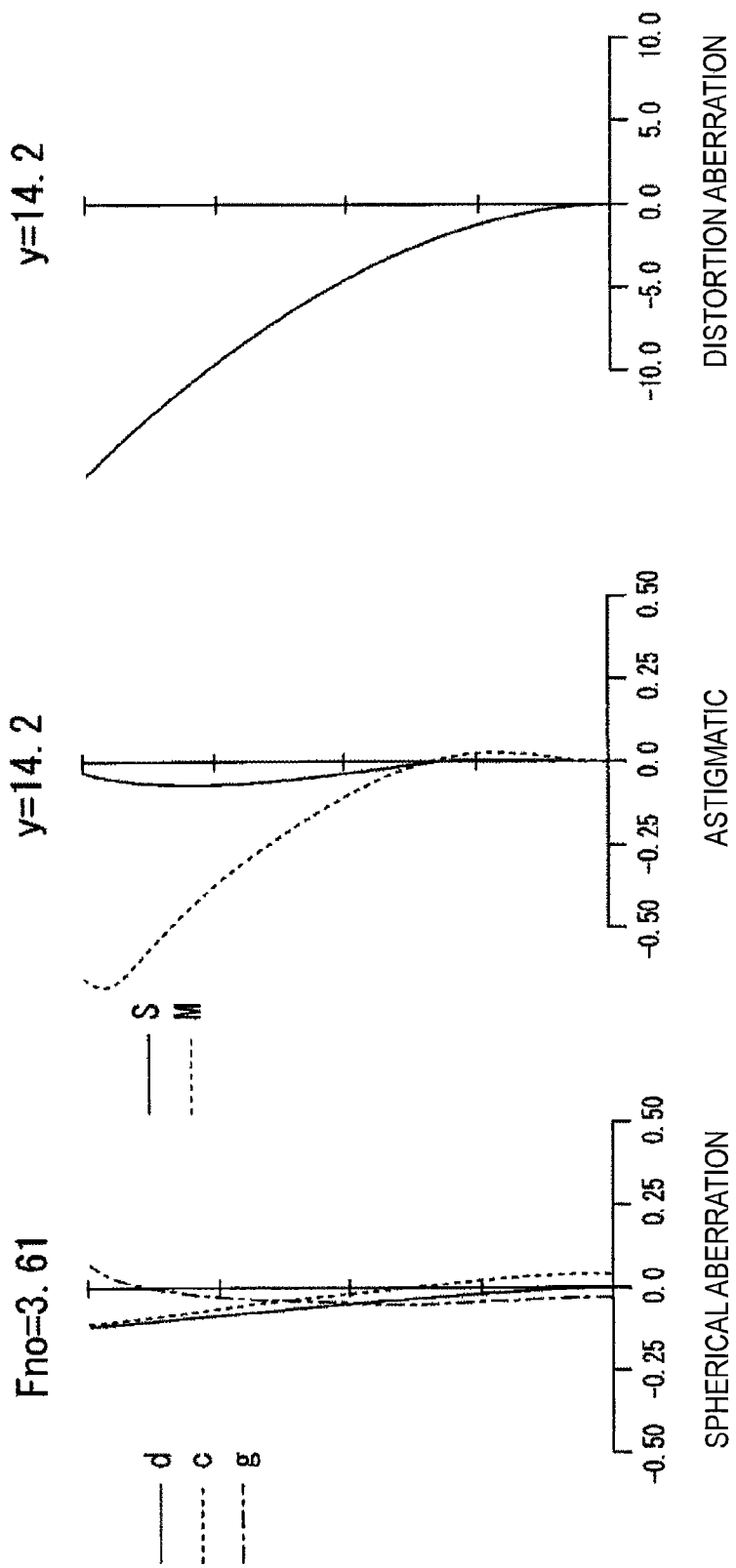
FIG. 36, as with FIGS. 37 and 38, is an aberration view illustrating a numerical value embodiment in which detailed numerical values are applied to the fifth embodiment, and more particularly illustrating spherical aberration, astigmatism and distortion aberration in the wide angle end state.
Figure 37:
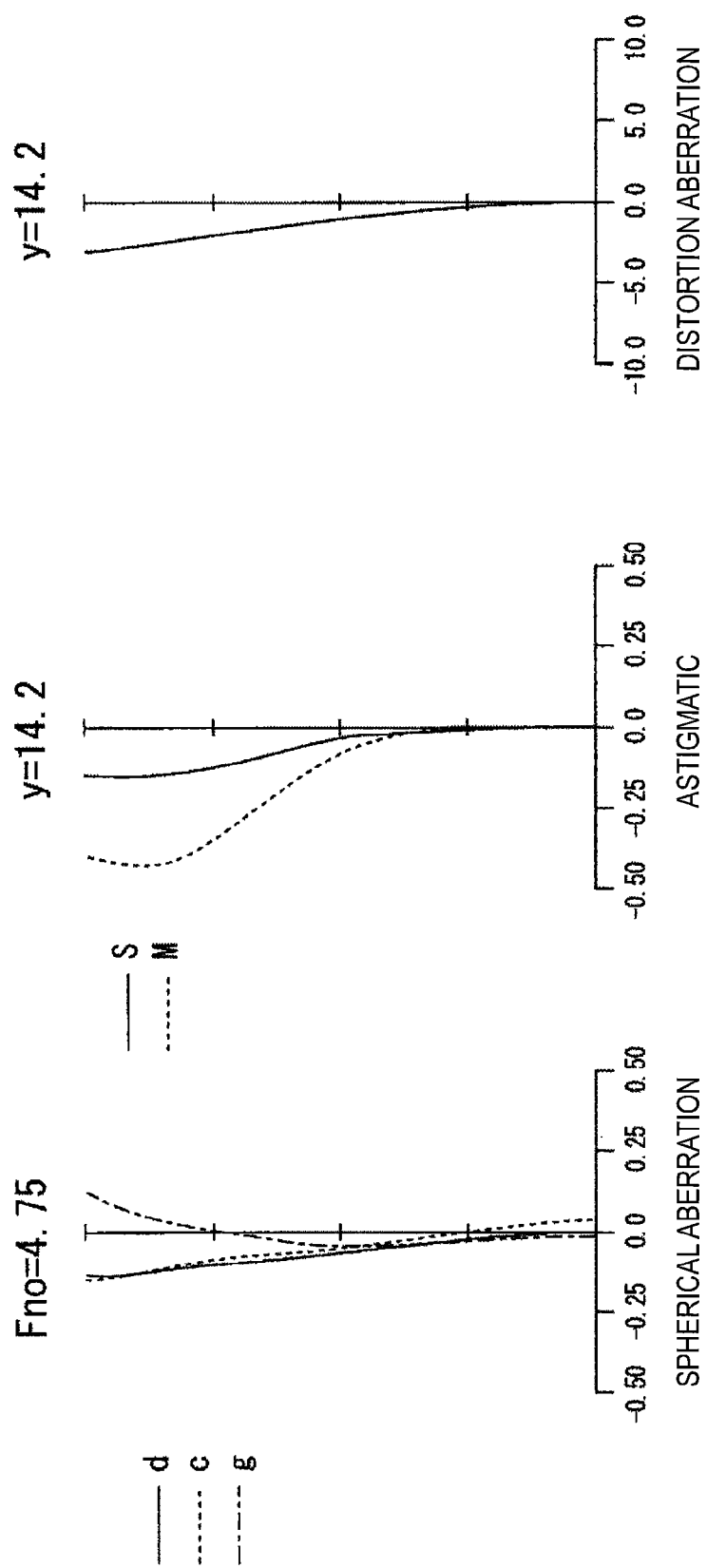
FIG. 37 is a view illustrating spherical aberration, astigmatism, and distortion aberration in the intermediate focal distance state.
Figure 38:
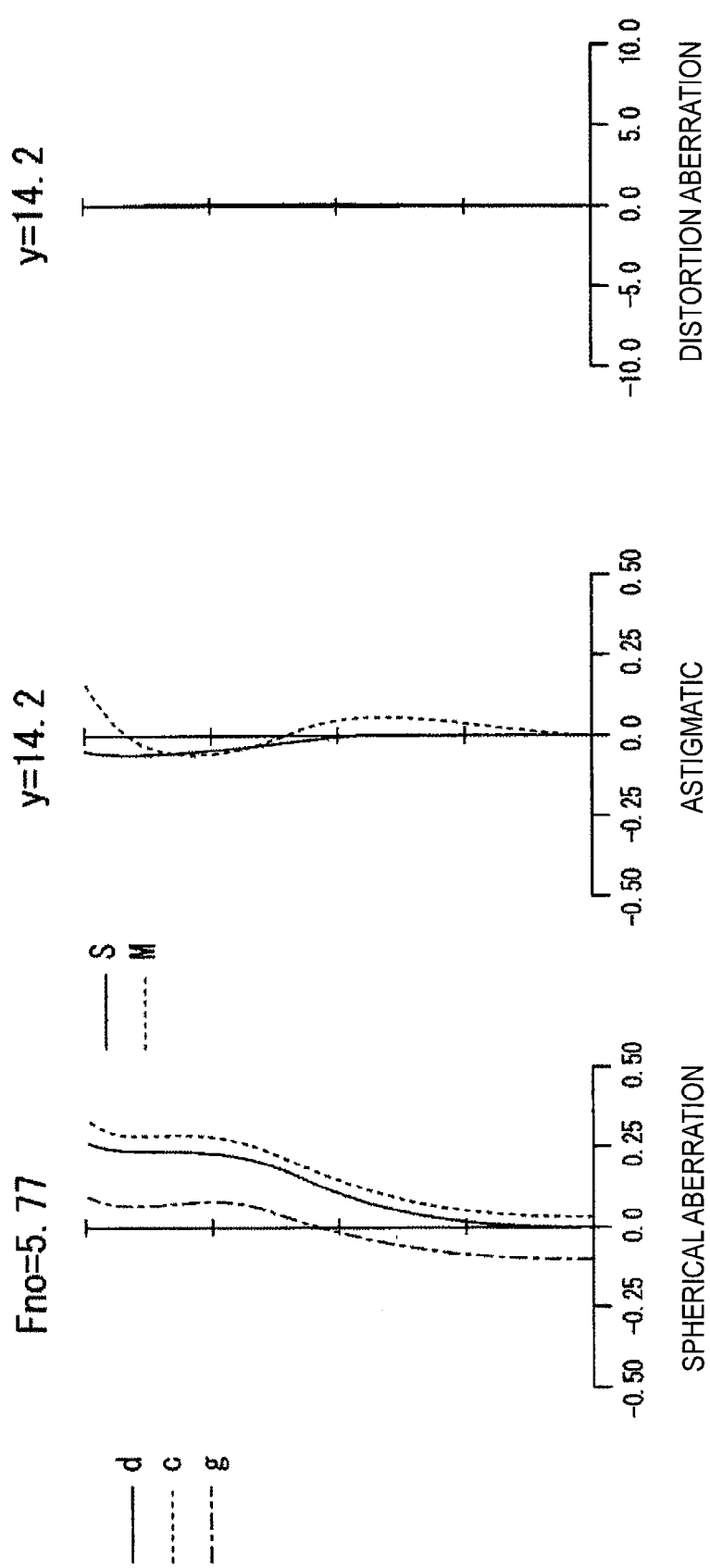
FIG. 38 is a view illustrating spherical aberration, astigmatism, and distortion aberration in the telephoto end state.

FIGS. 36 to 38 are views showing various aberrations in the infinity focus state in the numerical value embodiment 5, in which FIG. 36 illustrates various aberrations in the wide angle end state, FIG. 37 illustrates various aberrations in the intermediate focal distance state, and FIG. 38 illustrates various aberrations in the telephoto end state.

In FIGS. 36 to 38, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 5.

<Sixth Embodiment>

Figure 39:
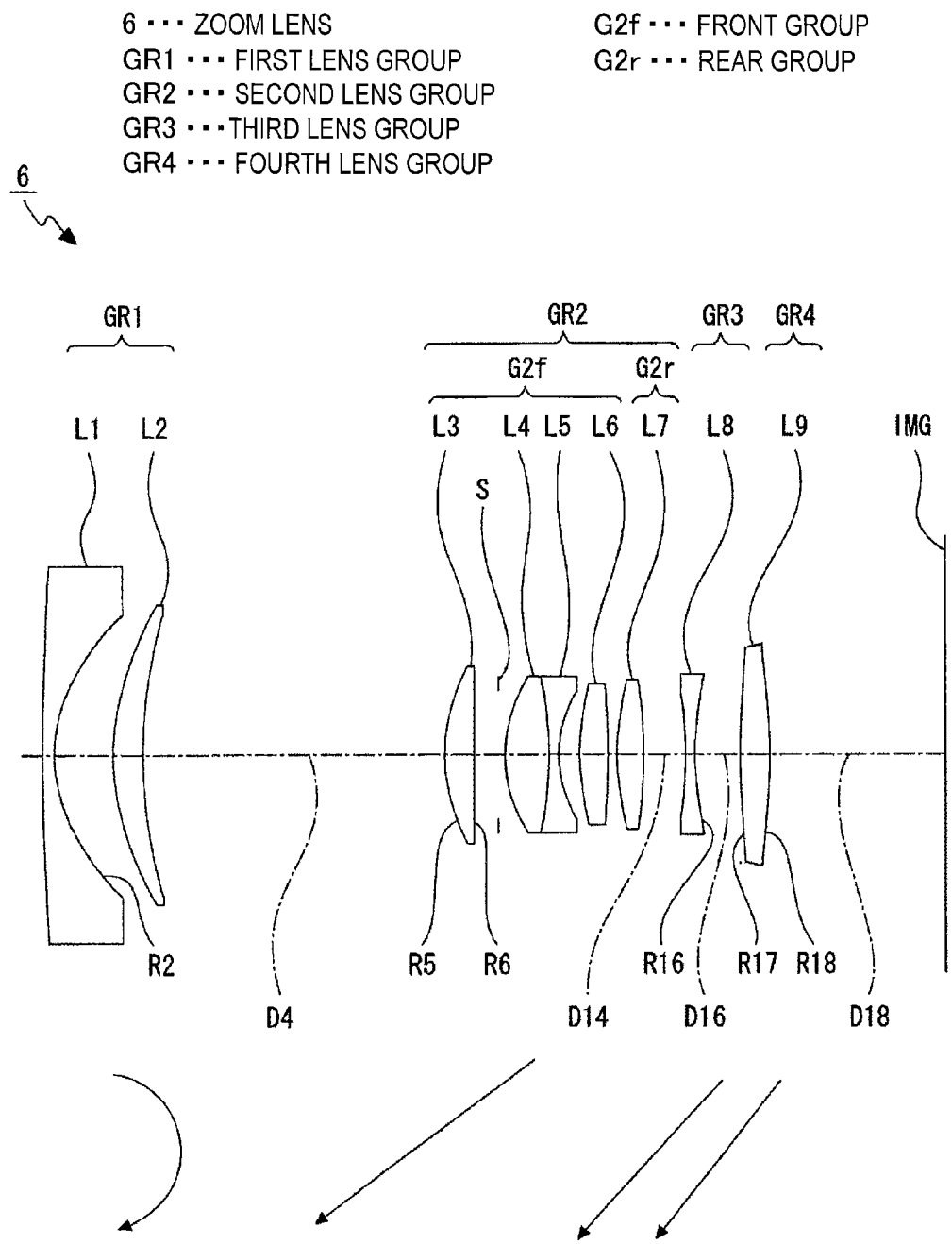
FIG. 39 is a view illustrating the lens configuration of a zoom lens in a sixth embodiment.

FIG. 39 illustrates the lens configuration of a zoom lens 6 according to the sixth embodiment of the present technology.

The zoom lens 6 has a magnification ratio set to 2.94 times.

When magnification is changed between the wide angle end state and the telephoto end state in the zoom lens 6, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a seventh lens L7 that is a biconvex lens.

The third lens group GR3 includes an eighth lens L8 that is a biconcave lens.

The fourth lens group GR4 includes a ninth lens L9 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 16 shows lens data in the numerical value embodiment 6 in which detailed numerical values are applied to the zoom lens 6 according to the sixth embodiment.

TABLE 16

| Surface Number | R | D | N | ν |
|---|---|---|---|---|
| 1 | 209.621 | 0.900 | 1.88300 | 40.80 |
| 2 (ASP) | 12.777 | 4.568 | | |
| 3 | 22.308 | 2.115 | 2.00272 | 19.32 |
| 4 | 38.457 | (D4) | | |
| 5 (ASP) | 14.009 | 2.188 | 1.69350 | 53.20 |
| 6 (ASP) | 264.212 | 1.876 | | |
| 7 | Infinity | 0.545 | | |
| 8 | 11.173 | 3.414 | 1.49700 | 81.61 |
| 9 | −29.429 | 0.700 | 1.83400 | 37.34 |
| 10 | 9.523 | 1.696 | | |
| 11 | 23.515 | 2.120 | 1.48749 | 70.44 |
| 12 | −66.701 | 0.717 | | |
| 13 | 20.835 | 2.000 | 1.48749 | 70.44 |
| 14 | −42.768 | (D14) | | |
| 15 | −28.543 | 0.700 | 1.69680 | 55.46 |
| 16 (ASP) | 26.229 | (D16) | | |
| 17 (ASP) | 77.834 | 2.268 | 1.80610 | 40.73 |
| 18 (ASP) | −70.071 | (D18) | | |

In the zoom lens 6, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 6 are shown in Table 17 together with the conic constant κ.

TABLE 17

| Surface Number | κ | A4 | A6 | A8 | A10 |
|---|---|---|---|---|---|
| 2 | −0.095321274 | −1.5951E−05 | −2.5027E−07 | 1.4406E−09 | −1.2807E−11 |
| 5 | 0 | 2.1160E−07 | −4.7133E−07 | 1.2653E−08 | −1.9556E−10 |
| 6 | 0 | 6.4546E−06 | −2.9707E−07 | 6.1345E−09 | −1.1939E−10 |
| 16 | 0.592435986 | 1.8563E−05 | 8.9461E−07 | −3.4318E−08 | 4.0878E−10 |
| 17 | 0 | −8.8812E−05 | 1.5677E−06 | −8.6394E−09 | 5.7729E−11 |
| 18 | 0 | −7.8489E−05 | 1.0564E−06 | −4.6513E−09 | 5.3059E−11 |

When magnification is changed between the wide angle end state and the telephoto end state in the zoom lens 6, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 6 are shown in Table 18 together with the F number Fno, the focal distance f, and the half-angle of view ω.

TABLE 18

| | Wide Angle End | Imediate Focal Distance | Telephoto End |
|---|---|---|---|
| Fno | 3.61 | 4.77 | 5.77 |
| f | 16.48 | 28.20 | 48.50 |
| ω | 45.43 | 27.40 | 16.16 |
| D4 | 25.823 | 11.061 | 0.800 |
| D14 | 3.342 | 4.725 | 8.612 |
| D16 | 3.501 | 5.623 | 6.500 |
| D18 | 14.987 | 21.454 | 30.182 |

Figure 40:
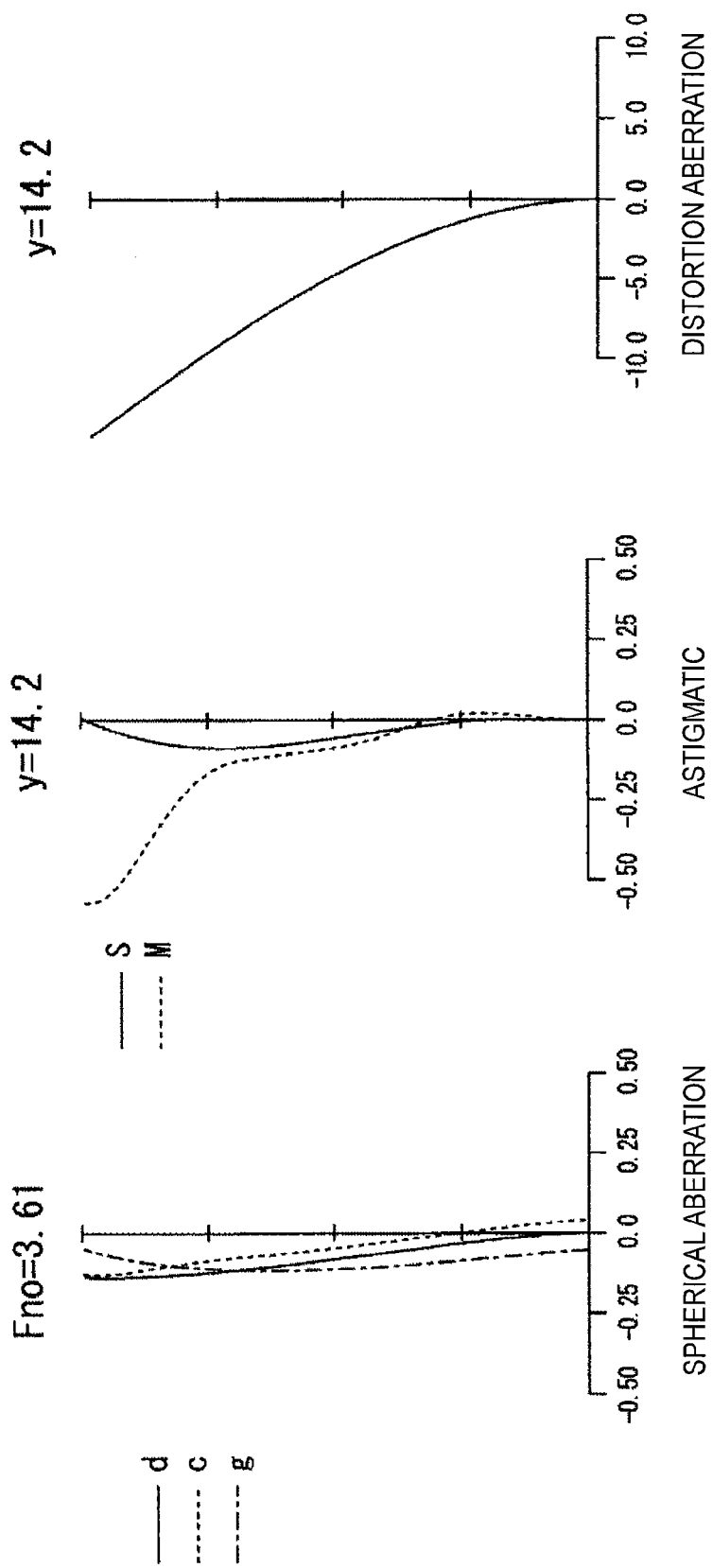
FIG. 40, as with FIGS. 41 and 42, is an aberration view illustrating a numerical value embodiment in which detailed numerical values are applied to the sixth embodiment, and more particularly illustrating spherical aberration, astigmatism and distortion aberration in the wide angle end state.
Figure 41:
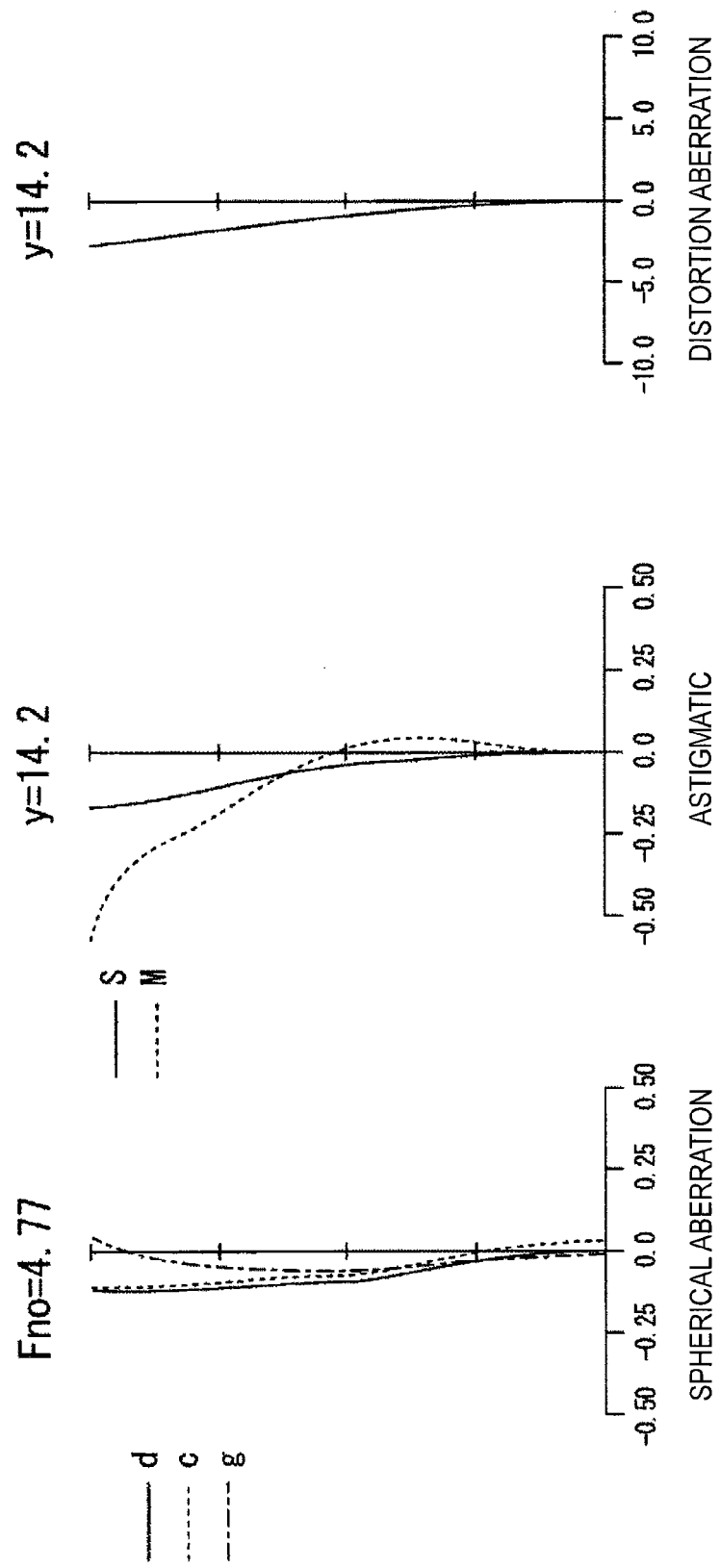
FIG. 41 is a view illustrating spherical aberration, astigmatism, and distortion aberration in the intermediate focal distance state.
Figure 42:
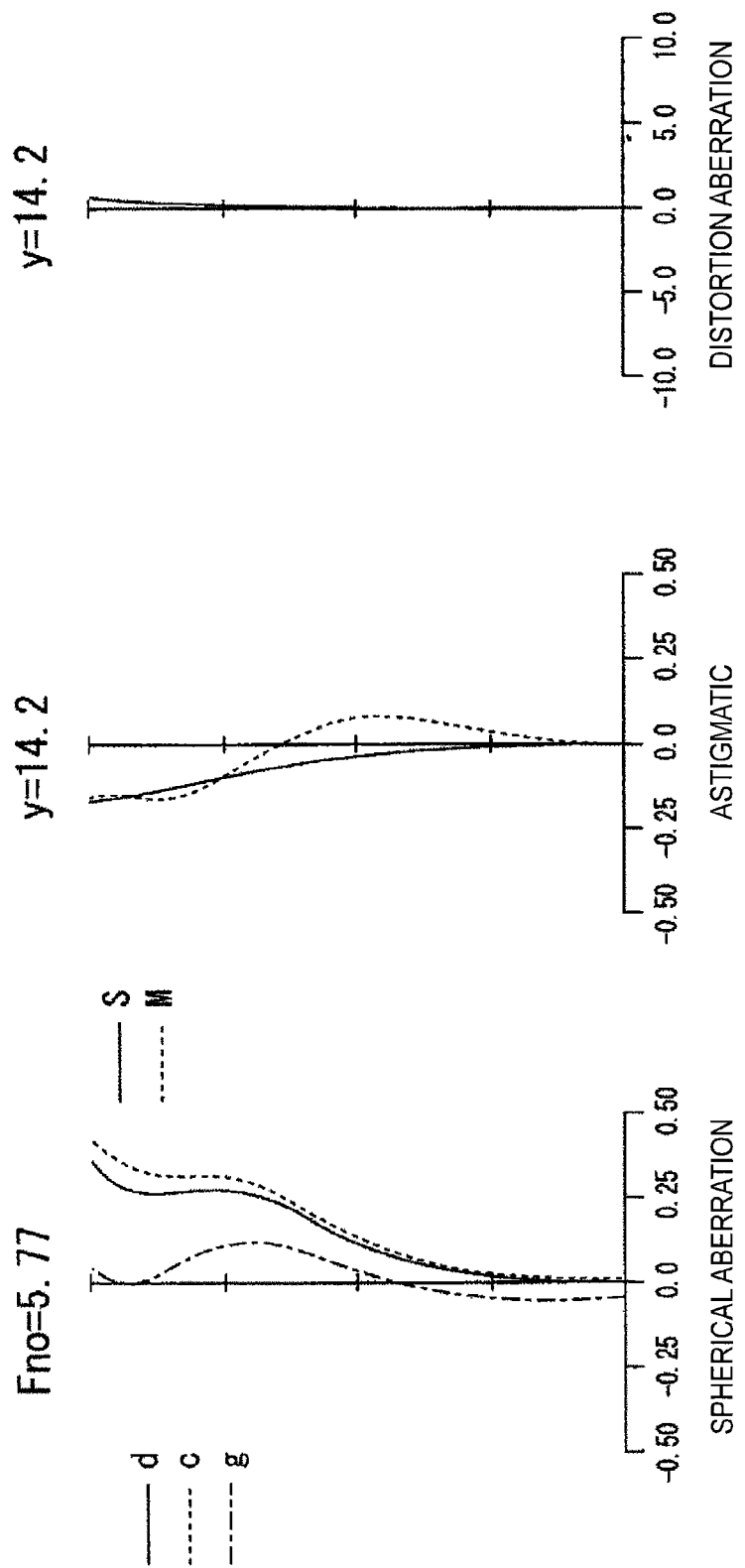
FIG. 42 is a view illustrating spherical aberration, astigmatism, and distortion aberration in the telephoto end state.

FIGS. 40 to 42 are views showing various aberrations in the infinity focus state in the numerical value embodiment 6, in which FIG. 40 illustrates various aberrations in the wide angle end state, FIG. 41 illustrates various aberrations in the intermediate focal distance state, and FIG. 42 illustrates various aberrations in the telephoto end state.

In FIGS. 40 to 42, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 6.

<Seventh Embodiment>

Figure 43:
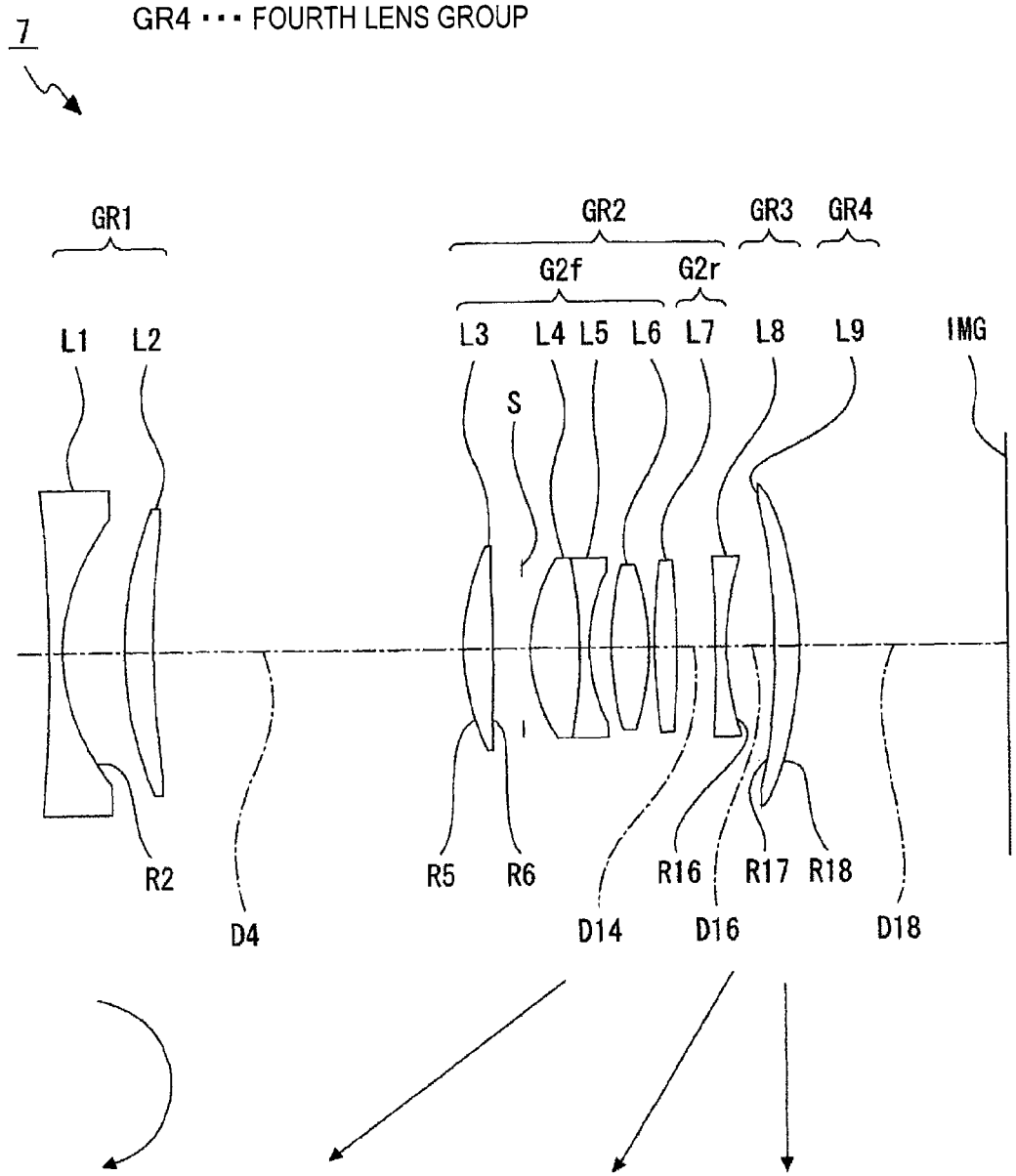
FIG. 43 is a view illustrating the lens configuration of a zoom lens in a seventh embodiment.

FIG. 43 illustrates the lens configuration of a zoom lens 7 according to the seventh embodiment of the present technology.

The zoom lens 7 has a magnification ratio set to 2.94 times.

When magnification is changed between the wide angle end state and the telephoto end state in the zoom lens 7, the first lens group GR1, the second lens group GR2, the third lens group GR3 are moved in the optical axis direction, while the fourth lens group GR4 is fixed.

The first lens group GR1 includes a first lens L1 that is a biconcave lens, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes a third lens L3 that is a biconvex lens, a cemented lens formed by joining to each other a fourth lens L4 that is a biconvex lens positioned on the object side and a fifth lens L5 that is a biconcave lens positioned on the image side; and a sixth lens L6 that is a biconvex lens, the lenses being arranged in order from the object side to the image side.

The rear group G2r includes a seventh lens L7 that is a biconvex lens.

The third lens group GR3 includes an eighth lens L8 that is a biconcave lens.

The fourth lens group GR4 includes a ninth lens L9 that is a positive meniscus lens whose convex surface faces the image side.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 19 shows lens data in the numerical value embodiment 1 in which detailed numerical values are applied to the zoom lens 7 according to the seventh embodiment.

TABLE 19

| Surface Number | R | D | N | ν |
|---|---|---|---|---|
| 1 | −106.599 | 1.000 | 1.88300 | 40.80 |
| 2 (ASP) | 14.121 | 4.483 | | |
| 3 | 28.595 | 1.953 | 2.00272 | 19.32 |
| 4 | 67.578 | (D4) | | |
| 5 (ASP) | 17.978 | 2.022 | 1.69350 | 53.20 |
| 6 (ASP) | −154.251 | 2.243 | | |
| 7 | Infinity | 0.500 | | |
| 8 | 11.910 | 3.485 | 1.49700 | 81.61 |
| 9 | −33.602 | 0.700 | 1.83400 | 37.34 |
| 10 | 11.615 | 1.675 | | |
| 11 | 28.531 | 2.500 | 1.48749 | 70.44 |
| 12 | −22.561 | 0.500 | | |
| 13 | 44.764 | 1.491 | 1.48749 | 70.44 |
| 14 | −149.915 | (D14) | | |
| 15 | −334.863 | 0.790 | 1.69680 | 55.46 |
| 16 (ASP) | 19.669 | (D16) | | |
| 17 (ASP) | −42.143 | 1.785 | 1.80610 | 40.73 |
| 18 (ASP) | −24.554 | (D18) | | |

In the zoom lens 7, an image-side surface (a second surface) of the first lens L1 in the first lens group GR1, both sides of the third lens L3 in the second lens group GR2 (a fifth surface and a sixth surface), an image-side surface (a sixteenth surface) of the eighth lens L8 in the third lens group GR3, and both sides (a seventeenth surface and an eighteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 4 are shown in Table 20 together with the conic constant κ.

TABLE 20

| Surface Number | κ | A4 | A6 | A8 | A10 |
|---|---|---|---|---|---|
| 2 | −0.287418167 | −2.1083E−05 | −1.0621E−07 | 1.1573E−10 | −1.7023E−12 |
| 5 | 0 | 1.5623E−05 | −3.4289E−07 | 1.1067E−08 | −1.1128E−10 |
| 6 | 0 | 3.2944E−05 | −3.0633E−07 | 8.0061E−09 | −8.2150E−11 |
| 16 | 0.346531803 | 4.6386E−05 | 6.9628E−08 | −1.2808E−08 | 1.9953E−10 |
| 17 | 0 | 5.3642E−06 | 9.9004E−07 | −1.0689E−08 | 2.4875E−11 |
| 18 | 0 | −3.1116E−07 | 9.1358E−07 | −8.7467E−09 | 1.4842E−11 |

When magnification is changed between the wide angle end state and the telephoto end state in the zoom lens 7, a surface distance D4 between the first lens group GR1 and the second lens group GR2, a surface distance D14 between the second lens group GR2 and the third lens group GR3, a surface distance D16 between the third lens group GR3 and the fourth lens group GR4, and a surface distance D18 between the fourth lens group GR4 and the image surface IMG change. Variable distances for each surface distance in the wide angle end state, the intermediate focal distance state, and in the telephoto end state in the numerical value embodiment 7 are shown in Table 21 together with the F number Fno, the focal distance f, and the half-angle of view ω.

TABLE 21

| | Wide Angle End | Intermediate Focal Distance | Telephoto End |
|---|---|---|---|
| Fno | 3.61 | 4.85 | 5.77 |
| f | 16.48 | 28.20 | 48.50 |
| ω | 42.01 | 26.46 | 15.88 |
| D4 | 23.777 | 10.769 | 0.800 |
| D14 | 2.749 | 5.505 | 12.951 |
| D16 | 3.538 | 11.323 | 15.211 |
| D18 | 18.308 | 18.308 | 18.308 |

Figure 44:
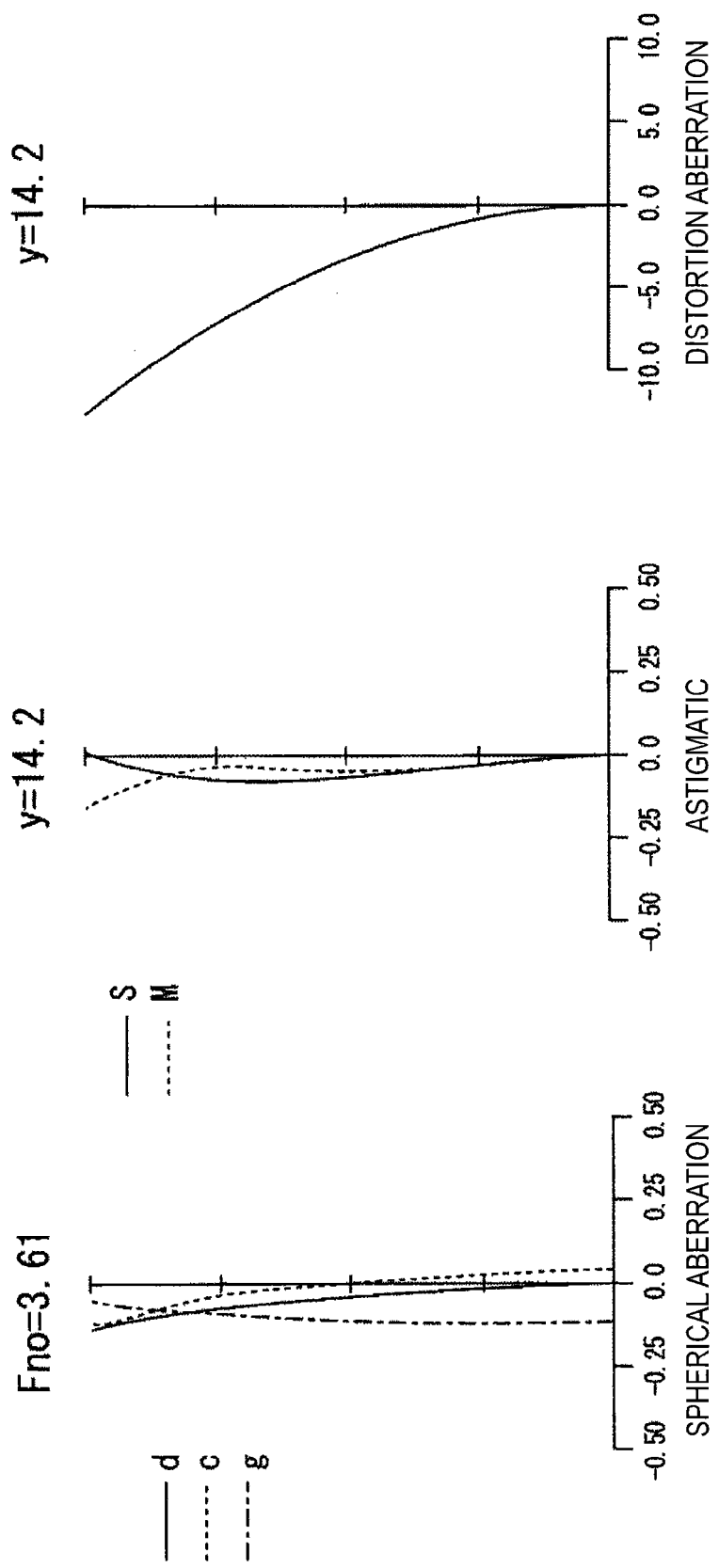
FIG. 44, as with FIGS. 45 and 46, is an aberration view illustrating a numerical value embodiment in which detailed numerical values are applied to the seventh embodiment, and more particularly illustrating spherical aberration, astigmatism and distortion aberration in the wide angle end state.
Figure 45:
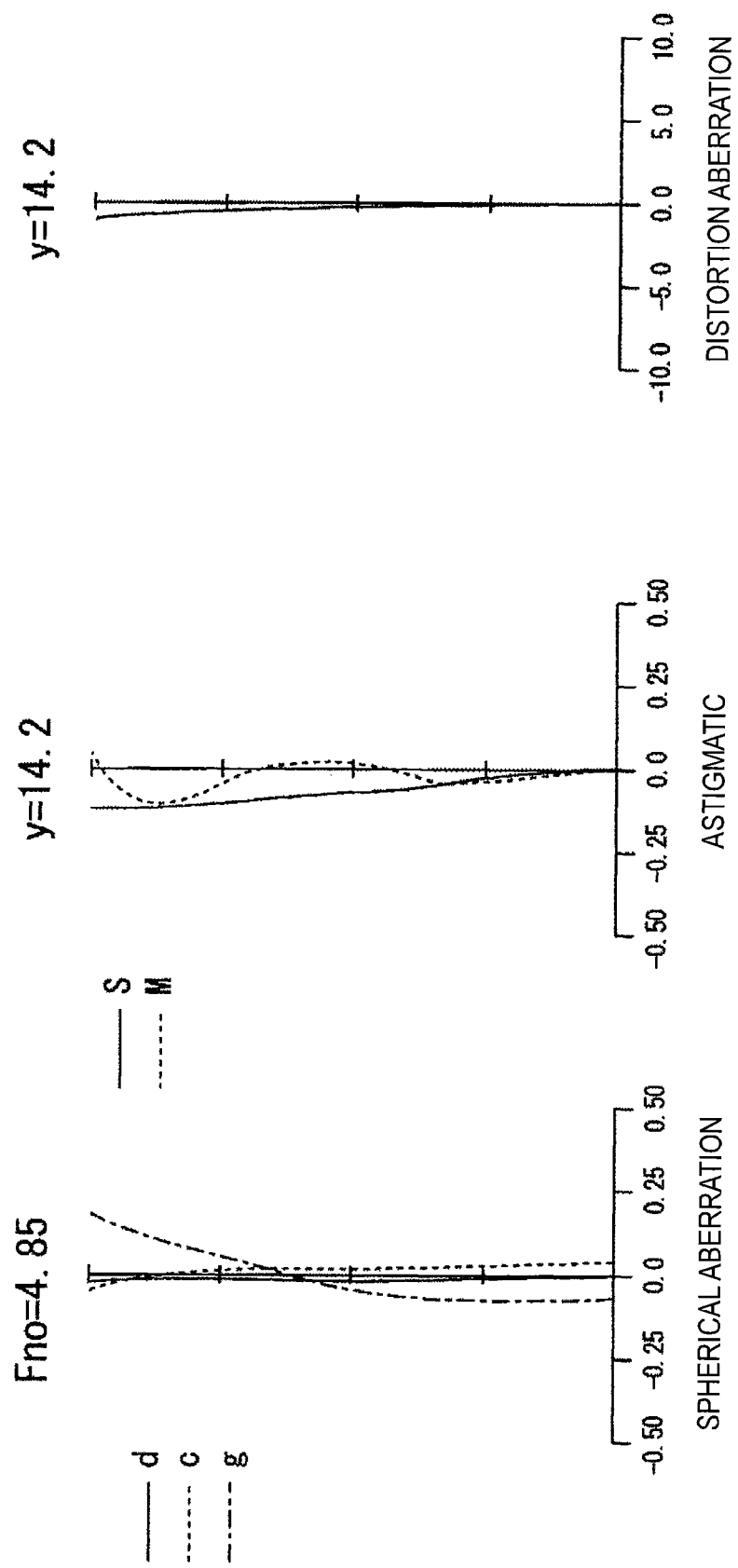
FIG. 45 is a view illustrating spherical aberration, astigmatism, and distortion aberration in the intermediate focal distance state.
Figure 46:
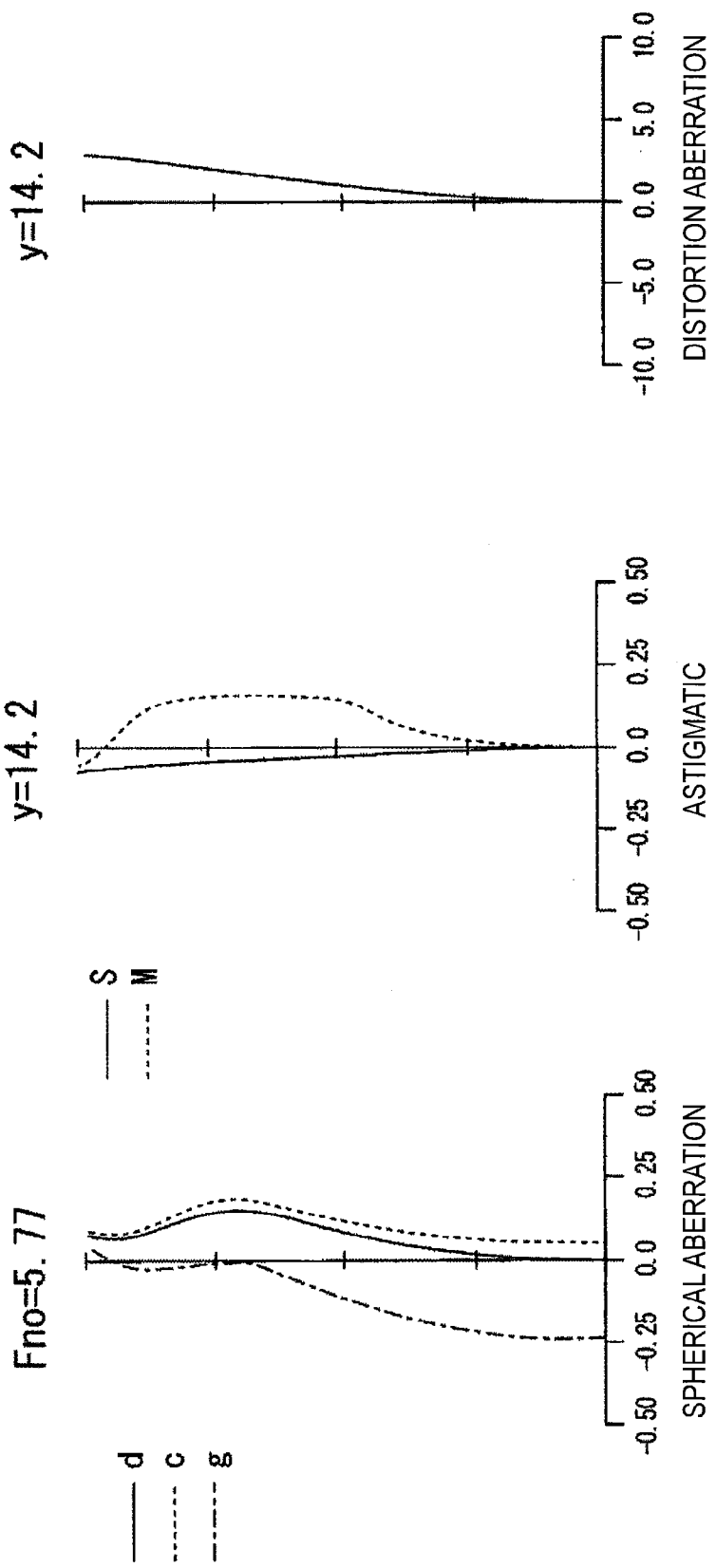
FIG. 46 is a view illustrating spherical aberration, astigmatism, and distortion aberration in the telephoto end state.

FIGS. 44 to 46 are views showing various aberrations in the infinity focus state in the numerical value embodiment 7, in which FIG. 44 illustrates various aberrations in the wide angle end state, FIG. 45 illustrates various aberrations in the intermediate focal distance state, and FIG. 46 illustrates various aberrations in the telephoto end state.

In FIGS. 44 to 46, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 7.

<Eighth Embodiment>

Figure 47:
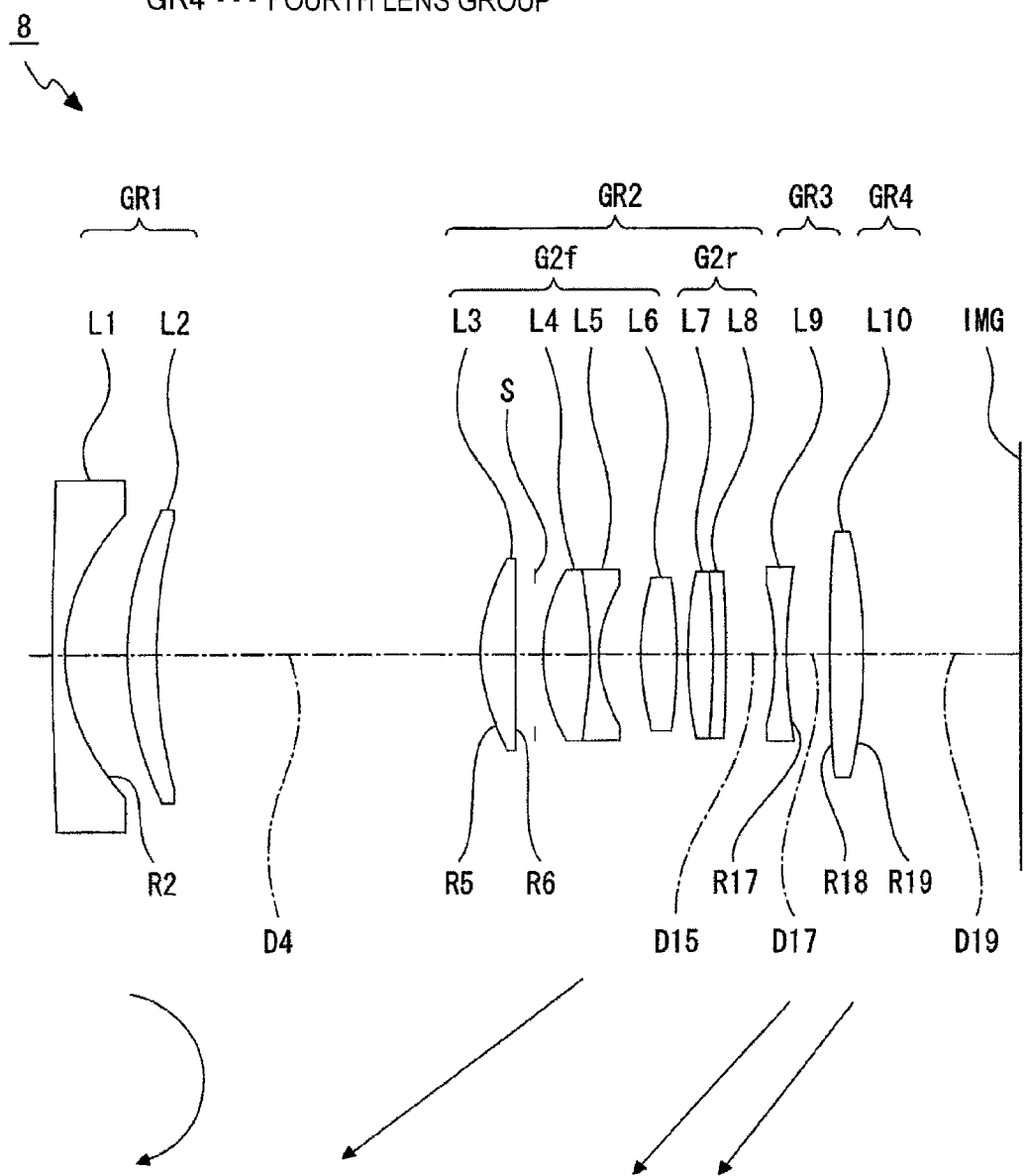
FIG. 47 is a view illustrating the lens configuration of a zoom lens in an eighth embodiment.

FIG. 47 illustrates the lens configuration of a zoom lens 8 according to the eighth embodiment of the present technology.

The zoom lens 8 has a magnification ratio set to 2.94 times.

When magnification is changed between the wide angle end state and the telephoto end state in the zoom lens 8, the first lens group GR1, the second lens group GR2, the third lens group GR3, and the fourth lens group GR4 are moved in the optical axis direction.

The first lens group GR1 includes a first lens L1 that is a negative meniscus lens whose convex surface faces the object side, and a second lens L2 that is a positive meniscus lens whose convex surface faces the object side, the lenses being arranged in order from the object side to the image side.

The second lens group GR2 includes a front group G2f positioned on the object side and a rear group G2r positioned on the image side.

The front group G2f includes: a third lens L3 that is a positive meniscus lens whose convex surface faces the object side, a cemented lens formed by joining to each other a fourth lens L4 that is a biconvex lens positioned on the object side and a fifth lens L5 that is a biconcave lens positioned on the image side, and a sixth lens L6 that is a biconvex lens, the lenses being arranged in order from the object side to the image side.

The rear group G2r includes a cemented lens formed by joining each other a seventh lens L7 that is a biconvex lens and an eighth lens L8 that is negative meniscus lenses whose concave side faces the object side.

The third lens group GR3 includes a ninth lens L9 that is a biconcave lens.

The fourth lens group GR4 includes a tenth lens L10 that is a biconvex lens.

An aperture stop S is placed between the third lens L3 and the fourth lens L4 in the second lens group GR2. The aperture stop S is moved integrally with the second lens group GR2 in the optical axis direction.

An unshown cover glass is placed between the fourth lens group GR4 and an image surface IMG.

Table 22 shows lens data in the numerical value embodiment 8 in which detailed numerical values are applied to the zoom lens 8 according to the eighth embodiment.

TABLE 22

| Surface Number | R | D | N | ν |
|---|---|---|---|---|
| 1 | 356.541 | 0.900 | 1.88300 | 40.80 |
| 2 (ASP) | 13.056 | 4.318 | | |
| 3 | 22.863 | 2.136 | 2.00272 | 19.32 |
| 4 | 40.961 | (D4) | | |
| 5 (ASP) | 13.325 | 2.296 | 1.69350 | 53.20 |
| 6 (ASP) | 500.000 | 1.500 | | |
| 7 | Infinity | 0.500 | | |
| 8 | 11.604 | 3.329 | 1.49700 | 81.61 |
| 9 | −29.954 | 0.700 | 1.83400 | 37.34 |
| 10 | 9.329 | 2.942 | | |
| 11 | 19.032 | 2.500 | 1.48749 | 70.44 |
| 12 | −35.185 | 0.733 | | |
| 13 | 28.578 | 1.887 | 1.48749 | 70.44 |
| 14 | −46.492 | 0.800 | 1.59551 | 39.22 |
| 15 | −114.818 | (D15) | | |
| 16 | −22.448 | 0.790 | 1.69680 | 55.46 |
| 17 (ASP) | 34.976 | (D17) | | |
| 18 (ASP) | 158.919 | 2.280 | 1.80610 | 40.73 |
| 19 (ASP) | −45.685 | (D19) | | |

In the zoom lens 8, an image-side surface (a second surface) of the first lens L1 in the first lens group GR1, both sides of the third lens L3 in the second lens group GR2 (a fifth surface and a sixth surface), an image-side surface (a seventeenth surface) of the ninth lens L9 in the third lens group GR3, and both sides (an eighteenth surface and a nineteenth surface) of the ninth lens L9 in the fourth lens group GR4 are formed into aspherical surfaces. The fourth, sixth, eighth, and tenth order aspheric coefficients A4, A6, A8, and A10 of the aspherical surfaces in the numerical value embodiment 8 are shown in Table 23 together with the conic constant κ.

When magnification is changed between the wide angle end state and the telephoto end state in the zoom lens 8, a surface distance D4 between the first lens group GR1 and the second lens group GR2, a surface distance D15 between the second lens group GR2 and the third lens group GR3, a surface distance D17 between the third lens group GR3 and the fourth lens group GR4, and a surface distance D19 between the fourth lens group GR4 and the image surface IMG change. Variable distances for each surface distance in the wide angle end state, the intermediate focal distance state, and in the telephoto end state in the numerical value embodiment 8 are shown in Table 24 together with the F number Fno, the focal distance f, and the half-angle of view ω.

TABLE 24

| | Wide Angle End | Intermediate Focal Distance | Telephoto End |
|---|---|---|---|
| Fno | 3.61 | 4.72 | 5.76 |
| f | 16.48 | 28.20 | 48.50 |
| ω | 42.33 | 26.83 | 16.07 |
| D4 | 25.826 | 11.325 | 0.800 |
| D15 | 3.422 | 4.602 | 9.402 |
| D17 | 3.114 | 5.036 | 6.410 |
| D19 | 13.527 | 20.704 | 27.731 |

Figure 48:
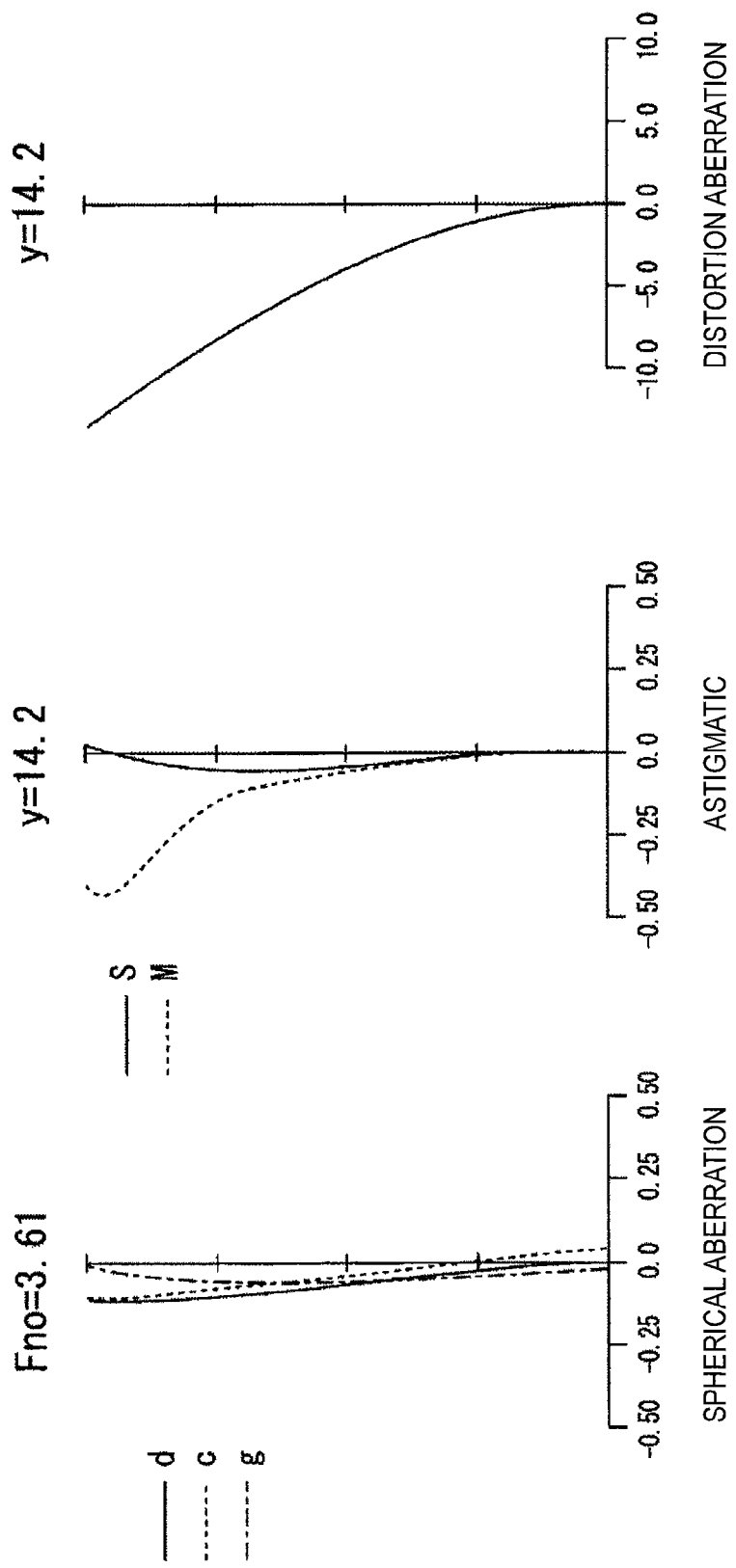
FIG. 48, as with FIGS. 49 and 50, is an aberration view illustrating a numerical value embodiment in which detailed numerical values are applied to the eighth embodiment, and more particularly illustrating spherical aberration, astigmatism and distortion aberration in the wide angle end state.
Figure 49:
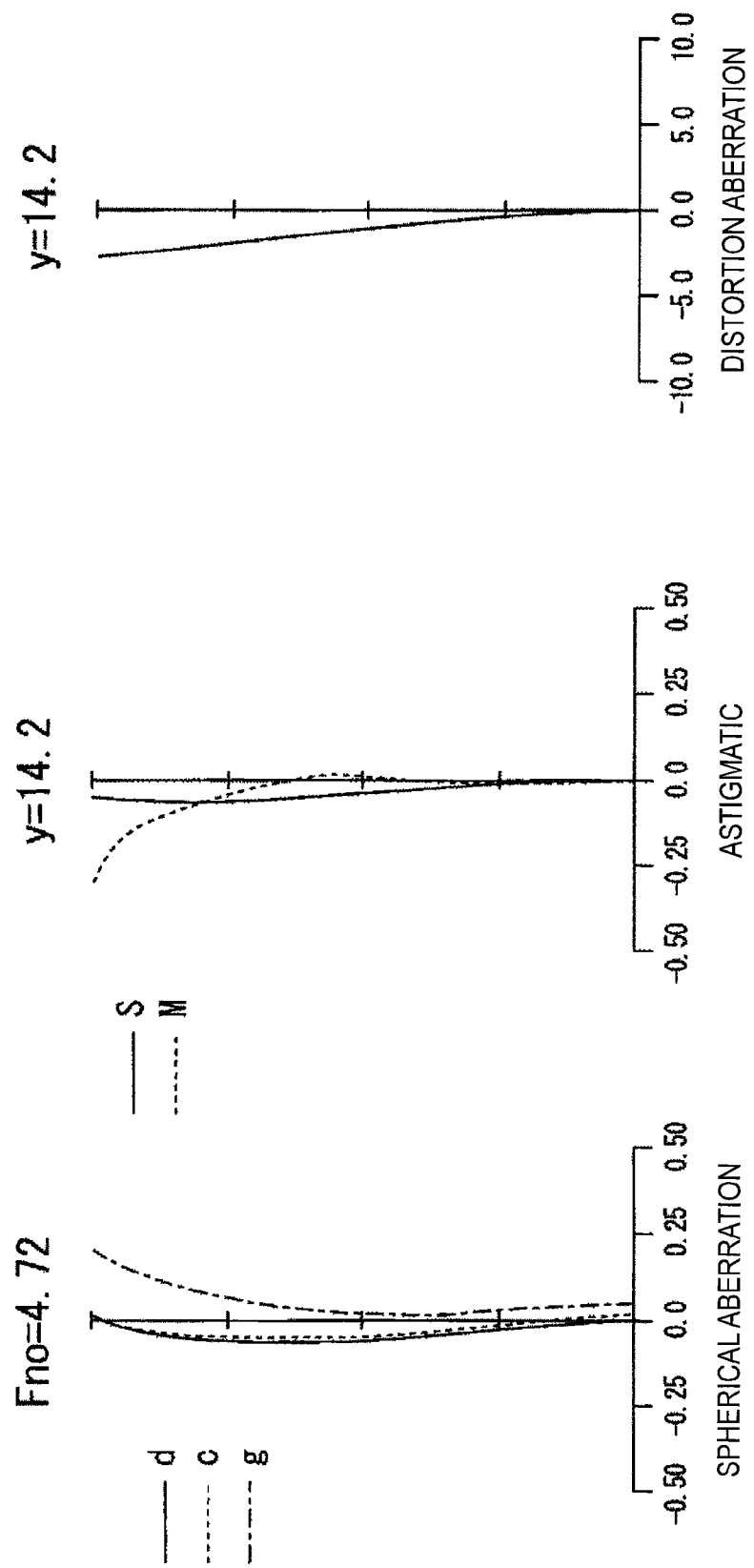
FIG. 49 is a view illustrating spherical aberration, astigmatism, and distortion aberration in the intermediate focal distance state.
Figure 50:
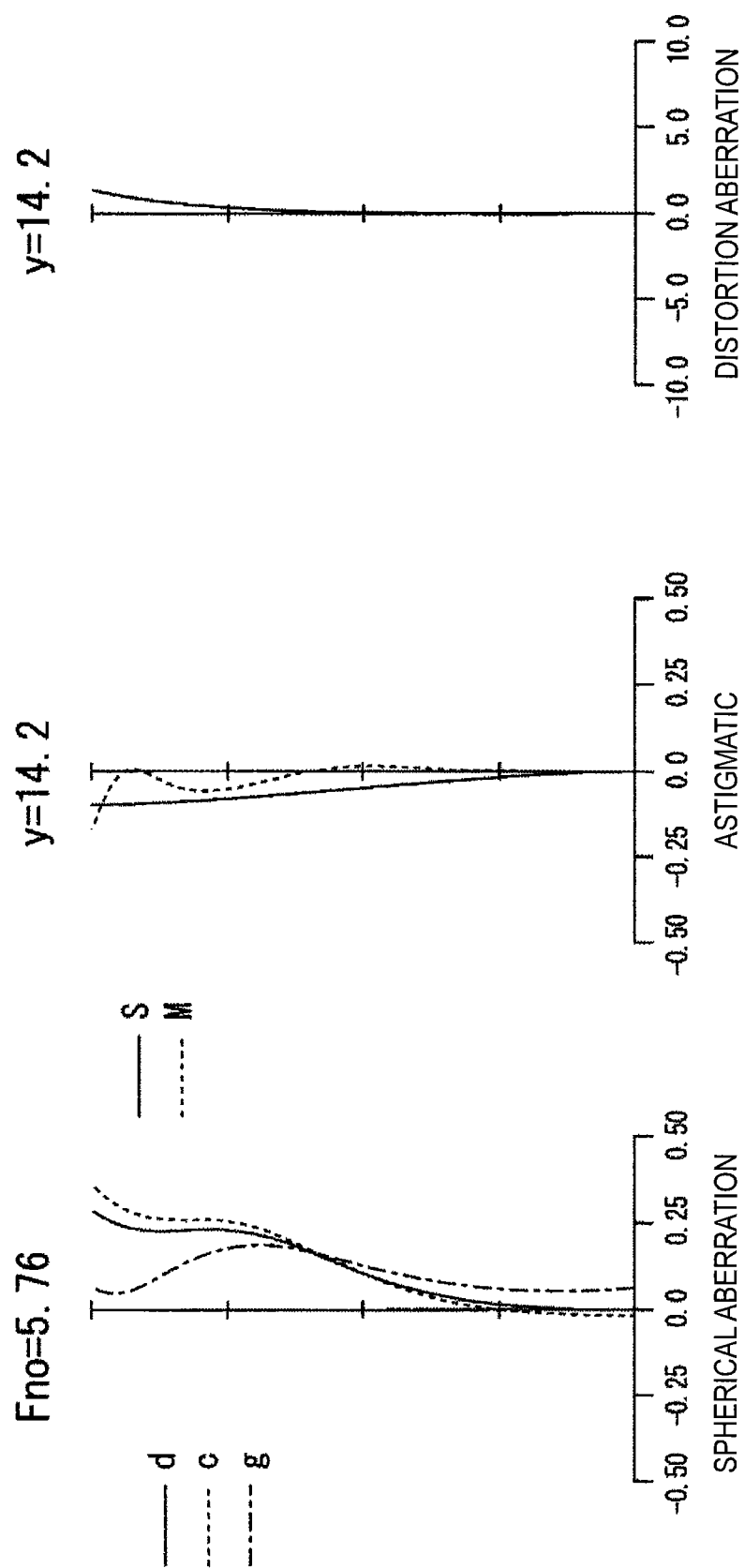
FIG. 50 is a view illustrating spherical aberration, astigmatism, and distortion aberration in the telephoto end state.

FIGS. 48 to 50 are views showing various aberrations in the infinity focus state in the numerical value embodiment 8, in which FIG. 48 illustrates various aberrations in the wide angle end state, FIG. 49 illustrates various aberrations in the intermediate focal distance state, and FIG. 50 illustrates various aberrations in the telephoto end state.

In FIGS. 48 to 50, a solid line, a dotted line, and an alternate long and short dash line in the spherical aberration views represent a value in a d line (587.56 nm), a value in a C line (wavelength of 656.3 nm), and value in a g line (wavelength of 435.8 nm), respectively. A solid line and a broken line in the astigmatic views represent a value on a sagittal image surface of the d line, and a value on a meridional image surface of the d line, respectively. A solid line in the distortion aberration views represents a value in the d line.

As apparent from each aberration diagram, all aberrations are successfully corrected and superior image forming performance is achieved in numerical value embodiment 8.

[Values in Conditional Expressions of Zoom Lens]

Hereinafter, each value in the conditional expressions in the zoom lens according to the embodiment of the present technology will be described.

Table 25 shows each value in the conditional expressions (1) to (4) in the zoom lenses 1 to 8 according to the numerical value embodiments 1 to 8.

TABLE 23

| Surface Number | κ | A4 | A6 | A8 | A10 |
|---|---|---|---|---|---|
| 2 | −0.002539326 | −2.2051E−05 | −2.6568E−07 | 1.3866E−09 | −1.4234E−11 |
| 5 | 0 | −7.2617E−06 | −4.1153E−07 | 9.5425E−09 | −9.8598E−11 |
| 6 | 0 | 5.5396E−06 | −2.6943E−07 | 5.7344E−09 | −4.7964E−11 |
| 17 | −0.860812011 | 1.8967E−05 | 1.1739E−06 | −3.6582E−08 | 3.9920E−10 |
| 18 | 0 | −9.0000E−05 | 1.6315E−06 | −1.0060E−08 | 7.1076E−11 |
| 19 | 0 | −7.7952E−05 | 1.1424E−06 | −6.6939E−09 | 6.9426E−11 |

TABLE 25

|  |  | Example 1 | Example 2 | Example 3 | Example 4 |
|---|---|---|---|---|---|
|  | f2r | 46.87 | 68.03 | 89.72 | 144.62 |
|  | fw | 16.48 | 16.48 | 16.48 | 16.48 |
| Conditional expression (1) | f2r/fw | 2.84 | 4.13 | 5.44 | 8.78 |
|  | R2f | 24.398 | 28.027 | 20.527 | 27.193 |
|  | R2r | −351.765 | 177.704 | 37.448 | 43.331 |
| Conditional expression (2) | (R2f + R2r)/(R2f − R2r) | −0.87 | −1.37 | −3.43 | −4.37 |
|  | f21 | 19.97 | 20.35 | 19.70 | 19.64 |
|  | f2f | 20.56 | 22.28 | 20.60 | 20.91 |
| Conditional expression (3) | f21/f2f | 0.97 | 0.91 | 0.96 | 0.94 |
|  | f3 | −19.35 | −24.87 | −19.81 | −24.34 |
| Conditional expression (4) | f3/fw | −1.17 | −1.51 | −1.20 | −1.48 |

|  |  | Example 5 | Example 6 | Example 7 | Example 8 |
|---|---|---|---|---|---|
|  | f2r | 179.72 | 29.04 | 70.89 | 50.45 |
|  | fw | 16.48 | 16.48 | 16.48 | 16.48 |
| Conditional expression (1) | f2r/fw | 10.90 | 1.76 | 4.30 | 3.06 |
|  | R2f | 22.520 | 20.835 | 44.764 | 28.578 |
|  | R2r | 29.430 | −42.768 | −149.915 | −114.818 |
| Conditional expression (2) | (R2f + R2r)/(R2f − R2r) | −7.52 | −0.34 | −0.54 | −0.60 |
|  | f21 | 19.94 | 21.26 | 23.33 | 19.70 |
|  | f2f | 20.01 | 25.62 | 21.10 | 22.22 |
| Conditional expression (3) | f21/f2f | 1.00 | 0.83 | 1.11 | 0.89 |
|  | f3 | −22.41 | −19.51 | −26.64 | −19.51 |
| Conditional expression (4) | f3/fw | −1.36 | −1.18 | −1.62 | −1.18 |

As is clear from Table 25, the zoom lenses 1 to 8 are configured to satisfy the conditional expressions (1) to (4).

[Configuration of Imaging Apparatus]

An imaging apparatus according to the embodiment of the present technology includes a zoom lens, and an image sensor configured to convert an optical image formed by the zoom lens into an electrical signal. The zoom lens includes a first lens group having negative refractive power, a second lens group having positive refractive power, a third lens group having negative refractive power, and a fourth lens group having positive refractive power arranged in order from the object side to the image side.

In the zoom lens according to the embodiment of the present technology, the second lens group include a front group having positive refractive power, and a rear group having positive refractive power, the front and rear groups being arranged in order from the object side to the image side. The front group includes a positive lens, a positive lens, a negative lens, and a positive lens arranged in order from the object side to the image side, and the rear group has at least one positive lens.

In the zoom lens according to the embodiment of the present technology as described in the forgoing, the second lens group has four positive lenses, and therefore it may be possible to save the trouble of increasing the refractive power of each lens in the second lens group even when the movement amount of the second lens group at the time of zooming is made smaller for downsizing. As a result, spherical aberration and coma aberration can successfully be corrected.

More specifically, spherical aberration or coma aberration generated in two positive lenses placed on the object side of a negative lens in the second lens group can be corrected on the image-side surface of the negative lens. Furthermore, luminous flux diverging from the negative lens in the second lens group can be focused on two positive lenses placed on the image side of the negative lens, while coma aberration can successfully be corrected.

Therefore, in the imaging apparatus according the present technology, downsizing in the zoom lens can be achieved and good optical performance including image formation performance can be secured.

[One Embodiment of Imaging Apparatus]

Figure 51:
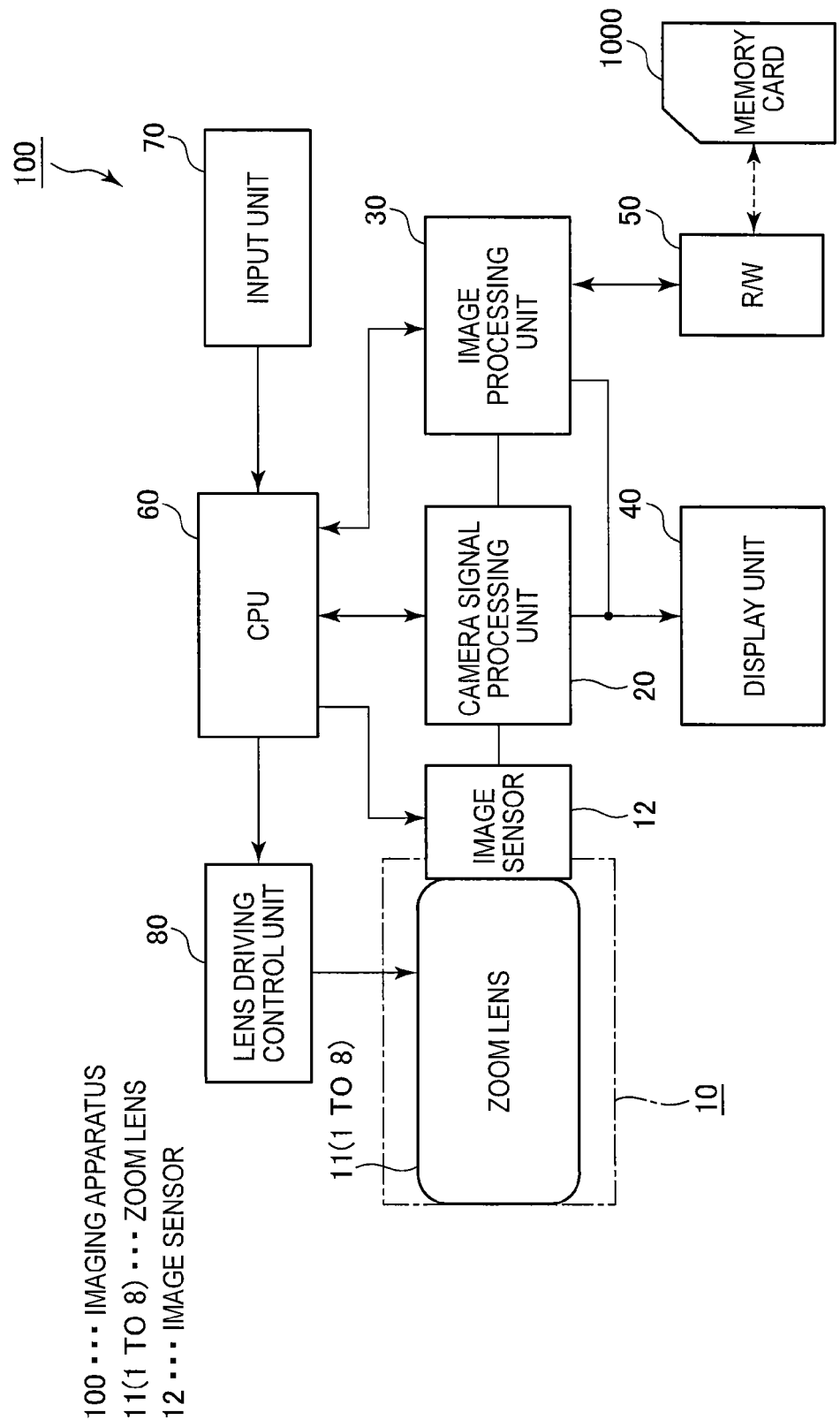
FIG. 51 is a block diagram illustrating one example of an imaging apparatus.

FIG. 51 is a block diagram showing a digital camera with interchangeable lenses according to one embodiment of the imaging apparatus in the present technology.

An imaging apparatus (a digital camera) 100 includes a camera block 10 having an imaging function, a camera signal processing unit 20 configured to perform signal processing such as analog-digital conversion of a photographed image signal, and an image processing unit 30 configured to perform a recording/reproducing process of an image signal. Furthermore, the imaging apparatus 100 includes a display unit 40, such as a liquid crystal display (LCD) configured to display a photographed image and the like, a reader/writer (R/W) 50 configured to perform write/read of an image signal to/from a memory card 1000, a central processing unit (CPU) 60 configured to control the entire imaging apparatus, an input unit 70 having various switches and the like for which a predetermined operation is performed by a user, and a lens driving control unit 80 configured to control the driving of lenses arranged in the camera block 10.

The camera block 10 may be mounted in an interchangeable lens, for example, and includes an optical system having zoom lenses 11 (any of the zoom lens 1 to the zoom lens 8 to which the present technology is applied), an image sensor 12 such as a charge coupled device (CCD) or a complementary metal-oxide semiconductor (CMOS), and the like.

The camera signal processing unit 20 is configured for various types of signal processing such as conversion to a digital signal, noise removal, image quality correction, or conversion to a luminance.color difference signal with respect to an output signal from the image sensor 12.

The image processing unit 30 is configured to perform a compression encoding.extension decoding process, or a conversion process of data specifications, which includes resolution and the like, with respect to an image signal based on a predetermined image data format.

The display unit 40 has a function of displaying an operation state of the input unit 70 by a user, or various pieces of data such as a photographed image.

The R/W 50 is configured to write image data encoded by the image processing unit 30 to the memory card 1000, or read image data recorded on the memory card 1000.

The CPU 60 serves as a control processing unit for controlling each circuit block provided in the imaging apparatus 100, and is configured to control each circuit block based on an instruction input signal and the like from the input unit 70.

The input unit 70, for example, includes a shutter release button for performing a shutter operation, a selection switch for selecting an operation mode, and the like, and is configured to output the instruction input signal corresponding to an operation of a user to the CPU 60.

The lens driving control unit 80 is configured to control a motor (not illustrated) and the like for driving each lens of the zoom lens 11 based on a control signal from the CPU 60.

The memory card 1000, for example, includes a semiconductor memory attachable/detachable to/from a slot connected to the R/W 50.

Hereinafter, the operation of the imaging apparatus 100 will be described.

In a photographing standby state, an image signal photographed in the camera block 10 is output to the display unit 40 through the camera signal processing unit 20, and is displayed as a camera's live view image under the control of the CPU 60. Furthermore, if an instruction input signal for zooming is input from the input unit 70, the CPU 60 outputs a control signal to the lens driving control unit 80, and a predetermined lens of the zoom lens 11 is moved based on the control of the lens driving control unit 80.

If a shutter (not illustrated) of the camera block 10 is operated by the instruction input signal from the input unit 70, a photographed image signal is output from the camera signal processing unit 20 to the image processing unit 30, is subject to the compression encoding process, and is converted into digital data having a predetermined data format. The converted data is output to the R/W 50 and is written in the memory card 1000.

For example, when the shutter release button of the input unit 70 is half pressed or fully pressed for recording (photographing), the lens driving control unit 80 moves a predetermined lens of the zoom lens 11 based on the control signal from the CPU 60, resulting in the achievement of focusing.

When image data recorded on the memory card 1000 is reproduced, predetermined image data is read from the memory card 1000 by the R/W 50 according to an operation of the input unit 70, and is subject to the extension decoding process by the image processing unit 30. Then, a reproduction image signal is output to the display unit 40, resulting in the display of a reproduction image.

[Others]

In the zoom lens according to the embodiment of the present technology and the imaging apparatus according to the embodiment of the present technology, other optical elements such as a lens having no refractive power and a diaphragm may be arranged in addition to the first lens group to the fourth lens group. In that case, the lens configuration of the zoom lens according to the embodiment of the present technology substantially includes four groups from the first lens group to the fourth lens group.

[Present Technology]

Additionally, the present technology may also be configured as below.

<1> A zoom lens including:
  a first lens group having negative refractive power;
  a second lens group having positive refractive power;
  a third lens group having negative refractive power; and
  a fourth lens group having positive refractive power, the lens groups being arranged in order from an object side to an image side,
  wherein the second lens group includes
    a front group having positive refractive power, and
    a rear group having positive refractive power, the front and rear groups being arranged in order from the object side to the image side,
  wherein the front group includes
    a positive lens,
    a positive lens,
    a negative lens, and
    a positive lens, the lenses being arranged in order from the object side to the image side, and
  wherein the rear group includes
    at least one positive lens.

<2> The zoom lens according to <1>,
  wherein the rear group is moved in a direction perpendicular to an optical axis in a manner that shake correction is performed.

<3> The zoom lens according to <1> or <2>,
  wherein a following conditional expression (1) is satisfied:

$$1.2 < f2r/fw < 13.0 \tag{1}$$

where f2r represents a focal distance of the rear group, and fw represents a focal distance of a whole lens system at a time of infinity focus in a wide angle end state.

<4> The zoom lens according to any one of <1> to <3>,
  wherein the rear group includes one positive lens or a cemented lens made up of a positive lens and a negative lens.

<5> The zoom lens according to any one of <1> to <4>,
  wherein a following conditional expression (2) is satisfied:

$$-10.0 < (R2f+R2r)/(R2f-R2r) < -0.1 \tag{2}$$

where R2f represents a curvature radius of a most object-side surface in the rear group, and R2r represents a curvature radius of a most image-side surface in the rear group.

<6> The zoom lens according to any one of <1> to <5>,
  wherein a following conditional expression (3) is satisfied:

$$0.7 < f21/f2f < 1.4 \tag{3}$$

where f21 represents a focal distance of a most object-side positive lens in the second lens group, and f2f represents a focal distance of the front group.

<7> The zoom lens according to any one of <1> to <6>,
  wherein the third lens group is moved in an optical axis direction in a manner that focusing is performed.

<8> The zoom lens according to any one of <1> to <6>,
  wherein the third lens group is moved in an optical axis direction in a manner that focusing is performed, and
  wherein a following conditional expression (4) is satisfied:

$$-2.0 < f3/fw < -1.0 \tag{4}$$

where f3 represents a focal distance of the third lens group, and fw represents a focal distance of a whole lens system at a time of infinity focus in a wide angle end state.

<9> The zoom lens according to any one of <1> to <8>,
  wherein the first lens group includes a negative lens and a positive lens, the negative lens and the positive lens being arranged in order from the object side to the image side.

<10> The zoom lens according to any one of <1> to <9>,
  wherein, when magnification is changed between a wide angle end state and a telephoto end state, the first lens group, the second lens group, and the third lens group are moved in an optical axis direction, while the fourth lens group is moved or fixed in the optical axis direction.

<11> An imaging apparatus including:
  a zoom lens; and
  an image sensor configured to convert an optical image formed by the zoom lens into an electrical signal, wherein the zoom lens include
a first lens group having negative refractive power,
a second lens group having positive refractive power,
a third lens group having negative refractive power, and
a fourth lens group having positive refractive power, the lens groups being arranged in order from an object side to an image side,
wherein the second lens group include
a front group having positive refractive power, and
a rear group having positive refractive power, the front and rear groups being arranged in order from the object side to the image side,
wherein the front group includes
a positive lens, a positive lens,
a negative lens, and
a positive lens, the lenses being arranged in order from the object side to the image side, and
wherein the rear group includes
at least one positive lens.

<12> The zoom lens according to any one of <1> to <10> or the imaging apparatus according to <11>, further including:
an optical element including a lens that does not substantially have lens refractive power.

In the aforementioned embodiments, examples have been shown in which the imaging apparatus was applied to an interchangeable digital camera. However, the applicability of the imaging apparatus is not limited to the interchangeable digital camera. The present technology is widely applicable as a camera unit and the like of digital input/output equipment, such as digital still cameras, digital video cameras, cellular phones incorporating a camera, and personal digital assistants and personal computers incorporating a camera.

It should be understood by those skilled in the art that various modifications, combinations, sub-combinations and alterations may occur depending on design requirements and other factors insofar as they are within the scope of the appended claims or the equivalents thereof The present disclosure contains subject matter related to that disclosed in Japanese Priority Patent Application JP 2012-134773 filed in the Japan Patent Office on Jun. 14, 2012, the entire content of which is hereby incorporated by reference.

What is claimed is:

1. A zoom lens comprising:
a first lens group having negative refractive power;
a second lens group having positive refractive power;
a third lens group having negative refractive power; and
a fourth lens group having positive refractive power, the lens groups being arranged in order from an object side to an image side,
wherein the second lens group includes
a front group having positive refractive power, and
a rear group having positive refractive power, the front and rear groups being arranged in order from the object side to the image side,
wherein the front group includes
a positive lens,
a positive lens,
a negative lens, and
a positive lens, the lenses being arranged in order from the object side to the image side, and
wherein the rear group includes at least one positive lens, and
wherein, when magnification is changed between a wide angle end state and a telephoto end state, the first lens group, the second lens group, the third lens group and the fourth lens group are moved in an optical axis direction.

2. The zoom lens according to claim 1,
wherein the rear group is moved in a direction perpendicular to an optical axis in a manner that shake correction is performed.

3. The zoom lens according to claim 1,
wherein a following conditional expression (1) is satisfied:

$$1.2 < f2r/fw < 13.0 \quad (1)$$

where f2r represents a focal distance of the rear group, and fw represents a focal distance of a whole lens system at a time of infinity focus in the wide angle end state.

4. The zoom lens according to claim 1,
wherein the rear group includes one positive lens or a cemented lens made up of a positive lens and a negative lens.

5. The zoom lens according to claim 1,
wherein a following conditional expression (2) is satisfied:

$$-10.0 < (R2f+R2r)/(R2f-R2r) < -0.1 \quad (2)$$

where R2f represents a curvature radius of a most object-side surface in the rear group, and R2r represents a curvature radius of a most image-side surface in the rear group.

6. The zoom lens according to claim 1, wherein a following conditional expression (3) is satisfied:

$$0.7 < f21/f2f < 1.4 \quad (3)$$

where f21 represents a focal distance of a most object-side positive lens in the second lens group, and f2f represents a focal distance of the front group.

7. The zoom lens according to claim 1,
wherein the third lens group is moved in the optical axis direction in a manner that focusing is performed.

8. The zoom lens according to claim 1,
wherein the third lens group is moved in the optical axis direction in a manner that focusing is performed, and
wherein a following conditional expression (4) is satisfied:

$$-2.0 < f3/fw < -1.0 \quad (4)$$

where f3 represents a focal distance of the third lens group, and fw represents a focal distance of a whole lens system at a time of infinity focus in the wide angle end state.

9. The zoom lens according to claim 1,
wherein the first lens group includes a negative lens and a positive lens, the negative lens and the positive lens being arranged in order from the object side to the image side.

10. An imaging apparatus comprising:
a zoom lens; and
an image sensor configured to convert an optical image formed by the zoom lens into an electrical signal,
wherein the zoom lens include
a first lens group having negative refractive power,
a second lens group having positive refractive power,
a third lens group having negative refractive power, and
a fourth lens group having positive refractive power, the lens groups being arranged in order from an object side to an image side,
wherein the second lens group include
a front group having positive refractive power, and
a rear group having positive refractive power, the front group and the rear group being arranged in order from the object side to the image side,
wherein the front group includes
a positive lens,
a positive lens,
a negative lens, and a positive lens, the lenses being arranged in order from the object side to the image side, and wherein the rear group includes at least one positive lens, and wherein, when magnification is changed between a wide angle end state and a telephoto end state, the first lens group, the second lens group, the third lens group and the fourth lens group are moved in an optical axis direction.

\* \* \* \* \*